(12) United States Patent
Tago et al.

(10) Patent No.: US 9,311,047 B2
(45) Date of Patent: Apr. 12, 2016

(54) MATCHING CIRCUIT AND METHOD OF CONTROLLING MATCHING CIRCUIT

(71) Applicant: FUJITSU LIMITED, Kawasaki-shi, Kanagawa (JP)

(72) Inventors: Shinichiro Tago, Shinagawa (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 14/224,596

(22) Filed: Mar. 25, 2014

(65) Prior Publication Data
US 2014/0297579 A1 Oct. 2, 2014

(30) Foreign Application Priority Data

Mar. 29, 2013 (JP) ................. 2013-075029

(51) Int. Cl.
*G06F 7/02* (2006.01)
*G06N 5/04* (2006.01)
(52) U.S. Cl.
CPC ............ *G06F 7/02* (2013.01); *G06N 5/047* (2013.01); *G06F 2207/025* (2013.01)
(58) Field of Classification Search
None
See application file for complete search history.

(56) References Cited

U.S. PATENT DOCUMENTS

| | | | |
|---|---|---|---|
| 4,205,302 A | | 5/1980 | Godo |
| 4,479,145 A | * | 10/1984 | Azuma .................. G01N 21/88 382/144 |
| 2002/0172065 A1 | * | 11/2002 | Uzawa .................. G11C 15/00 365/49.17 |
| 2014/0208334 A1 | * | 7/2014 | Inoue ..................... G06F 9/542 719/318 |

FOREIGN PATENT DOCUMENTS

JP 61-13604 B2 4/1986

OTHER PUBLICATIONS

Yusaku Kaneta et al., "Dynamic Reconfigurable Bit-Parallel Architecture for Large-Scale Regular Expression Matching,", Proceedings of the 2010 International Conference on Field-Programmable Technology (FPT'10), Dec. 2010, pp. 21-28.

* cited by examiner

*Primary Examiner* — Kakali Chaki
*Assistant Examiner* — Mai T Tran
(74) *Attorney, Agent, or Firm* — Fujitsu Patent Center

(57) ABSTRACT

A matching circuit includes pattern circuits, and a signal path in which the pattern circuits are series-connected, wherein each of the pattern circuits connected to a preceding-stage pattern circuit through the signal path is settable in a first operation mode and in a second operation mode, wherein each of the pattern circuits in the first operation mode generates a result of matching in response to both a result of matching supplied from a preceding-stage pattern circuit and a result obtained by matching data supplied from the preceding-stage pattern circuit against part of a regular expression pattern, and wherein each of the pattern circuits in the second operation mode generates a result of matching in response to a result obtained by matching the data supplied from the preceding-stage pattern circuit against part of a regular expression pattern, without relying on a result of matching supplied from the preceding-stage pattern circuit.

8 Claims, 43 Drawing Sheets

MATCHING CIRCUIT AND METHOD OF CONTROLLING MATCHING CIRCUIT

CROSS-REFERENCE TO RELATED APPLICATIONS

The present application is based upon and claims the benefit of priority from the prior Japanese Patent Application No. 2013-075029 filed on Mar. 29, 2013, with the Japanese Patent Office, the entire contents of which are incorporated herein by reference.

FIELD

The disclosures herein relate to a matching circuit and a method of controlling a matching circuit.

BACKGROUND

Pattern matching to decide whether a given character string matches one of a desired set of character strings may utilize a regular expression that represents a set of character strings by use of normal characters and/or meta characters. A determination as to the existence of match between the given character string and a regular-expression-based character string (i.e., regular expression pattern) makes it possible to check whether the given character string matches one of the desired set of character strings.

A method for performing regular-expression matching on a circuit by setting a regular expression pattern in a RAM is known in the art. In this method, a single pattern circuit is used to represent part of a regular expression pattern. A plurality of pattern circuits are series-connected to form a pattern circuit line that is capable of performing complex regular-expression matching. For example, the following regular-expression pattern may be used for matching.

$$[AB]+.\{1,3\}[BC]?.*[\char`\^0] \qquad (1)$$

In this case, a first pattern circuit is assigned to "[AB]+", second through fourth pattern circuits assigned to ".{1,3}", a fifth pattern circuit assigned to "[BC]?", a sixth pattern circuit assigned to ".*", and a seventh pattern circuit assigned to "[^0]". The first through seventh pattern circuits are connected in series to form a pattern circuit line. The characters of a character string to be matched are successively input into the pattern circuit line at the first-pattern-circuit end of the line. Each circuit matches in each cycle a character supplied thereto against the portion of the regular expression pattern assigned thereto. The first pattern circuit matches a character currently supplied thereto against part of the regular expression pattern, followed by sending this character and the result of the matching to the pattern circuit situated at the next stage. Any given circuit that is one of the next and subsequent pattern circuits matches a character currently supplied thereto against part of the regular expression pattern, and generates, based on the result of the current matching and the result of matching supplied from the preceding stage, a collective result of matching for the first stage through the stage of the given circuit, followed by sending this character and the collective result of matching to the pattern circuit situated at the next stage. The collective result of matching is set equal to a value indicative of a match upon the simultaneous occurrences of the condition that the result of matching supplied from the preceding stage indicates a match and the condition that the result of the current matching indicates a match. With this arrangement, the collective result of matching produced by the last-stage, seventh pattern circuit indicates a match in a certain cycle when a character string matching the regular expression pattern shown in the above-noted expression (1) is supplied as an input.

Pattern circuit lines may be provided in parallel to perform parallel processing, thereby simultaneously matching a plurality of data streams against different regular expression patterns, respectively. This arrangement can improve the speed of matching. For this kind of parallel processing, different types of pattern circuit lines as defined by respective, different numbers of series-connected pattern circuits are provided, and, also, a plurality of pattern circuit lines are provided for each type. For example, 6 size-"4" pattern circuit lines each comprised of 4 series-connected pattern circuits, 2 size-"8" pattern circuit lines each comprised of 8 series-connected pattern circuits, and one size-"12" pattern circuit line comprised of 12 series-connected pattern circuits may be provided. A matching core serves to write a regular expression pattern to a pattern circuit line and also to supply a character string to be matched to the pattern circuit line. A plurality of matching cores are provided for a plurality of data streams, respectively. One or more pattern circuit lines are then connected to one matching core. One pattern circuit line may be connected to only one matching core to perform matching in a dedicated fashion, or may be connected to a plurality of matching cores to perform matching in a shared manner. A pattern core line that is shared by a plurality of matching cores is subjected to exclusive control, such that the pattern core line performs matching for only one matching core at any given time.

The parallel configuration described above may be designed such that each matching core exclusively uses one or more pattern circuit lines. In such a case, a given circuit core is provided with dedicated pattern circuit lines of different sizes in order to perform matching against various regular expression patterns of different lengths. This configuration is fraught with circuit redundancy, resulting in an extremely large circuit size. The circuit design in which the matching cores share one or more pattern circuits may have a large number of connecting wires, and may have a poor degree of parallelism.

The problem of circuit redundancy noted above is in existence even when there is only one matching core. The fact that a single matching core performs matching with respect to various regular expression patterns having different lengths entails that pattern circuit lines of various different sizes are provided for this matching core. For example, different regular expression patterns may be provided in a first configuration that includes 8 size-"4" patterns and one size-"8" pattern or in a second configuration that includes one size-"4" pattern and 4 size-"8" patterns. In this case, the circuit that copes with both the first configuration and the second configuration ends up having 4 size-"8" pattern circuit lines and 5 size-"4" pattern circuit lines. It may be noted that this circuit can also cope with a size-"4" regular expression pattern in the first configuration by use of a size-"8" pattern circuit line. In this case, the number of pattern circuits is 52 (=32+20). In the first configuration, the number of pattern circuits simply calculated by ignoring pattern sizes is 40 (=8×4+1×8). In the second configuration, the number of pattern circuits simply calculated by ignoring pattern sizes is 36 (=1×4+4×8). Accordingly, only 40 pattern circuits are used at the maximum. Despite this fact, the circuit that can cope with both the first configuration and the second configuration ends up having 52 pattern circuits. Such a significant circuit redundancy results in an extremely large circuit size.

[Non-Patent Document 1] Yusaku Kaneta, Shingo Yoshizawa, Shin-ichi Minato, Hiroki Arimura, Yoshikazu Miyanaga, "Dynamic Reconfigurable Bit-Parallel Architecture for Large-Scale Regular Expression Matching," Proc. of the 2010 International Conference on Field-Programmable Technology (FPT'10), pp. 21-28, December 2010.

SUMMARY

According to an aspect of the embodiment, a matching circuit includes a plurality of pattern circuits each configured to match data against part of a regular expression pattern, and a signal path in which the pattern circuits are series-connected, and a given-stage pattern circuit supplies to a next-stage pattern circuit the data and a result of matching generated by the given-stage pattern circuit, wherein each of the pattern circuits connected to a preceding-stage pattern circuit through the signal path is settable in a first operation mode and in a second operation mode, wherein each of the pattern circuits in the first operation mode generates a result of matching which is to be supplied to a next-stage pattern circuit in response to both a result of matching supplied from the preceding-stage pattern circuit and a result obtained by matching the data supplied from the preceding-stage pattern circuit against part of a regular expression pattern, and wherein each of the pattern circuits in the second operation mode generates a result of matching which is to be supplied to the next-stage pattern circuit in response to a result obtained by matching the data supplied from the preceding-stage pattern circuit against part of a regular expression pattern, without relying on a result of matching supplied from the preceding-stage pattern circuit.

According to an aspect of the embodiment, a method of controlling a matching circuit includes assigning a first regular expression pattern to N (N: positive integer) pattern circuits that are a given pattern circuit serving as a starting point through an N-th pattern circuit as counted from the given pattern circuit in a pattern circuit line in which a plurality of pattern circuits each configured to match data against part of a regular expression pattern are series-connected, and assigning a second regular expression pattern to M (M: positive integer) pattern circuits that are an N+1-th pattern circuit through an N+M-th pattern circuit as counted from the given pattern circuit serving as the starting point.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments of the invention will be described with reference to the accompanying drawings.

Figure 1:
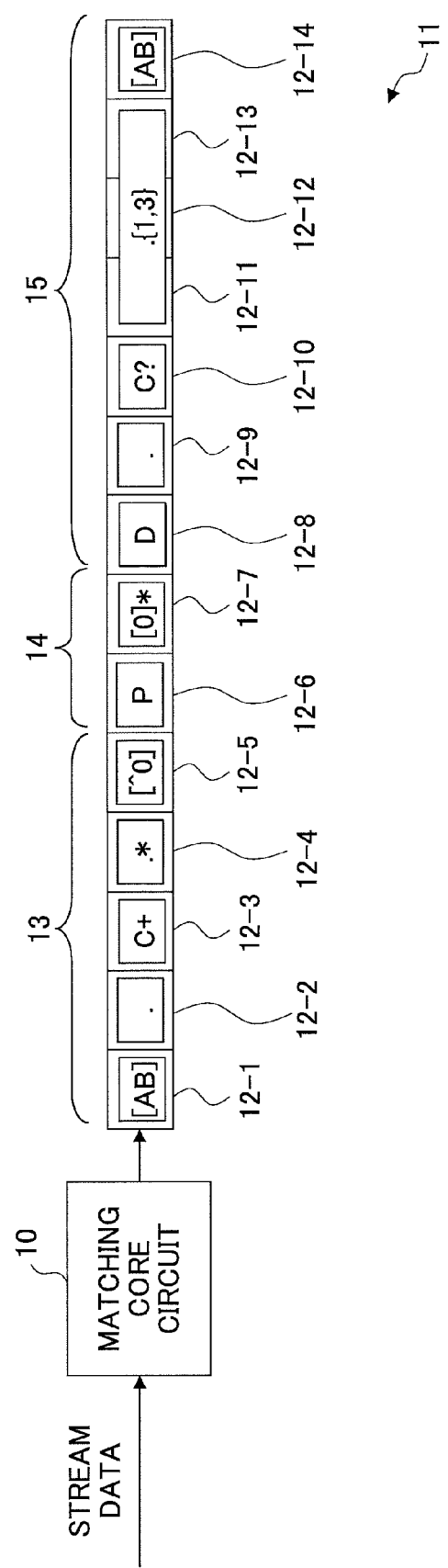
FIG. 1 is a drawing illustrating an example of the configuration of a matching circuit.

FIG. 1 is a drawing illustrating an example of the configuration of a matching circuit. The matching circuit illustrated in FIG. 1 includes a matching core circuit 10 and a pattern circuit line 11. The pattern circuit line 11 includes a plurality of pattern circuits 12-1 through 12-14, each of which matches supplied data against part of a regular expression pattern. The plurality of pattern circuits 12-1 through 12-14 are connected in series such that the pattern circuit at a given stage supplies, to the pattern circuit at the next following stage, the supplied data and the result of matching generated by the pattern circuit at the given stage.

The pattern circuits 12-1 through 12-5, for example, have regular expression pattern parts "[AB]", ".", "C+", ".*", and "[^0]" assigned thereto, respectively, and are configured to match the supplied data against these regular expression pattern parts. The matching core circuit 10 assigns the respective parts of the regular expression pattern to the pattern circuits 12-1 through 12-5. In this manner, the series-connected pattern circuits 12-1 through 12-5 perform matching with respect to the regular expression pattern "[AB].C+.*[^0]".

To be specific, the character string of a data stream to be matched are supplied on a character-by-character basis to the pattern circuit line at its start end where the pattern circuit 12-1 is situated wherein the pattern circuit line includes the pattern circuits 12-1 through 12-5. Each of the pattern circuits 12-1 through 12-5 matches in each cycle a character supplied thereto against the portion of the regular expression pattern assigned thereto. The first pattern circuit 12-1 matches a character currently supplied thereto against part of the regular expression pattern, followed by sending this character and the result of the matching to the pattern circuit 12-2 situated at the next stage. Any given circuit that is one of the next and subsequent pattern circuits 12-2 through 12-5 matches a character currently supplied thereto against part of the regular expression pattern, and generates, based on the result of the current matching and the result of matching supplied from the preceding stage, a collective result of matching for the first stage through the stage of the given circuit. The collective result of matching and the supplied character are sent to the pattern circuit at the next stage. The collective result of matching is set equal to a value indicative of a match upon the simultaneous occurrences of the condition that the result of matching supplied from the preceding stage indicates a match and the condition that the result of the current matching indicates a match. Otherwise, the collective result of matching is set equal to a value indicative of a mismatch. With this arrangement, the collective result of matching produced by the last-stage, fifth pattern circuit 12-5 indicates a match in a certain cycle when a character string matching the regular expression pattern shown in the above-noted expression (1) is supplied as an input.

As illustrated in FIG. 1, the plurality of pattern circuits 12-1 through 12-14 have first through third regular expression patterns 13 through 15 assigned thereto. In the pattern circuit line of the series-connected pattern circuits 12-1 through 12-14, the first regular expression pattern 13 is assigned to the N (N: positive integer, equal to 5 in this case) pattern circuits that are the pattern circuit 12-1 serving as a starting point through the N-th pattern circuit 12-5. Further, the second regular expression pattern 14 is assigned to the M (M: positive integer, equal to 2 in this case) pattern circuits that are the N+1-th pattern circuit 12-6 from the starting-point pattern circuit 12-1 through the N+M-th pattern circuit 12-7. Similarly, the third regular expression pattern 15 is assigned to the 7 pattern circuits that are the pattern circuit 12-8 through the pattern circuit 12-14.

The data to be matched propagate from the pattern circuit 12-1 to the pattern circuit 12-14. With this arrangement, first matching with respect to the first regular expression pattern 13, second matching with respect to the second regular expression pattern 14, and third matching with respect to the third regular expression pattern 15 are performed independently of each other. Namely, the first through third regular expression patterns 13 through 15 serve as three separate regular expression patterns subjected to separate matching, rather than matching being performed with respect to the whole regular expression pattern that is constituted by the respective parts assigned to the pattern circuits 12-1 through 12-14.

In order to achieve such an arrangement, the pattern circuit at the start point of each regular expression pattern sends to the next following stage the result of matching obtained by matching the data supplied from the immediately preceding stage against the part of the regular expression pattern assigned thereto, without using the result of matching generated by the immediately preceding stage. The pattern circuit 12-8 situated at the start point of the third regular expression pattern 15 (i.e., the pattern circuit to which the first part "D" of the third regular expression pattern 15 is assigned) is taken as an example. This pattern circuit 12-8 generates the result of matching, which is to be supplied to the pattern circuit 12-9 at the next following stage, in response to a result obtained by matching the data supplied from the preceding-stage pattern circuit 12-7 against the part "D" of the regular expression pattern, without relying on the result of matching supplied from the preceding-stage pattern circuit 12-7. The pattern circuit 12-9 generates the result of matching, which is to be supplied to the pattern circuit at the next following stage, in response to both the result of matching supplied from the preceding-stage pattern circuit 12-8 and a result obtained by matching the data supplied from the preceding-stage pattern circuit 12-8 against the part "." of the regular expression pattern. In so doing, the pattern circuit 12-9 generates the result of matching indicative of a match upon detecting the simultaneous occurrences of the condition that the result of matching supplied from the preceding stage indicates a match and the condition that the result of matching of the pattern circuit 12-9 (i.e., the result of matching between the supplied data and the part ".") indicates a match. Otherwise, the result of matching indicative of a mismatch is generated. In this manner, the first through third regular expression patterns 13 through 15 are subjected to matching as three separate, independent regular expression patterns.

In order to achieve the operation described above, each pattern circuit connected to the preceding-stage pattern circuit is configured to be settable to either a first operation mode or a second operation mode. In the first operation mode, the result of matching which is to be supplied to the next-stage pattern circuit is generated in response to both the result of matching supplied from the preceding-stage pattern circuit and a result obtained by matching the data supplied from the preceding-stage pattern circuit against part of the regular expression pattern. In the second operation mode, the result of matching which is to be supplied to the next-stage pattern circuit is generated in response to a result obtained by matching the data supplied from the preceding-stage pattern circuit against part of the regular expression pattern, without relying on the result of matching supplied from the preceding-stage pattern circuit.

FIG. 1 illustrates only the single pattern circuit line 11 that is connected to the single matching core circuit 10. For the purpose of performing matching with respect to a plurality of data streams (i.e., data streams to be matched), the matching circuit illustrated in FIG. 1 may be provided for each data stream. Alternatively, a plurality of matching core circuits may be connected to a single pattern circuit line. Further, the pattern circuits 12-1 through 12-14 may be connected in series to form a ring. Namely, the trailing-end pattern circuit of the pattern circuit line 11 may be connected to the starting-end pattern circuit such that the output of the pattern circuit 12-14 is input into the pattern circuit 12-1.

Figure 2:
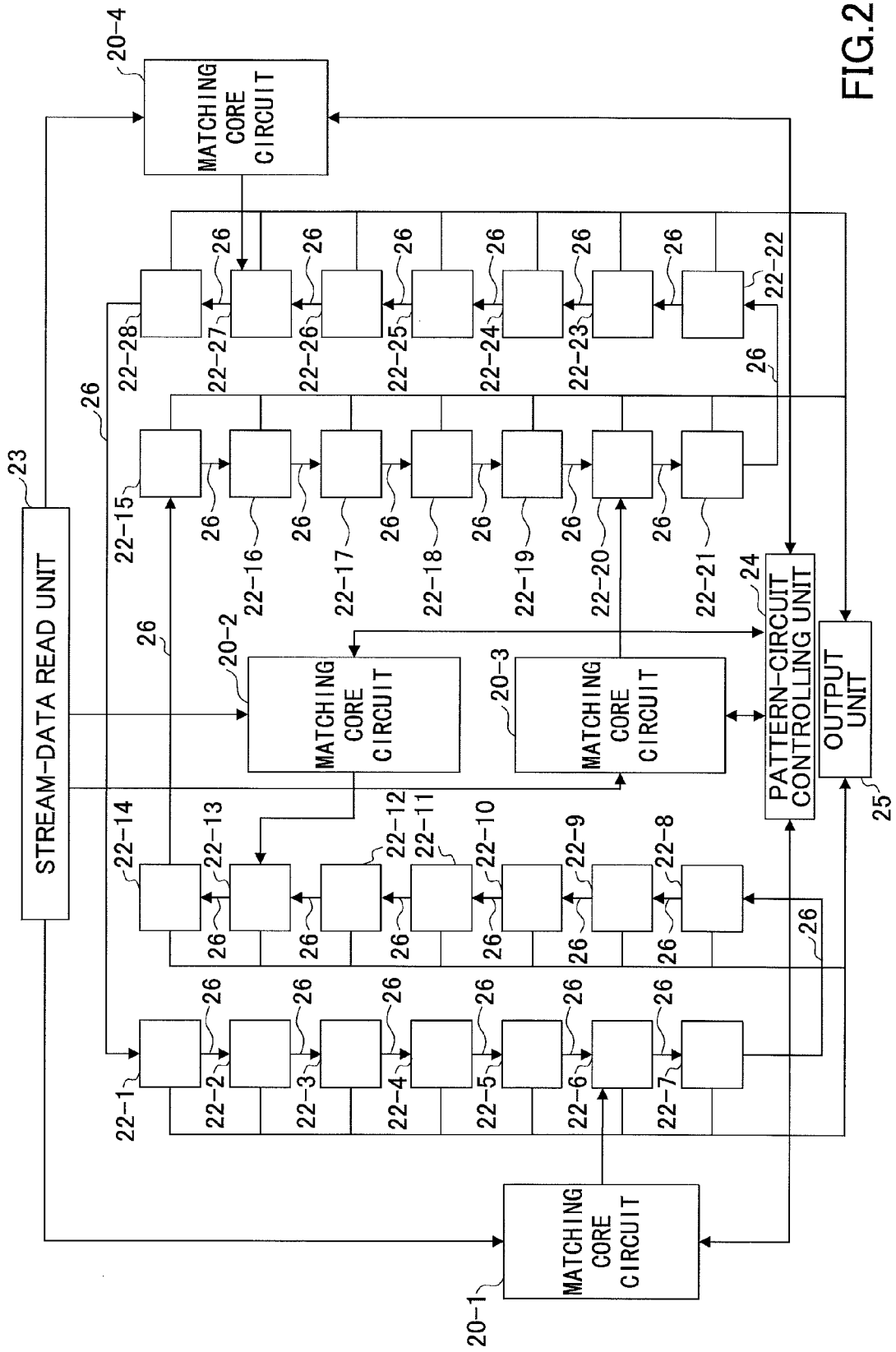
FIG. 2 is a drawing illustrating an example of the configuration of a matching circuit in which a plurality of matching core circuits are connected to a plurality of pattern circuits that are series-connected in a ring.

FIG. 2 is a drawing illustrating an example of the configuration of a matching circuit in which a plurality of matching core circuits are connected to a plurality of pattern circuits that are series-connected in a ring. In FIG. 2 and the subsequent drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The matching circuit illustrated in FIG. 2 includes matching core circuits 20-1 through 20-4, pattern circuits 22-1 through 22-28, a stream-data read unit 23, a pattern-circuit controlling unit 24, and an output unit 25. Each of the pattern circuits 22-1 through 22-28 match supplied data against part of a regular expression pattern, and has the same or similar function as each of the pattern circuits 12-1 through 12-14 described in connection with FIG. 1. The plurality of pattern circuits 22-1 through 22-28 are series-connected in a ring through a signal path 26 such that the pattern circuit at a given stage supplies, to the pattern circuit at the next following stage, the supplied data and the result of matching generated by the pattern circuit at the given stage. It may be noted that the ring shape is not essential. For example, the pattern circuit 22-19 and the pattern circuit 22-20 may not be connected to each other, such that a pattern circuit line having a starting end and a trailing end is formed. In the following, a description will be given of a circuit that is configured in a ring.

The matching core circuits 20-1 through 20-4 are connected to the corresponding pattern circuits 22-6, 22-13, 22-20, and 22-27, respectively, among the plurality of pattern circuits 22-1 through 22-28, and supply data to be matched to these respective, corresponding pattern circuits. The matching core circuit 20-1 supplies data to be matched, which propagates through the pattern circuits 22-6 through 22-19, for example, and is subjected to matching performed by at least one of the pattern circuits 22-6 through 22-19. The matching core circuit 20-2 supplies data to be matched, which propagates through the pattern circuits 22-13 through 22-26, for example, and is subjected to matching performed by at least one of the pattern circuits 22-13 through 22-26. The matching core circuit 20-3 supplies data to be matched, which propagates through the pattern circuits 22-20 through 22-28 and the pattern circuits 22-1 through 22-5, for example, and is subjected to matching performed by at least one of the pattern circuits 22-20 through 22-28 and the pattern circuits 22-1 through 22-5. The matching core circuit 20-4 supplies data to be matched, which propagates through the pattern circuits 22-27 through 22-28 and the pattern circuits 22-1 through 22-12, for example, and is subjected to matching performed by at least one of the pattern circuits 22-27 through 22-28 and the pattern circuits 22-1 through 22-12.

As was previously described, the matching circuit illustrated in FIG. 1 may be provided for each data stream in order to perform matching with respect to a plurality of data streams (i.e., data streams to be matched). In such a configuration, however, some pattern circuits in the pattern circuit line 11 may end up being unused because the number of regular expression patterns to be matched is small or the lengths of regular expression patterns are short with respect to a given data stream. While there is such a pattern circuit line 11 having redundancy, another pattern circuit line 11 for processing another data stream may suffer the insufficient number of pattern circuits because the number of regular expression patterns is large or the lengths of regular expression patterns are short.

In the configuration illustrated in FIG. 2, the pattern circuits 22-1 through 22-28 are series-connected (in a ring), and the matching core circuits 20-1 through 20-4 supply respective data to be matched to the respective, corresponding pattern circuits among the pattern circuits 22-1 through 22-28. For example, 10 pattern circuits may be needed in order to perform matching with respect to the first data to be matched that is supplied by the matching core circuit 20-1. In such a case, one or more regular expression patterns for the matching core circuit 20-1 may be assigned to the pattern circuits 22-6 through 22-15. In this case, 4 pattern circuits may be needed in order to perform matching with respect to the second data to be matched that is supplied by the matching core circuit 20-2. In such a case, one or more regular expression patterns for the matching core circuit 20-2 may be assigned to the pattern circuits 22-16 through 22-19. The three pattern circuits 22-13 through 22-15 that have the first data to be matched and the second data to be matched propagating therethrough may be configured to perform matching with respect to only the first data to be matched. These pattern circuits allow the second data to simply pass through because these pattern circuits do not perform matching with respect to the second data. The four pattern circuits 22-16 through 22-19 that have the first data to be matched and the second data to be matched propagating therethrough may be configured to perform matching with respect to only the second data to be matched. These pattern circuits allow the first data to simply pass through because these pattern circuits do not perform matching with respect to the first data. Such selective matching can be implemented by use of time-division-multiplex matching or by use of a plurality of signal processing paths between pattern circuits as will be described later.

Although only the matching core circuits 20-1 and 20-2 have been described above as examples, similar settings may be made to other matching core circuits. It may be noted, however, that it is desirable to avoid a situation in which the data to be matched that is supplied by the matching core circuit 20-1, for example, propagates indefinitely through the loop constituted by the pattern circuits 22-1 through 22-28. In the above-noted example, thus, the first data to be matched that is supplied from the matching core circuit 20-1 may be disposed of at a point between the pattern circuits 22-19 and 22-20. Namely, provision may be made such that any given data to be matched is disposed of after propagating through the pattern circuits that are situated in the sections covered by two matching core circuits (i.e., the 14 pattern circuits in the example illustrated in FIG. 2). In this case, any given pattern circuit has two data to be matched propagating therethrough that are supplied by two respective matching core circuits at the maximum.

In the above description, any given matching core circuit can assign a regular expression pattern, to be matched against data supplied by this given matching core circuit, to the pattern circuits that are situated in the sections covered by two matching core circuits (i.e., the 14 pattern circuits in the example illustrated in FIG. 2). Namely, any given pattern circuit has two data to be matched propagating therethrough that are supplied by two respective matching core circuits at the maximum. This is only an example, and is not intended to be limiting. For example, any given matching core circuit may assign a regular expression pattern, to be matched against data supplied by this given matching core circuit, to the pattern circuits that are situated in the sections covered by three matching core circuits (i.e., the 21 pattern circuits in the example illustrated in FIG. 2). Namely, any given pattern circuit may have three data to be matched propagating therethrough that are supplied by three respective matching core circuits at the maximum.

In FIG. 2, the stream-data read unit 23 supplies respective data streams (i.e., data to be matched) to the matching core circuits 20-1 through 20-4. The pattern-circuit controlling unit 24 has information indicating which pattern circuits are already in use (i.e., already has part of a regular expression pattern assigned thereto), and decides which pattern circuits are assigned to which matching core circuits. Under the control of the pattern-circuit controlling unit 24, the matching core circuits 20-1 through 20-4 assign parts of regular expression patterns to the pattern circuits 22-1 through 22-28. The output unit 25 receives results of matching from the pattern circuits 22-1 through 22-28 to check whether supplied data are in agreement with regular expression patterns. In the example illustrated in FIG. 1, for example, the result of matching produced by the last-stage pattern circuit 12-5 indicates a match in a certain cycle when a character string matching the first regular expression pattern 13 is supplied as an input. Similarly, in the configuration illustrated in FIG. 2, the result of matching produced by the last stage of the pattern circuits to which a regular expression pattern is set indicates a match in a certain cycle when a character string matching this regular expression pattern is supplied as an input. The output unit 25 monitors the result of matching output from each of the pattern circuits 22-1 through 22-28 to check whether data to be matched are in agreement with regular expression patterns.

Figure 3:
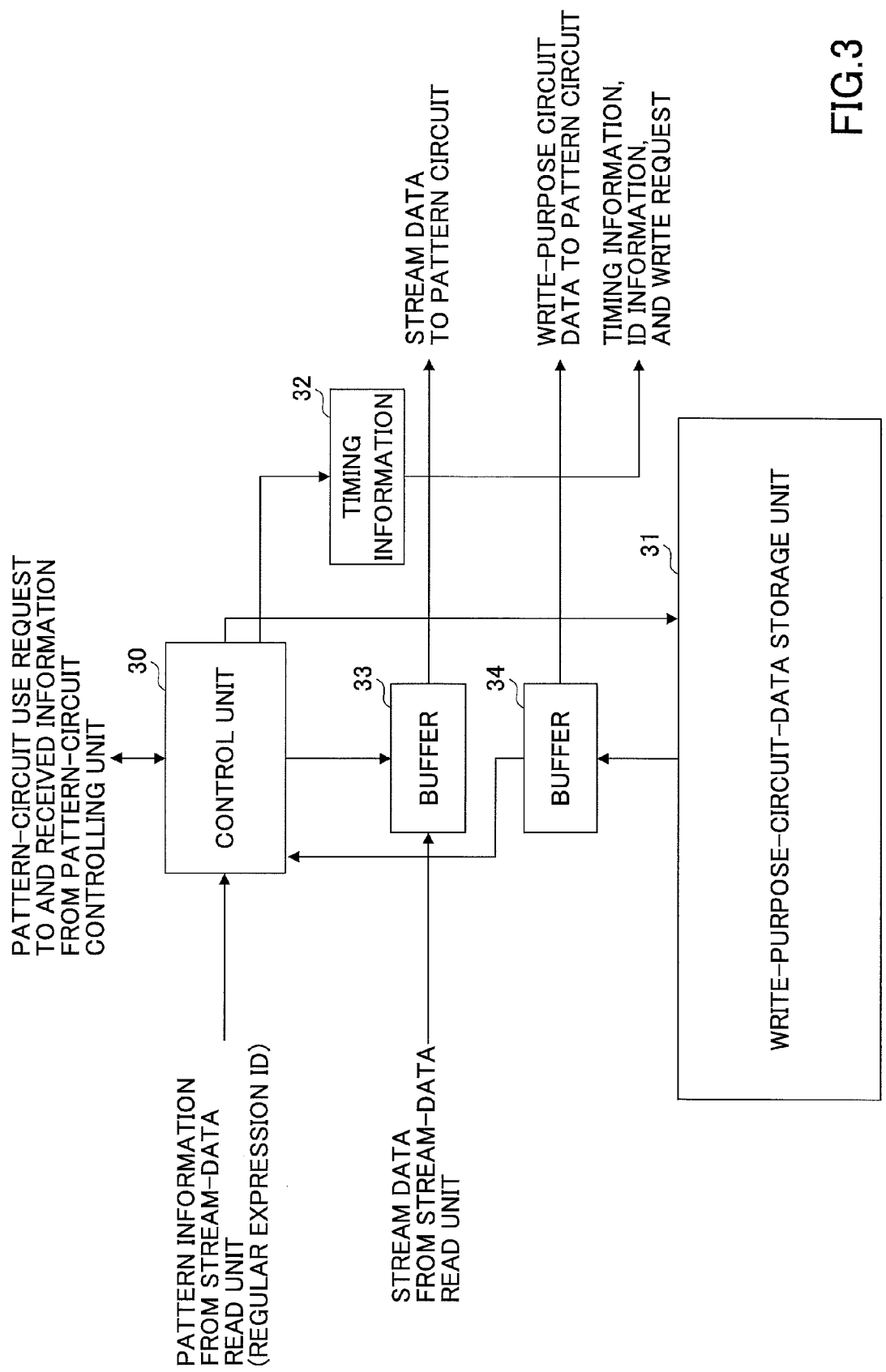
FIG. 3 is a drawing showing an example of the configuration of a matching core circuit.

FIG. 3 is a drawing showing an example of the configuration of a matching core circuit. The matching core circuits illustrated in FIG. 2 may have the configuration illustrated in FIG. 3. The matching core circuit illustrated in FIG. 3 includes a control unit 30, a write-purpose-circuit-data storage unit 31, a timing-information supplying unit 32, a buffer 33, and a buffer 34. The control unit 30 transmits a pattern-circuit use request to the pattern-circuit controlling unit 24 (see FIG. 2), and receives information about available pattern circuits from the pattern-circuit controlling unit 24. The control unit 30 receives identification information (i.e., regular expression pattern ID) for identifying a regular expression pattern from the stream-data read unit 23 (see FIG. 2), and reads write-purpose circuit data corresponding to the identification information from the write-purpose-circuit-data storage unit 31. The write-purpose circuit data is configuration data that causes pattern circuits to perform matching corresponding to respective parts of a regular expression pattern that is indicated by the identification information. This configuration data is supplied to each pattern circuit through the buffer 34. When transmitting configuration data corresponding to a part of a regular expression pattern, the control unit 30 supplies, through the timing-information supplying unit 32, timing information, write-destination ID information, and a write request corresponding to the configuration data. The write-destination ID information serves to identify a write-destination pattern circuit (i.e., the pattern circuit to which the data is written). The control unit 30 receives information indicating which pattern circuit is the write-destination pattern circuit from the pattern-circuit controlling unit 24 responding to the pattern-circuit-use request.

Upon receiving the write request, the pattern circuit having the ID that matches the write-destination ID information writes, to the memory in an internal matching circuit, the configuration data received with the write-destination ID information matching its ID. Further, this pattern circuit sets the timing information received with the ID information to an internal timing circuit. Setting made to the timing circuit serves to control which one of first data to be matched and second data to be matched is subjected to matching when the first data to be matched and the second data to be matched are supplied, for example.

The control unit 30 controls the buffer 33 to supply, to each pattern circuit at appropriate timing (i.e., in an appropriate operation cycle), the data to be matched supplied from the stream-data read unit 23 (see FIG. 2). With this arrangement, each pattern circuit matches the supplied data against part of the desired regular expression pattern, so that the entirety of a plurality of pattern circuits performs matching with respect to the desired regular expression pattern.

Figure 4:
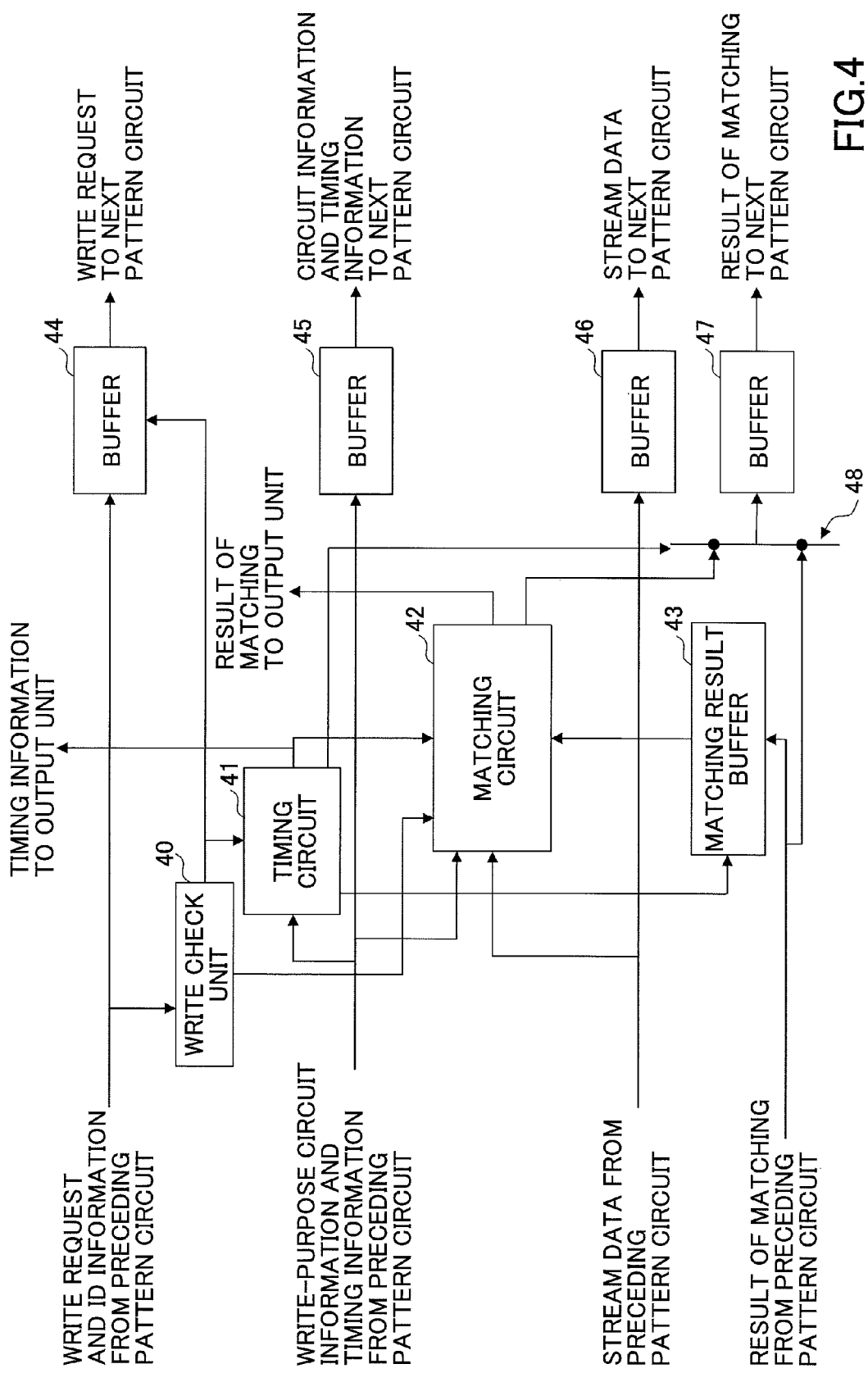
FIG. 4 is a drawing showing an example of the configuration of a pattern circuit.

FIG. 4 is a drawing showing an example of the configuration of a pattern circuit. The pattern circuits illustrated in FIG. 2 that are not connected to a matching core circuit may have the configuration illustrated in FIG. 4. The pattern circuit illustrated in FIG. 4 includes a write check unit 40, a timing circuit 41, a matching circuit 42, a matching result buffer 43, buffers 44 through 47, and a selector 48. The matching core circuit illustrated in FIG. 3 supplies configuration data, timing information, write-destination ID information, and a write request to the pattern circuit connected thereto. These data items then propagate through a line of pattern circuits that is series-connected to this pattern circuit. Upon receiving the write request and the write-destination ID information from a preceding-stage pattern circuit, the write check unit 40 checks whether the write-destination ID information matches the ID of the local pattern circuit. Upon detecting an ID match, the write check unit 40 sends a write request to the timing circuit 41 and the matching circuit 42.

In response to the write request, the timing circuit 41 stores therein the timing information supplied from the preceding-stage pattern circuit. With this arrangement, the timing circuit 41 controls the matching operation of the matching circuit 42 such that the matching circuit 42 performs matching for proper data to be matched. In response to the write request, the matching circuit 42 stores therein the write-purpose circuit data, i.e., configuration data, that is supplied from the preceding-stage pattern circuit. With this arrangement, the matching circuit 42 matches the supplied data against the part of the regular expression pattern that corresponds to the configuration data. The data to be matched is supplied to the matching circuit 42 as a data stream on a character-by-character basis from the preceding-stage pattern circuit.

The matching circuit 42 is configured to operate either in a first operation mode or in a second operation mode in response to the configuration data. In the first operation mode, the result of matching which is to be supplied to the next-stage pattern circuit is generated in response to both the result of matching supplied from the preceding-stage pattern circuit and a result obtained by matching the data supplied from the preceding-stage pattern circuit against part of the regular expression pattern. In the second operation mode, the result of matching which is to be supplied to the next-stage pattern circuit is generated in response to a result obtained by matching the data supplied from the preceding-stage pattern circuit against part of the regular expression pattern, without relying on the result of matching supplied from the preceding-stage pattern circuit. The result of matching generated by the matching circuit 42 is supplied to the output unit 25 (see FIG. 2). At this time, the timing circuit 41 also supplies the timing information to the output unit 25. It may be noted that the result of matching supplied from the preceding-stage pattern circuit is stored in the matching result buffer 43, and, then, is supplied from the matching result buffer 43 to the matching circuit 42.

The write request information and the write-destination ID information supplied from the preceding-stage pattern circuit are supplied through the buffer 44 to the next-stage pattern circuit. The write-purpose circuit data and the timing information supplied from the preceding-stage pattern circuit are supplied through the buffer 45 to the next-stage pattern circuit. The data to be matched (i.e., stream data) supplied from the preceding-stage pattern circuit is supplied through the buffer 46 to the next-stage pattern circuit. The selector 48 selects either the result of matching obtained by the matching circuit 42 or the result of matching supplied from the preceding-stage pattern circuit in response to an instruction from the timing circuit 41, followed by supplying the selected result to the next-stage pattern circuit through the buffer 47.

The pattern circuit illustrated in FIG. 4 is of a time-division-multiplex type, and performs matching only in one operation cycle among a predetermined number of consecutive operation cycles. Each part of the matching circuit illustrated in FIG. 2 performs a predetermined operation in each clock cycle in synchronization with a common clock signal, so that matching is performed. In the case of the time-division-multiplex-type pattern circuit, a predetermined number of consecutive pattern circuits (i.e., the pattern circuits for performing matching with respect to the same data to be matched) among the pattern circuits 22-1 through 22-28 illustrated in FIG. 2 perform matching in respective, different operation cycles among the predetermined number of consecutive operation cycles.

The predetermined number of consecutive operation cycles may be two consecutive operation cycles. In this case, a pattern circuit performs matching either in an even-numbered cycle or in an odd-numbered cycle.

In an illustrative example, the pattern circuits 22-13 through 22-19 in FIG. 2 may receive first data to be matched from the matching core circuit 20-1 and second data to be matched from the matching core circuit 20-2. In this case, provision is made such that the matching core circuit 20-1 sends out the first data to be matched in an even-numbered cycle, and, also, the matching core circuit 20-2 sends out the second data to be matched in an even-numbered cycle. With this arrangement, the pattern circuit 22-14, for example, receives the first data to be matched in an even-numbered cycle and the second data to be matched in an odd-numbered cycle. Further, the pattern circuit 22-15 at the next following stage receives the first data to be matched in an odd-numbered cycle and the second data to be matched in an even-numbered cycle. With the timing circuit 41 controlling whether an even-numbered cycle or an odd-numbered cycle is the cycle in which the matching circuit 42 performs matching in a time-division-multiplex pattern circuit, matching can be performed with respect to a desired one of the first data to be matched and the second data to be matched. Namely, each pattern circuit performs matching only in one operation cycle among a predetermined number (i.e., 2 in this example) of consecutive operation cycles. A predetermined number (i.e., 2) of consecutive pattern circuits (i.e., the pattern circuits for performing matching with respect to the same data to be matched) among the pattern circuits 22-1 through 22-28 perform matching in respective, different operation cycles among the predetermined number (i.e., 2) of consecutive operation cycles.

The predetermined number of consecutive operation cycles described above may be any number, and is not limited to two operation cycles. For example, provision may be made such that one pattern circuit receives first through third data to be matched, and performs matching only in one operation cycle among three consecutive operation cycles. In this case, three consecutive pattern circuits (i.e., the pattern circuits for performing matching with respect to the same data to be matched) among the pattern circuits 22-1 through 22-28 perform matching in respective, different operation cycles among three consecutive operation cycles.

Figure 5:
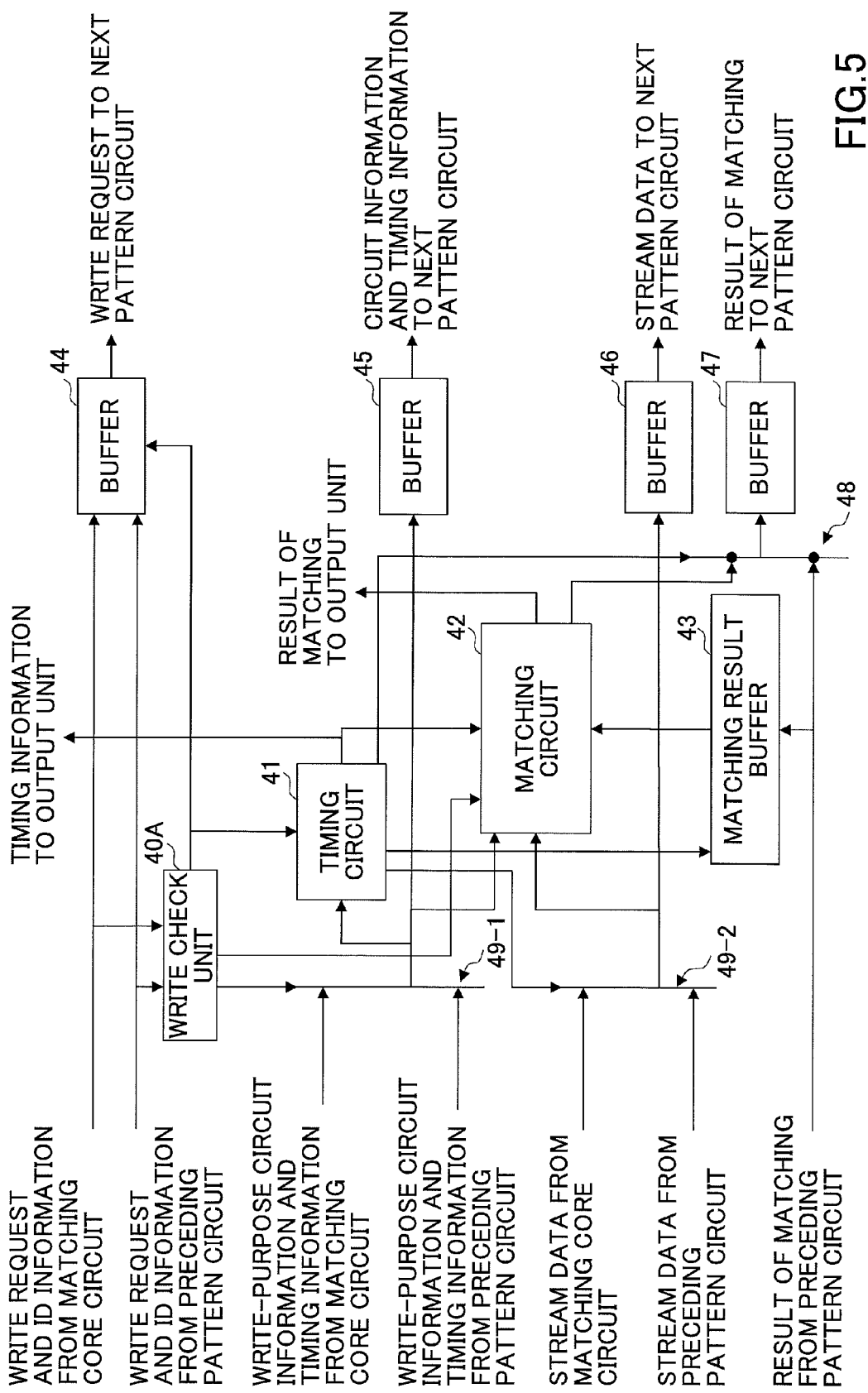
FIG. 5 is a drawing showing an example of the configuration of a pattern circuit.

FIG. 5 is a drawing showing an example of the configuration of a pattern circuit. The pattern circuits illustrated in FIG. 2 that are connected to a matching core circuit may have the configuration illustrated in FIG. 5. In FIG. 5, the same or corresponding elements as those of FIG. 4 are referred to by the same or corresponding numerals, and a description thereof will be omitted as appropriate. The pattern circuit illustrated in FIG. 5 includes a write check unit 40A, a timing circuit 41, a matching circuit 42, a matching result buffer 43, buffers 44 through 47, a selector 48, and selectors 49-1 and 49-2.

The pattern circuit illustrated in FIG. 5 is not only connected to the preceding-stage pattern circuit but also connected to a matching core circuit, so that the write check unit 40A receives write-destination ID information and a write request from both the preceding-stage pattern circuit and the matching core circuit. Upon receiving a write request from the preceding-stage pattern circuit, the write check unit 40A uses the selector 49-1 to select write-purpose circuit data (i.e., configuration data) and timing information that are supplied from the preceding-stage pattern circuit. Upon receiving a write request from the matching core circuit, the write check unit 40A uses the selector 49-1 to select write-purpose circuit data (i.e., configuration data) and timing information that are supplied from the matching core circuit. The write check unit 40A also selects the inputs into the buffer 44 in a similar manner. With this arrangement, proper settings are made to the timing circuit 41, the matching circuit 42, and the buffer 44, depending on whether the write request comes from the preceding-stage pattern circuit or from the matching core circuit.

At the time of a matching operation, the timing circuit 41 uses the selector 49-2 to select either the data to be matched from the matching core circuit or the data to be matched from the preceding-stage pattern circuit, thereby supplying the selected data to the matching circuit 42. With this arrangement, the matching circuit 42 performs matching with respect to appropriate data to be matched.

Figure 6:
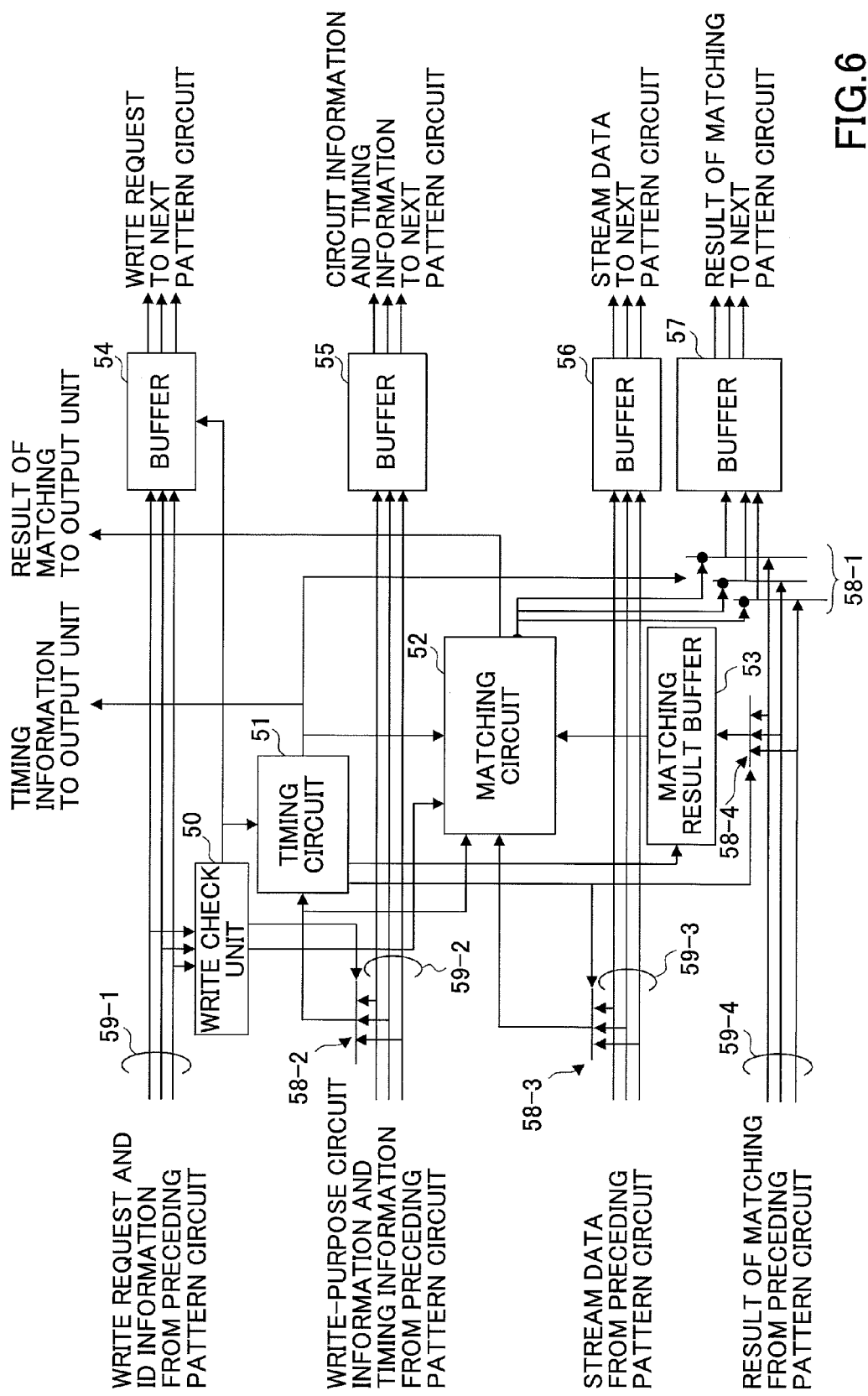
FIG. 6 is a drawing showing another example of the configuration of a pattern circuit.

FIG. 6 is a drawing showing another example of the configuration of a pattern circuit. The pattern circuits illustrated in FIG. 2 that are not connected to a matching core circuit may have the configuration illustrated in FIG. 6. The pattern circuit illustrated in FIG. 6 includes a write check unit 50, a timing circuit 51, a matching circuit 52, a matching result buffer 53, buffers 54 through 57, and selectors 58-1 through 58-4. The pattern circuit illustrated in FIG. 6 may perform matching in all operation cycles.

The pattern circuit illustrated in FIG. 6 is of a multi-line type. In this pattern circuit, a plurality of parallel signal lines are provided for connecting between pattern circuits to transmit a plurality of data of the same type originating from a plurality of matching core circuits. As was previously described, the matching core circuit illustrated in FIG. 3 supplies configuration data, timing information, write-destination ID information, and a write request to the pattern circuit connected thereto. These data items then propagate through a line of pattern circuits that is series-connected to this pattern circuit. In the design in which data from three matching core circuits propagate through pattern circuits in parallel, for example, three signal lines (i.e., three sets of signal lines) for transmitting data of the same type are provided as in the case of signal lines 59-1 through 59-4 illustrated in FIG. 6.

Upon receiving three sets of a write request and write-destination ID information from a preceding-stage pattern circuit, the write check unit 50 checks whether the write-destination ID information of any one of these sets matches the ID of the local pattern circuit. Upon detecting an ID match, the write check unit 50 sends a write request to the timing circuit 51 and the matching circuit 52, and requests the selector 58-2 to select the write-purpose circuit data and the timing information that belong to the set for which the ID match is detected. In response to the write request, the timing circuit 51 stores therein the timing information supplied from the preceding-stage pattern circuit. With this arrangement, the timing circuit 51 causes the selector 58-3 to select the data to be matched by the matching circuit 52 such that the matching circuit 52 performs matching for proper data to be matched. In response to the write request, the matching circuit 52 stores therein the write-purpose circuit data, i.e., configuration data, that is supplied from the preceding-stage pattern circuit. With this arrangement, the matching circuit 52 matches the supplied data against the part of the regular expression pattern that corresponds to the configuration data. The data to be matched is supplied through the selector 58-3 to the matching circuit 52 as a data stream on a character-by-character basis from the preceding-stage pattern circuit.

The matching circuit 52 is configured to operate either in the first operation mode or in the second operation mode in response to the configuration data. In the first operation mode, the result of matching which is to be supplied to the next-stage pattern circuit is generated in response to both the result of matching supplied from the preceding-stage pattern circuit and a result obtained by matching the data supplied from the preceding-stage pattern circuit against part of the regular expression pattern. In the second operation mode, the result of matching which is to be supplied to the next-stage pattern circuit is generated in response to a result obtained by matching the data supplied from the preceding-stage pattern circuit against part of the regular expression pattern, without relying on the result of matching supplied from the preceding-stage pattern circuit. Among the results of matching supplied from the preceding-stage pattern circuit, the result of matching corresponding to the data to be matched is supplied to the matching result buffer 53 through the selector 58-4 controlled by the timing circuit 51, and is then supplied from the matching result buffer 53 to the matching circuit 52. The result of matching generated by the matching circuit 52 is supplied to the output unit 25 (see FIG. 2). At this time, the timing circuit 51 also supplies the timing information to the output unit 25.

The write request information and the write-destination ID information supplied from the preceding-stage pattern circuit are supplied through the buffer 54 to the next-stage pattern circuit. The write-purpose circuit data and the timing information supplied from the preceding-stage pattern circuit are supplied through the buffer 55 to the next-stage pattern circuit. The data to be matched (i.e., stream data) supplied from the preceding-stage pattern circuit is supplied through the buffer 56 to the next-stage pattern circuit. The selector 58-1 selects either the result of matching obtained by the matching circuit 52 or the result of matching supplied from the preceding-stage pattern circuit in response to an instruction from the timing circuit 51, followed by supplying the selected result to the next-stage pattern circuit through the buffer 57.

Figure 7:
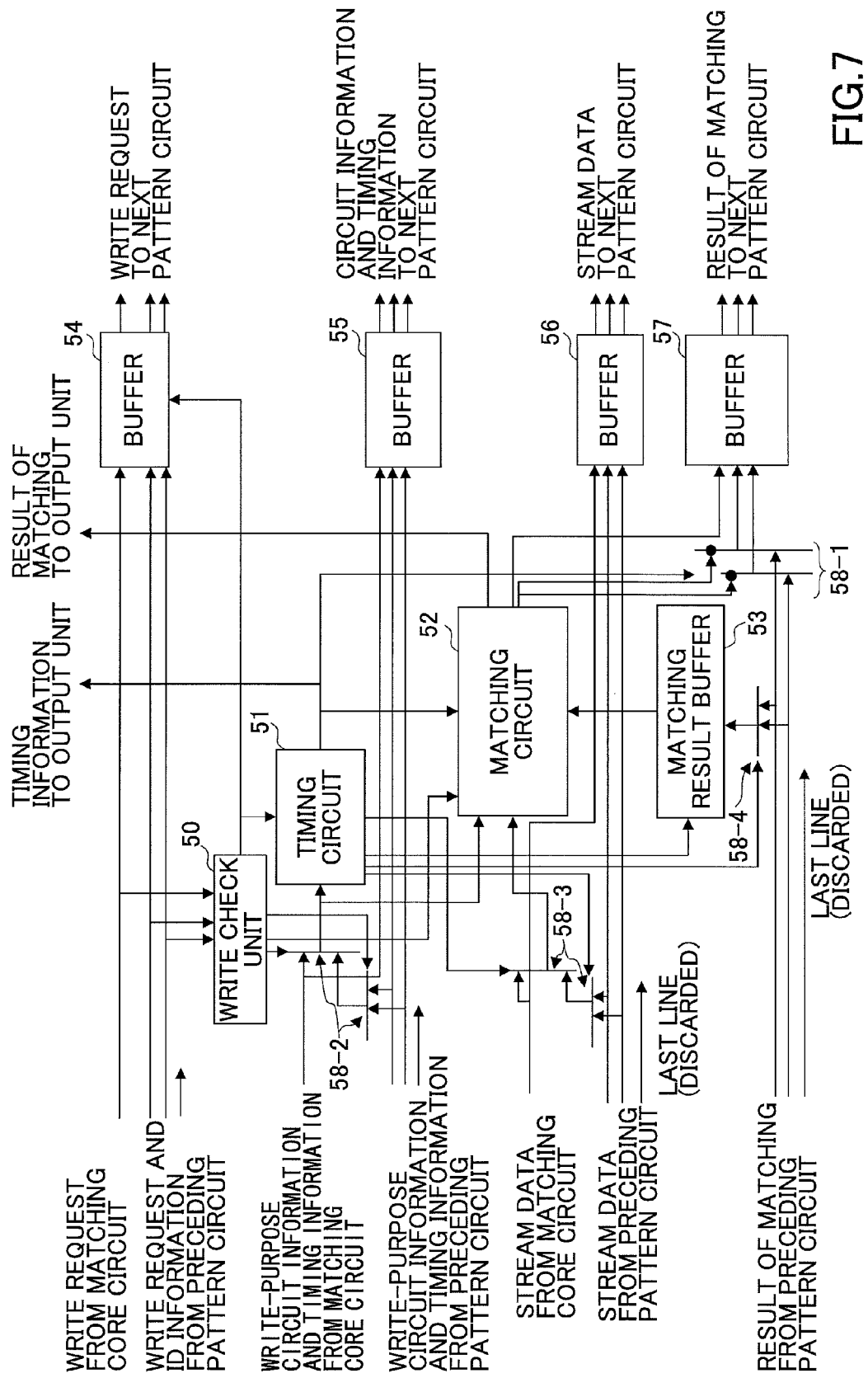
FIG. 7 is a drawing showing another example of the configuration of a pattern circuit.

FIG. 7 is a drawing showing another example of the configuration of a pattern circuit. The pattern circuits illustrated in FIG. 2 that are connected to a matching core circuit may have the configuration illustrated in FIG. 7. In FIG. 7, the same or corresponding elements as those of FIG. 6 are referred to by the same or corresponding numerals, and a description thereof will be omitted as appropriate. The pattern circuit illustrated in FIG. 7 has a configuration and operation that are basically the same as or similar to those of the pattern circuit illustrated in FIG. 6. It may be noted, however, that one set among the three sets of signals (e.g., the write-purpose circuit data and the timing information) supplied from the preceding-stage pattern circuit is not used and is disposed of. One set that is to be processed by the local pattern circuit is selected from the two sets of signals that are left without being disposed of and one set of signals supplied from the matching core circuit.

Figure 8:
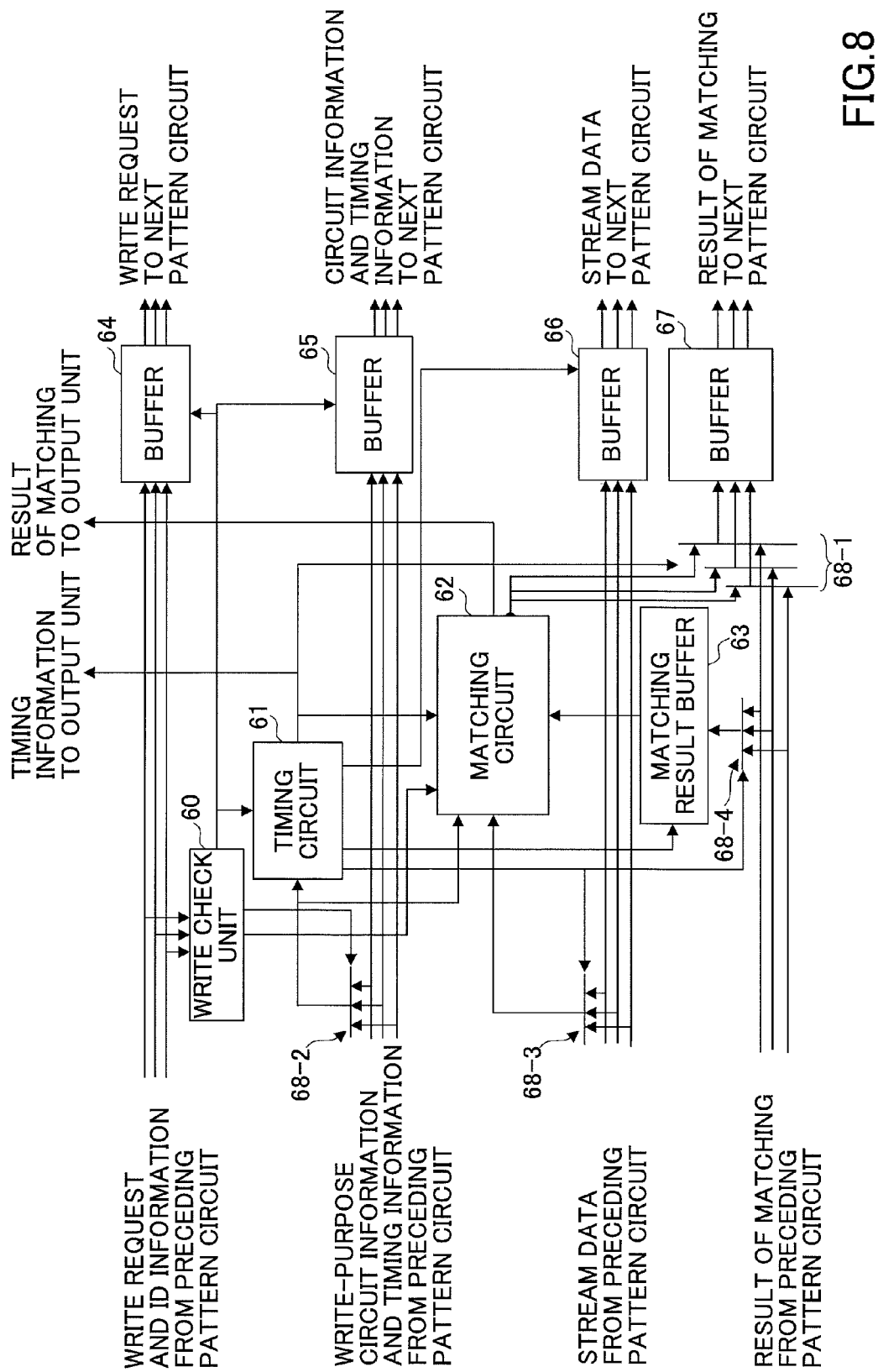
FIG. 8 is a drawing showing another example of the configuration of a pattern circuit.

FIG. 8 is a drawing showing another example of the configuration of a pattern circuit. The pattern circuits illustrated in FIG. 2 that are not connected to a matching core circuit may have the configuration illustrated in FIG. 8. The pattern circuit illustrated in FIG. 8 includes a write check unit 60, a timing circuit 61, a matching circuit 62, a matching result buffer 63, buffers 64 through 67, and selectors 68-1 through 68-4. The pattern circuit illustrated in FIG. 8 has the same or similar configuration as the pattern circuit illustrated in FIG. 6. Each part of the pattern circuit illustrated in FIG. 8 performs the same or similar operation as a corresponding unit of the pattern circuit illustrated in FIG. 6.

It may be noted, however, that the pattern circuit illustrated in FIG. 8 is of a multi-line-&-time-division-multiplex type, and performs matching only in one operation cycle among a predetermined number of consecutive operation cycles. Each part of the matching circuit illustrated in FIG. 2 performs a predetermined operation in each clock cycle in synchronization with a common clock signal, so that matching is performed. In the case of the multi-line-&-time-division-multiplex-type pattern circuit, a predetermined number of consecutive pattern circuits (i.e., the pattern circuits for performing matching with respect to the same data to be matched) among the pattern circuits 22-1 through 22-28 illustrated in FIG. 2 perform matching in respective, different operation cycles among the predetermined number of consecutive operation cycles. With this arrangement, the use of three sets of parallel multi-lines and two-cycle (i.e., an even-numbered cycle and an odd-numbered cycle) time division multiplex makes it possible to perform selective matching with respect to data supplied from 6 (=3×2) different matching core circuits. The operations of each unit of the multi-line type and the operations of each unit of the time-division-multiplex type are the same as or similar to the operations of the previously described pattern circuits, and a description thereof will be omitted.

Figure 9:
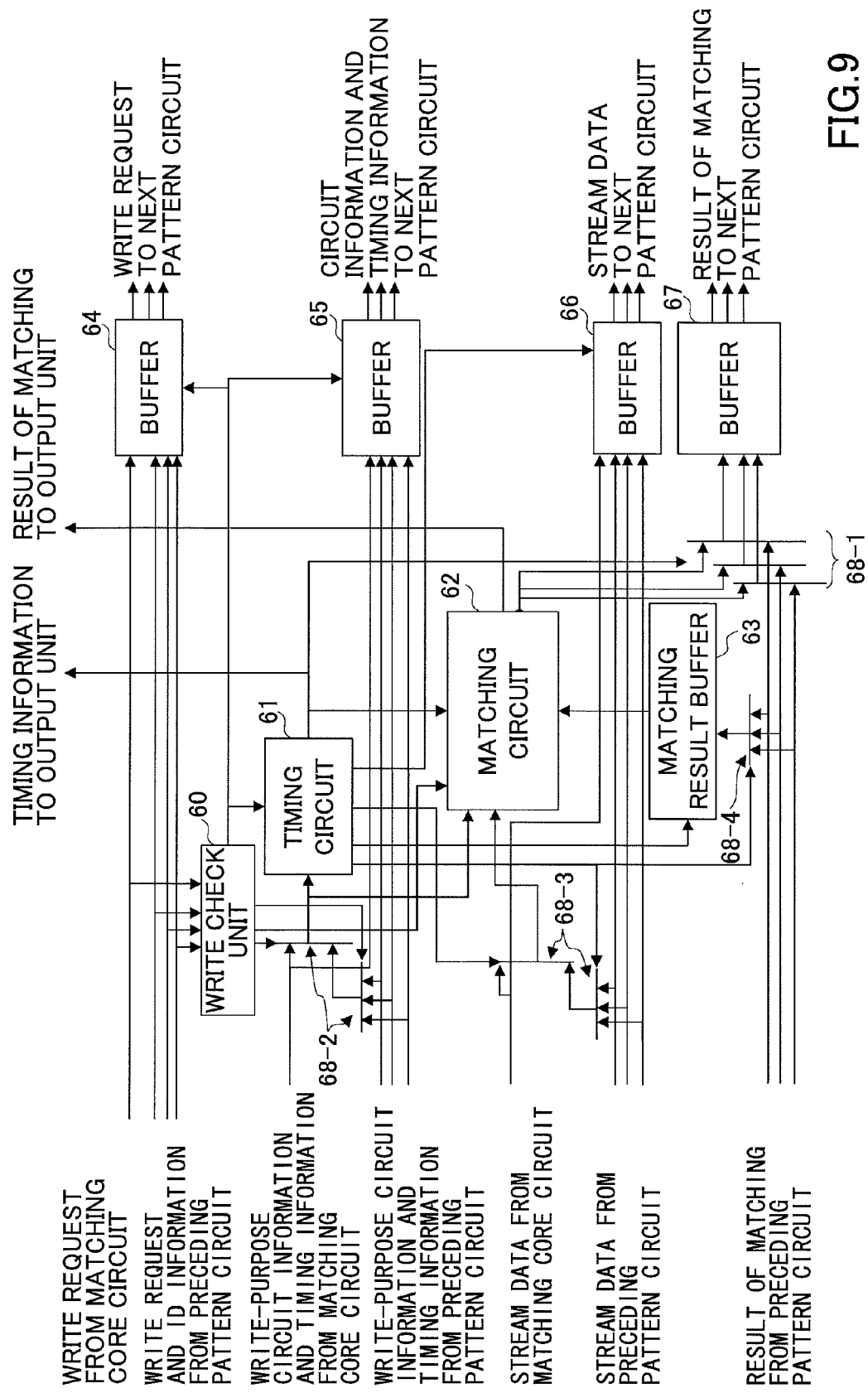
FIG. 9 is a drawing showing another example of the configuration of a pattern circuit.

FIG. 9 is a drawing showing another example of the configuration of a pattern circuit. The pattern circuits illustrated in FIG. 2 that are connected to a matching core circuit may have the configuration illustrated in FIG. 9. In FIG. 9, the same or corresponding elements as those of FIG. 8 are referred to by the same or corresponding numerals, and a description thereof will be omitted as appropriate. The pattern circuit illustrated in FIG. 9 has a configuration and operation that are basically the same as or similar to those of the pattern circuit illustrated in FIG. 8. However, data selected by the pattern circuit includes data supplied from the matching core circuit that is directly connected to the pattern circuit. In the pattern circuit illustrated in FIG. 7, all the data of the last lines are disposed of. In the pattern circuit illustrated in FIG. 9, on the other hand, the data of the last lines originate from T (T: number of time division multiplexed channels) matching core circuits, so that all the data of these lines cannot be disposed of. A selecting operation by the timing circuit 61 disposes of one signal, without utilizing this signal, among the T×3 signals supplied from the preceding-stage pattern circuit, and inserts the signal from the directly connected matching core circuit into the position where the discarded signal was situated.

Figure 10:
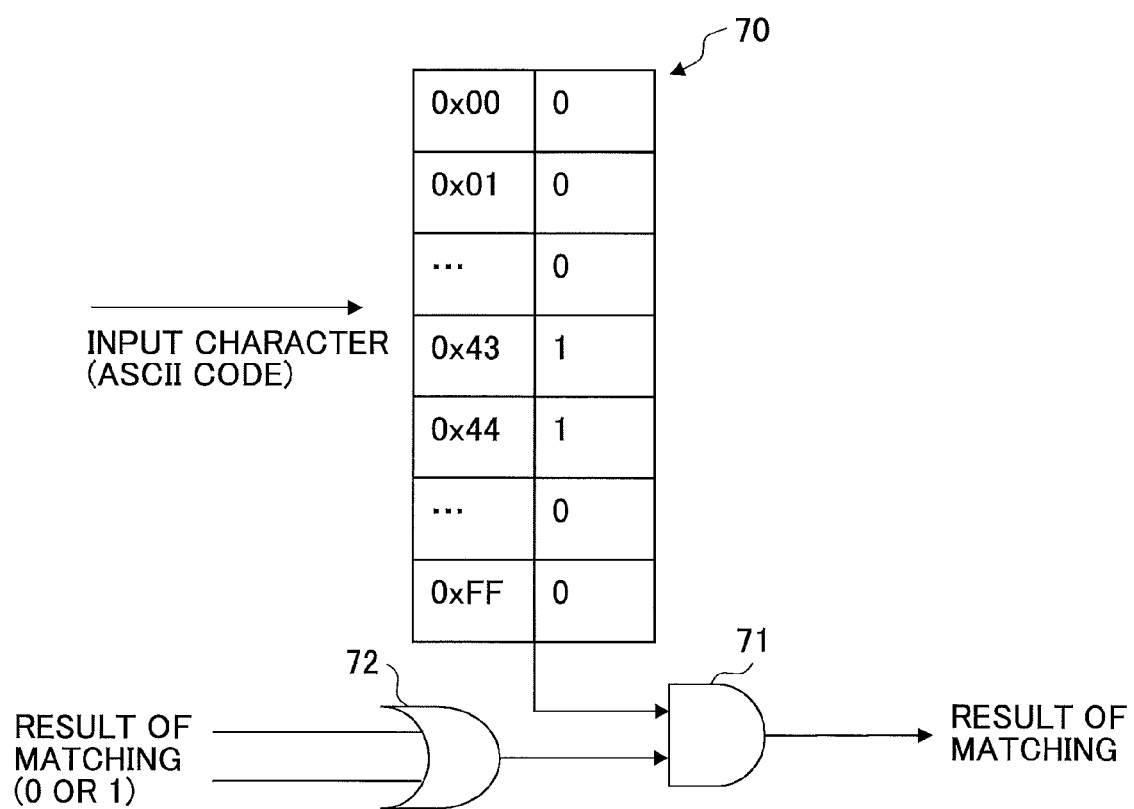
FIG. 10 is a drawing showing an example of the configuration of a matching circuit provided in a pattern circuit.

FIG. 10 is a drawing showing an example of the configuration of a matching circuit provided in a pattern circuit. The matching circuit illustrated in FIG. 10 includes a memory circuit 70, an AND gate 71, and an OR gate 72. The memory circuit 70 is a RAM (random access memory) or the like. Either the logic value "0" or the logic value "1" is stored at addresses 0x00 through 0xFF expressed in hexadecimal. In the memory circuit 70 of this example, the logic value "1" is stored at addresses 0x43 and 0x44, and the logic value "0" is stored at other addresses. Supplying an ASCII-code character provided as the data to be matched to the memory circuit 70 as an address results in the logic value "1" or "0" being read from the specified address. In the example illustrated in FIG. 10, the memory circuit 70 outputs the logic value "1" upon receiving an ASCII-code character having a value of 0x43 or 0x44 (i.e., "C" or "D") as the data to be matched. Provision of other characters as data to be matched causes the memory circuit 70 to output the logic value "0".

As was previously described, the matching circuit is configured to operate either in a first operation mode or in a second operation mode in response to the configuration data. In the first operation mode, one of the two inputs of the OR gate 72 is fixed at "0". In this case, the AND gate 71 receives at one input thereof, through the matching result buffer and the OR gate 72, the result of matching supplied from the preceding-stage pattern circuit. The AND gate 71 obtains a logical product between the result of matching from the preceding-stage pattern circuit and the logic value output from the memory circuit 70. The obtained result is output as the result of matching obtained by the matching circuit. Namely, in the first operation mode, the result of matching which is to be supplied to the next-stage pattern circuit is generated in response to both the result of matching supplied from the preceding-stage pattern circuit and the result obtained by matching the data supplied from the preceding-stage pattern circuit against part of the regular expression pattern.

In the second operation mode, one of the two inputs of the OR gate 72 is fixed at "1". In this case, the AND gate 71 outputs the logic value output from the memory circuit 70 as the result of matching. Namely, in the second operation mode, the result of matching which is to be supplied to the next-stage pattern circuit is generated in response to the result (i.e., the output of the memory circuit 70) obtained by matching the supplied data against part of the regular expression pattern, without relying on the result of matching supplied from the preceding-stage pattern circuit.

Figure 11:
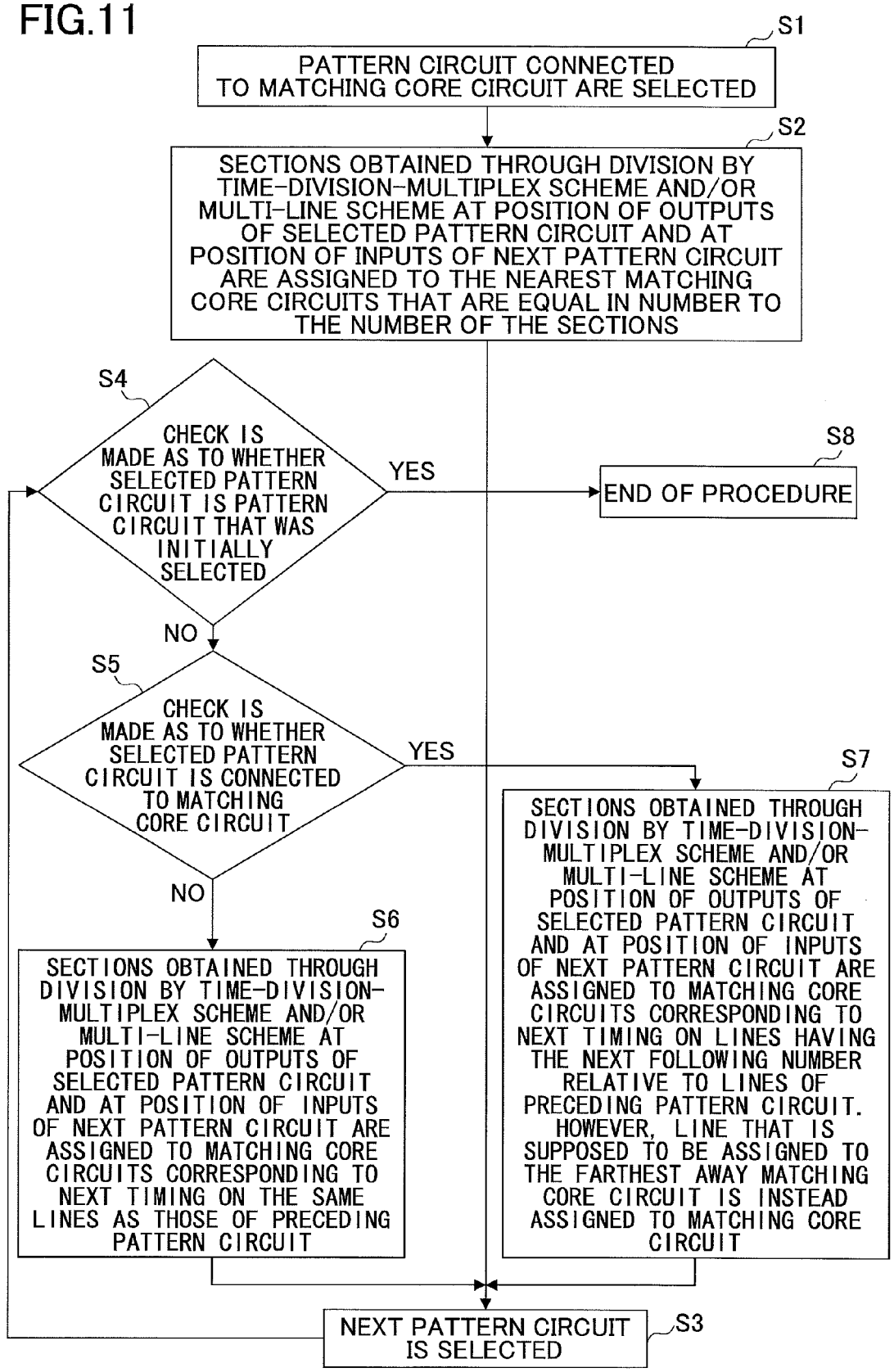
FIG. 11 is a flowchart illustrating a procedure for configuring a pre-assignment at the time of designing a matching circuit.

FIG. 11 is a flowchart illustrating a procedure for configuring a pre-assignment at the time of designing a matching circuit. This procedure is performed by a designer or a design-purpose computer or the like. Through this procedure, a plurality of matching core circuits are assigned in a time division multiplex manner or in a multi-line manner to one or more signal paths through which data to be matched propagates at each pattern circuit. Such a pre-assignment configured at the time of circuit design determines which matching core circuit corresponds to the data to be matched that propagates through a signal path of interest, and corresponds to the data to be matched that propagates through a pattern circuit of interest.

It may be noted that, in FIG. 11 and the subsequent flowcharts, an order in which the steps illustrated in the flowchart are performed is only an example. The scope of the disclosed technology is not limited to the disclosed order. For example, a description may explain that an A step is performed before a B step is performed. Despite such a description, it may be physically and logically possible to perform the B step before the A step while it is possible to perform the A step before the B step. In such a case, all the consequences that affect the outcomes of the flowchart may be the same regardless of which step is performed first. It then follows that, for the purposes of the disclosed technology, it is apparent that the B step can be performed before the A step is performed. Despite the explanation that the A step is performed before the B step, such a description is not intended to place the obvious case as described above outside the scope of the disclosed technology. Such an obvious case inevitably falls within the scope of the technology intended by this disclosure.

In step S1, a pattern circuit connected to a matching core circuit is selected. In step S2, the sections obtained through division by a time-division-multiplex scheme and/or a multi-line scheme at the position of the outputs of the selected pattern circuit and at the position of the inputs of the next pattern circuit are assigned to the nearest matching core circuits that are equal in number to the number of the sections. With this arrangement, a plurality of matching core circuits are assigned to the pattern circuit that is connected to a matching core circuit.

In step S3, the next pattern circuit is selected. In step S4, a check is made as to whether the selected pattern circuit is the pattern circuit that was initially selected. Namely, a check is made as to whether a selection process has made a lap around the circuit loop to return to the first pattern circuit. If the answer is YES, the procedure comes to an end. If the answer is NO, a check is made in step S5 as to whether the selected pattern circuit is connected to a matching core circuit.

When the check in step S5 finds that the selected pattern circuit is not connected to a matching core circuit, the procedure proceeds to step S6. In step S6, the sections obtained through division by a time-division-multiplex scheme and/or a multi-line scheme at the position of the outputs of the selected pattern circuit and at the position of the inputs of the next pattern circuit are assigned to matching core circuits corresponding to the next timing on the same lines as those of the preceding pattern circuit. When the check in step S5 finds that the selected pattern circuit is connected to a matching core circuit, the procedure proceeds to step S7. In step S7, the sections obtained through division by a time-division-multiplex scheme and/or a multi-line scheme at the position of the outputs of the selected pattern circuit and at the position of the inputs of the next pattern circuit are assigned to matching core circuits corresponding to the next timing on the lines having the next following number relative to the lines of the preceding pattern circuit. However, the line that is supposed to be assigned to the farthest away matching core circuit is instead assigned to the matching core circuit that is connected to the pattern circuit of interest.

Figure 12:
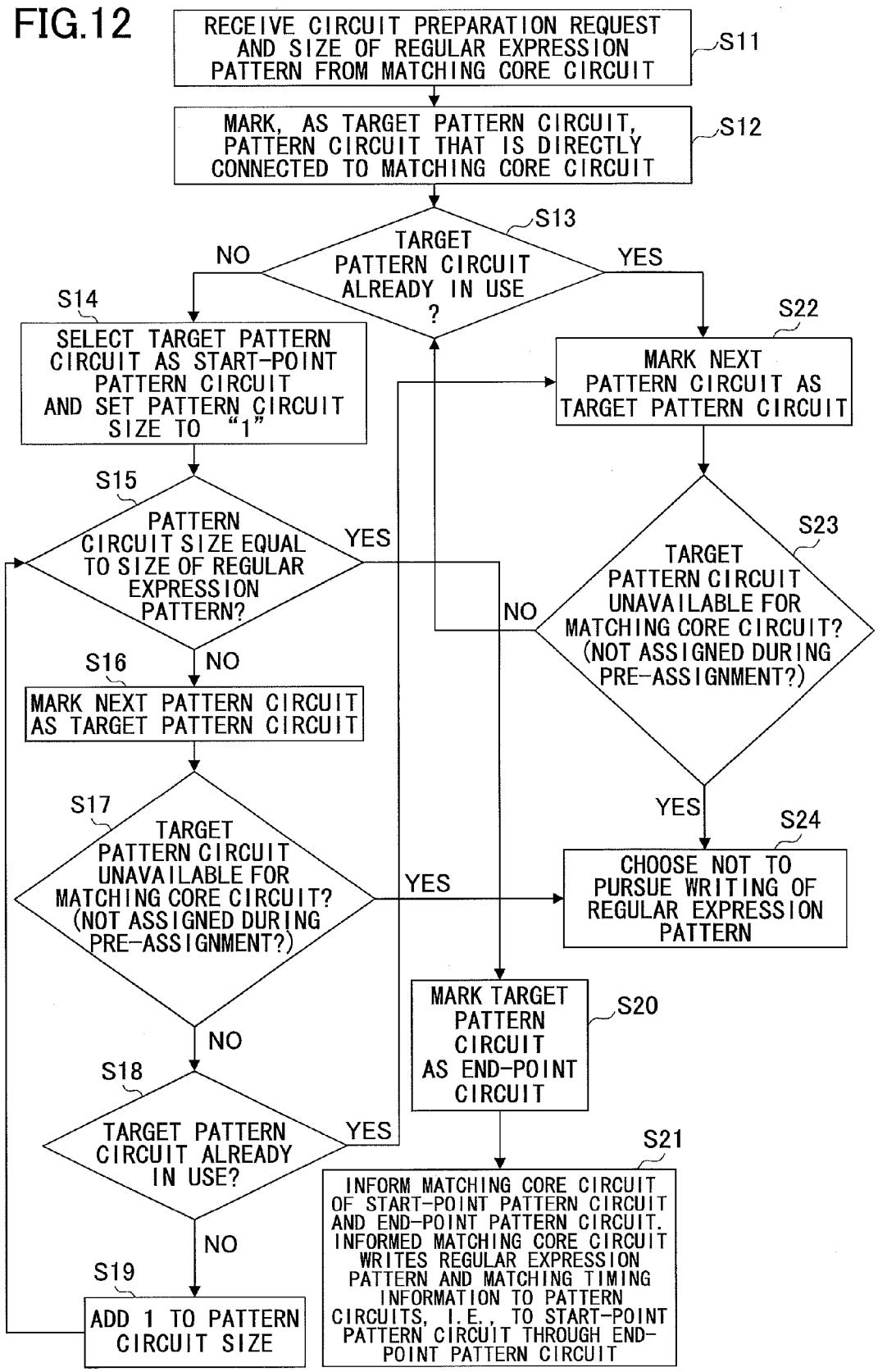
FIG. 12 is a flowchart illustrating an example of the process performed by a pattern-circuit controlling unit illustrated in FIG. 2.

FIG. 12 is a flowchart illustrating an example of the process performed by the pattern-circuit controlling unit 24 illustrated in FIG. 2. Upon receiving a circuit preparation request (i.e., pattern-circuit use request) from a matching core circuit, the pattern-circuit controlling unit 24 performs the process illustrated in FIG. 12 to select one or more pattern circuits that are to be assigned to such a matching core circuit, followed by informing the matching core circuit of the one or more selected pattern circuits.

In step S11, the pattern-circuit controlling unit 24 receives the circuit preparation request and the size of a regular expression pattern from the matching core circuit. In step S12, the pattern-circuit controlling unit 24 marks as a target pattern circuit the pattern circuit that is directly connected to the matching core circuit. In step S13, the pattern-circuit controlling unit 24 checks whether the target pattern circuit is already in use (i.e., whether it has already been assigned to a matching core circuit).

If the check in step S13 finds that the target pattern circuit is not already in use, the pattern-circuit controlling unit 24 selects the target pattern circuit as a start-point pattern circuit and sets the pattern circuit size to "1" in step S14. In step S15, the pattern-circuit controlling unit 24 checks whether the pattern circuit size is equal to the size of the regular expression pattern. When the pattern circuit size is not equal to the size of the regular expression pattern, the pattern-circuit controlling unit 24 marks the next pattern circuit as a target pattern circuit in step S16. In step S17, the pattern-circuit controlling unit 24 checks whether the target pattern circuit is unavailable for the matching core circuit (i.e., whether it has not been assigned to this matching core circuit during the pre-assignment). If it is unavailable, the pattern-circuit controlling unit 24 chooses not to pursue the writing of the regular expression pattern in step S24. If it is not unavailable (i.e., if it is available), the pattern-circuit controlling unit 24 checks in step S18 whether the target pattern circuit is already in use (i.e., whether it has already been assigned to another regular expression pattern). If it is not already in use, the pattern-circuit controlling unit 24 adds 1 to the pattern circuit size in step S19. The procedure then goes back to step S15 to repeat the subsequent steps.

If the check in step S13 finds that the target pattern circuit is already in use, or if the check in step S18 finds that the target pattern circuit is already in use, the pattern-circuit controlling unit 24 marks the next pattern circuit as a target pattern circuit in step S22. In step S23, the pattern-circuit controlling unit 24 checks whether the target pattern circuit is unavailable for the matching core circuit (i.e., whether it has not been assigned to this matching core circuit during the pre-assignment). If it is unavailable, the pattern-circuit controlling unit 24 chooses not to pursue the writing of the regular expression pattern in step S24. If it is not unavailable (i.e., if it is available), the procedure goes back to step S13 to repeat the subsequent steps.

If the check in step S15 finds that the pattern circuit size is equal to the size of the regular expression pattern, this fact means that a sufficient number of pattern circuits to which the requested regular expression pattern having a certain length (i.e., size) can be written have been found. In such a case, the pattern-circuit controlling unit 24 marks the target pattern circuit as an end-point circuit in step S20. In step S21 that is the last step, the pattern-circuit controlling unit 24 informs the matching core circuit of the start-point pattern circuit and the end-point pattern circuit. The informed matching core circuit writes the regular expression pattern and matching timing information to the pattern circuits that are arranged from the start-point pattern circuit to the end-point pattern circuit.

Figure 13:
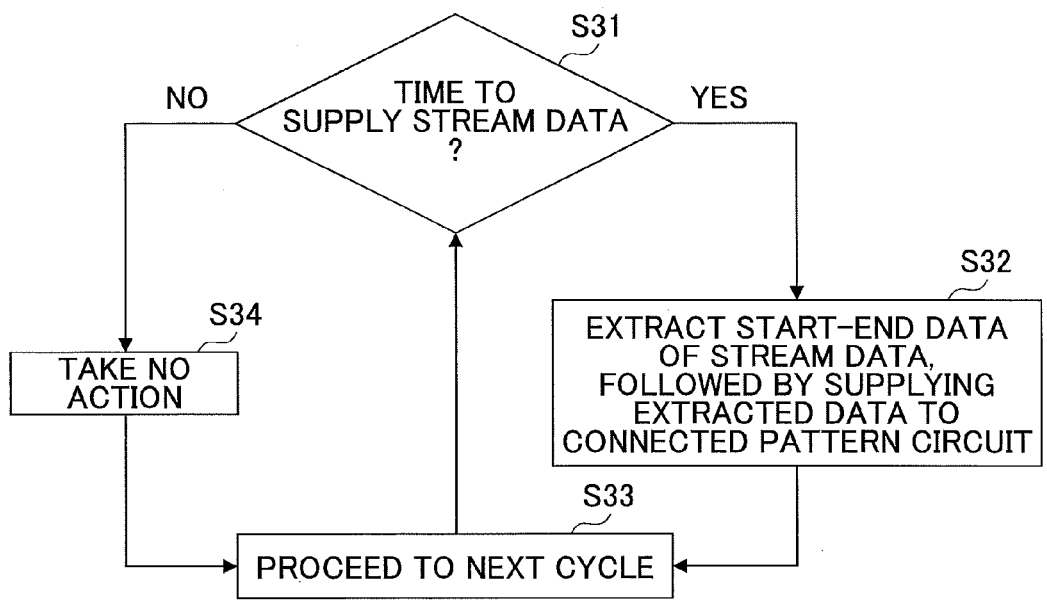
FIG. 13 is a drawing showing an example of the operation of a matching core circuit.

FIG. 13 is a drawing showing an example of the operation of a matching core circuit. In step S31, the matching core circuit checks whether it is the time (i.e., cycle) to supply stream data (i.e., data to be matched) to the pattern circuit line. If it is the time to supply stream data, the matching core circuit extracts the start-end data of the stream data in step S32, followed by supplying the extracted data to the pattern circuit that is directly connected to the matching core circuit. In step S33, the next cycle is selected as an operation cycle, and the procedure goes back to step S31 to repeat the subsequent steps.

When the check in step S31 finds that it is not the time (i.e., cycle) to supply stream data, no action is taken in the current cycle in step S34 (i.e., no stream data is supplied to the pattern circuit). In step S33, the next cycle is selected as an operation cycle, and the procedure goes back to step S31 to repeat the subsequent steps.

In the case of a pattern circuit of the time division multiplex scheme, stream data may be supplied from the matching core circuit to the pattern circuit only in one predetermined operation cycle among a predetermined number of consecutive operation cycles. In the case of two cycles being used for time division multiplexing, stream data may be supplied from the matching core circuit to the pattern circuit only in an even-numbered cycle, for example. In the case of a pattern circuit of the multi-line scheme, stream data may be supplied form the matching core circuit to the pattern circuit in every cycle.

Figure 14:
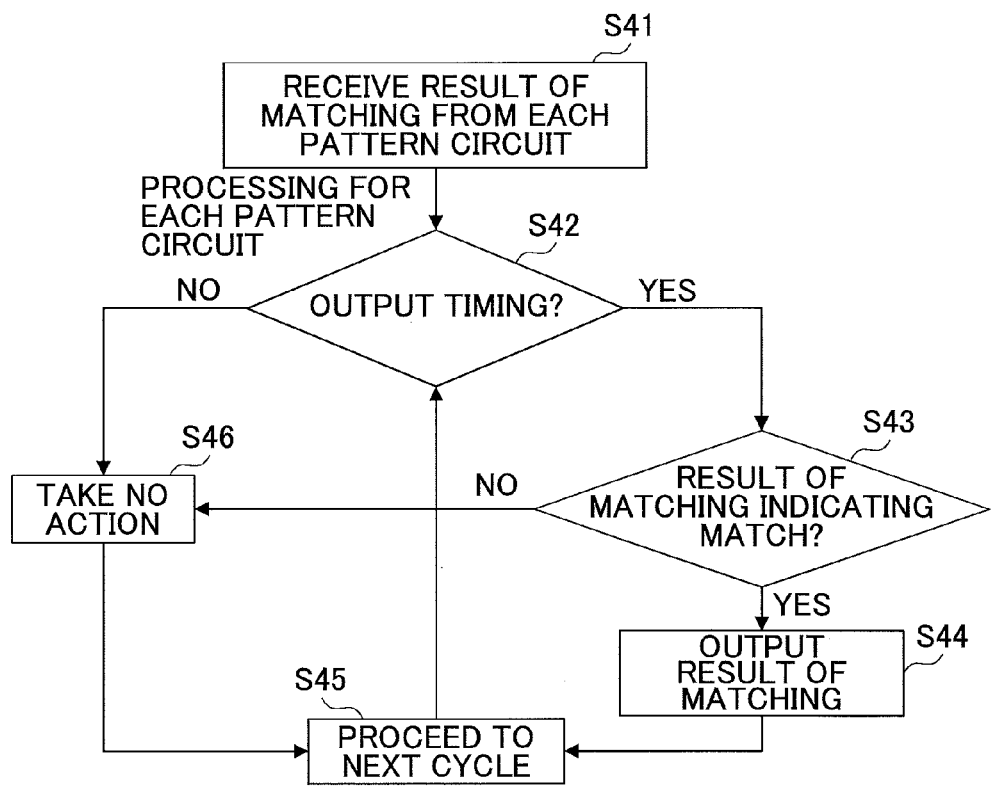
FIG. 14 is a drawing showing an example of the configuration of an output unit.

FIG. 14 is a drawing showing an example of the operation of the output unit 25. In step S41, the output unit 25 receives the result of matching from each pattern circuit. In step S42, the output unit 25 checks for each pattern circuit, based on the timing information from the pattern circuit, whether it is the time for the pattern circuit to output the result of matching. If it is the time to output the result of matching, a check is made in step S43 as to whether the result of matching indicates a match. If the result of matching indicates a match, an indication indicative of the fact that the input data stream (i.e., data to be matched) has matched the regular expression pattern is output in step S44. In step S45, the next cycle is selected as an operation cycle, and the procedure goes back to step S42 to repeat the subsequent steps.

If the check in step S42 finds that it is not the time to output, no action is taken in the current cycle in step S46 (i.e., no data is output from the output unit 25). In step S45, the next cycle is selected as an operation cycle, and the procedure goes back to step S42 to repeat the subsequent steps.

In the flowchart described above, the output unit 25 may be in possession of the information indicative of the last-stage pattern circuit among the pattern circuits to which each regular expression pattern has been assigned. Provision may be made such that only when the result of matching output from the last-stage pattern circuit indicates a match, the output unit 25 outputs an indication indicative of the fact that the input data stream (i.e., data to be matched) has matched the regular expression pattern. Alternatively, any given pattern circuit may be in possession of the information indicative of whether this given pattern circuit is the pattern circuit (i.e., end-point circuit) that performs matching with respect to the last part of the regular expression pattern, and may supply the result of matching and the timing information to the output unit 25 only when this given pattern circuit is the end-point circuit. In such a case, the output unit 25 may output, upon receiving the result of matching and the timing information, an indication indicative of the fact that the input data stream (i.e., data to be matched) has matched the regular expression pattern.

Figure 15:
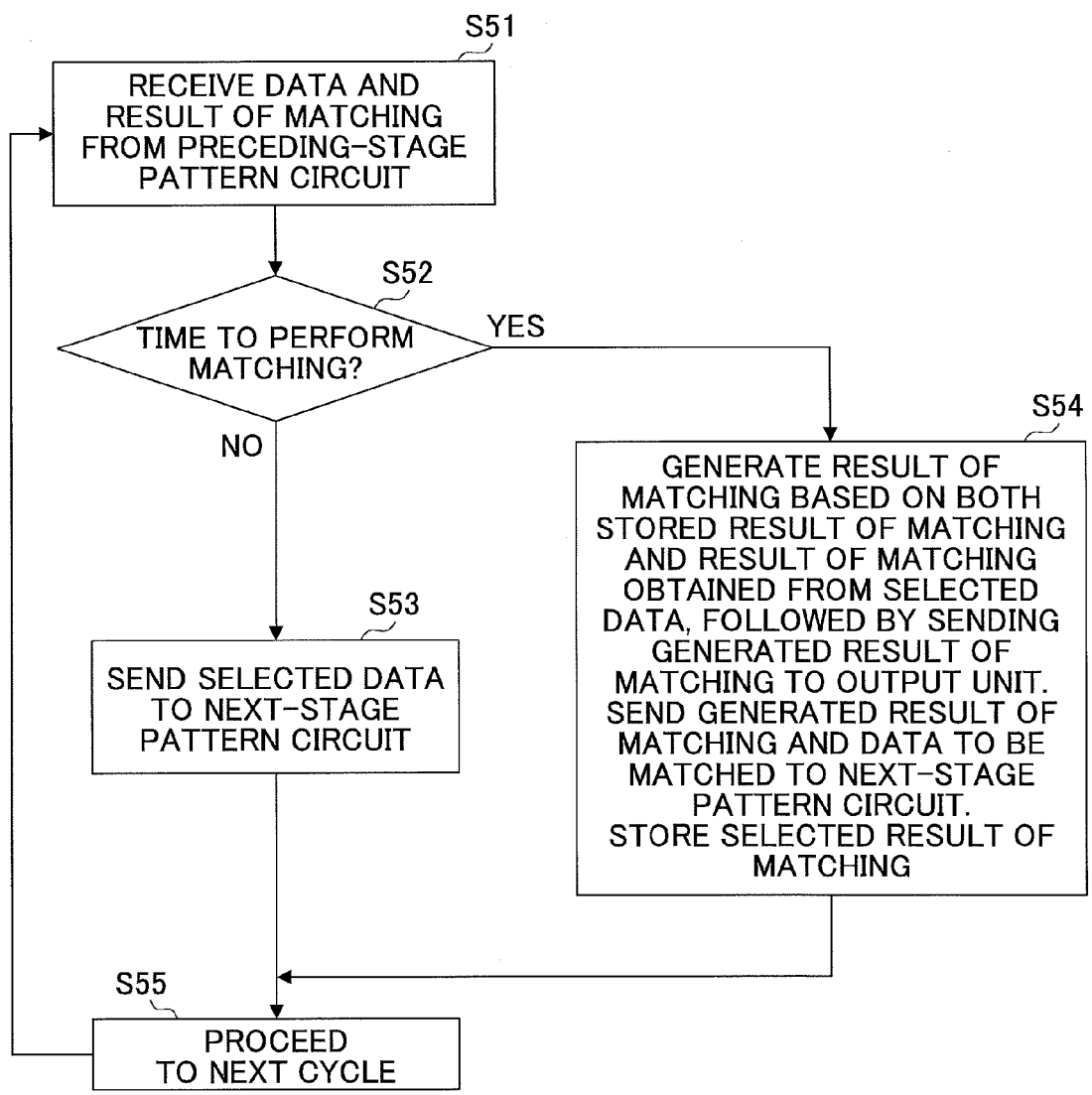
FIG. 15 is a flowchart illustrating an example of a matching operation performed by a pattern circuit.

FIG. 15 is a flowchart illustrating an example of the matching operation performed by a pattern circuit. The operation illustrated in this flowchart is performed by a pattern circuit of the time division multiplex scheme that is not connected to a matching core circuit like the pattern circuit illustrated in FIG. 4.

In step S51, the pattern circuit of interest receives, from the preceding-stage pattern circuit, part of the stream data (i.e., part of the data to be matched) and the result of matching performed by the preceding-stage pattern circuit. The part of the stream data (i.e., the part of the data to be matched) may be data indicative of one character (e.g., ASCII code indicative of one character) of the data to be matched. In step S52, the timing circuit 41 of the pattern circuit of interest checks whether the current operation cycle is the time to perform matching (i.e., the cycle in which matching is performed). In the case of two cycles being used in the time division multiplex scheme, for example, the even-numbered cycle is the time to perform matching (i.e., the cycle in which matching is performed) for the pattern circuit of interest, and the odd-numbered cycle is not the time to perform matching (i.e., the cycle in which matching is performed).

If the check in step S52 finds that the current operation cycle is not the time to perform matching, the pattern circuit of interest sends the received data, as it is, to the next-stage pattern circuit in step S53. In step S55, after the next cycle is selected as an operation cycle, the procedure goes back to step S51 to repeat the subsequent steps.

If the check in step S52 finds that the current operation cycle is the time to perform matching, matching is performed in step S54. Namely, the matching circuit 42 of the pattern circuit of interest generates a new result of matching based on the result of matching stored in the matching result buffer 43 and the result of matching obtained by performing matching with respect to the data to be matched supplied from the preceding-stage pattern circuit, followed by sending the generated result of matching to the output unit 25. Further, the pattern circuit of interest sends the generated result of matching and the data to be matched to the next-stage pattern circuit. Moreover, the result of matching received from the preceding-stage pattern circuit is newly stored in the matching result buffer 43 of the pattern circuit of interest. In step S54, after the next cycle is selected as an operation cycle, the procedure goes back to step S51 to repeat the subsequent steps.

In the description provided above, the matching circuit 42 of the pattern circuit of interest generates a new result of matching based on the result of matching stored in the matching result buffer 43 and the result of matching obtained by performing matching with respect to the data to be matched that is received in the current operation cycle from the preceding-stage pattern circuit. The result of matching stored in the matching result buffer 43 at this time is the one that was received and stored in the matching result buffer 43 in the previous operation cycle in which the immediately preceding matching operation was performed. The reason why the result of matching generated in the local stage in the current matching cycle and the result of matching supplied from the preceding stage in the immediately preceding matching cycle are used to generate a new result of matching is as follows. When the data to be matched is in agreement with the regular expression pattern, what is matched and found to be in agreement by the preceding-stage pattern circuit is the K-th data (i.e., K-th character) of the data to be matched (i.e., a character string), for example. The pattern circuit of interest (i.e., the local pattern circuit) receives this K-th data and the result of matching regarding the K-th data in a given matching operation cycle (e.g., in a k-th matching operation cycle). However, the data for which this pattern circuit of interest performs matching and finds an agreement is the K+1-th data (i.e., the K+1-th character) of the data to be matched (i.e., a character string). The pattern circuit of interest receives this K+1-th data (i.e., the K+1-th character) in the k+1-th matching operation cycle. Accordingly, the pattern circuit of interest stores the result of matching that is received from the preceding-stage pattern circuit in the k-th matching operation cycle, and generates a new result of matching based on the stored result of matching and the result of matching obtained in the k+1-th matching operation cycle.

Figure 16:
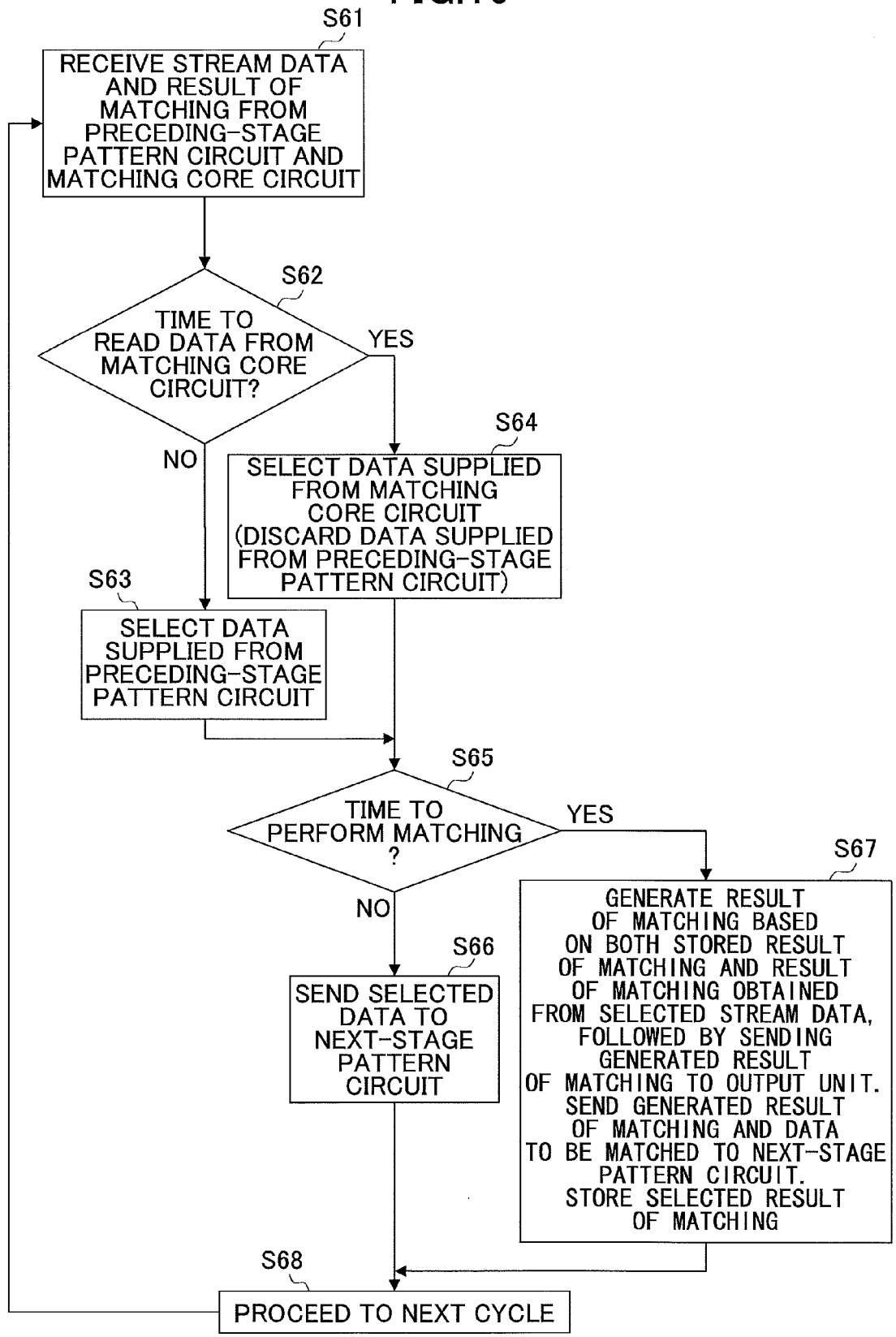
FIG. 16 is a flowchart illustrating an example of a matching operation performed by a pattern circuit.

FIG. 16 is a flowchart illustrating an example of the matching operation performed by a pattern circuit. The operation illustrated in this flowchart is performed by a pattern circuit of the time division multiplex scheme that is connected to a matching core circuit like the pattern circuit illustrated in FIG. 5.

In step S61, the pattern circuit of interest receives, from the preceding-stage pattern circuit, part of the stream data (i.e., part of the data to be matched) and the result of matching performed by the preceding-stage pattern circuit. The part of the stream data (i.e., the part of the data to be matched) may be data indicative of one character (e.g., ASCII code indicative of one character) of the data to be matched. In step S62, the timing circuit 41 of the pattern circuit of interest checks whether the current operation cycle is the time (i.e., cycle) to read data from the matching core circuit. If the current operation cycle is not the time to read data from the matching core circuit, the selector 49-2 controlled by the timing circuit 41 selects in step S63 the data to be matched supplied from the preceding-stage pattern circuit. If the current operation cycle is the time to read data from the matching core circuit, the selector 49-2 controlled by the timing circuit 41 selects in step S64 the data to be matched supplied from the matching core circuit.

In step S65, the timing circuit 41 of the pattern circuit of interest checks whether the current operation cycle is the time to perform matching (i.e., the cycle in which matching is performed). If the current operation cycle is not the time to perform matching, the pattern circuit of interest sends the selected data, as it is, to the next-stage pattern circuit in step S66. In step S68, after the next cycle is selected as an operation cycle, the procedure goes back to step S61 to repeat the subsequent steps.

If the check in step S65 finds that the current operation cycle is the time to perform matching, matching is performed in step S64. Namely, the matching circuit 42 of the pattern circuit of interest generates a new result of matching based on the result of matching stored in the matching result buffer 43 and the result of matching obtained by performing matching with respect to the data to be matched supplied from the preceding-stage pattern circuit, followed by sending the generated result of matching to the output unit 25. Further, the pattern circuit of interest sends the generated result of matching and the data to be matched to the next-stage pattern circuit. Moreover, the result of matching received from the preceding-stage pattern circuit is newly stored in the matching result buffer 43 of the pattern circuit of interest. In step S68, after the next cycle is selected as an operation cycle, the procedure goes back to step S61 to repeat the subsequent steps.

Figure 17:
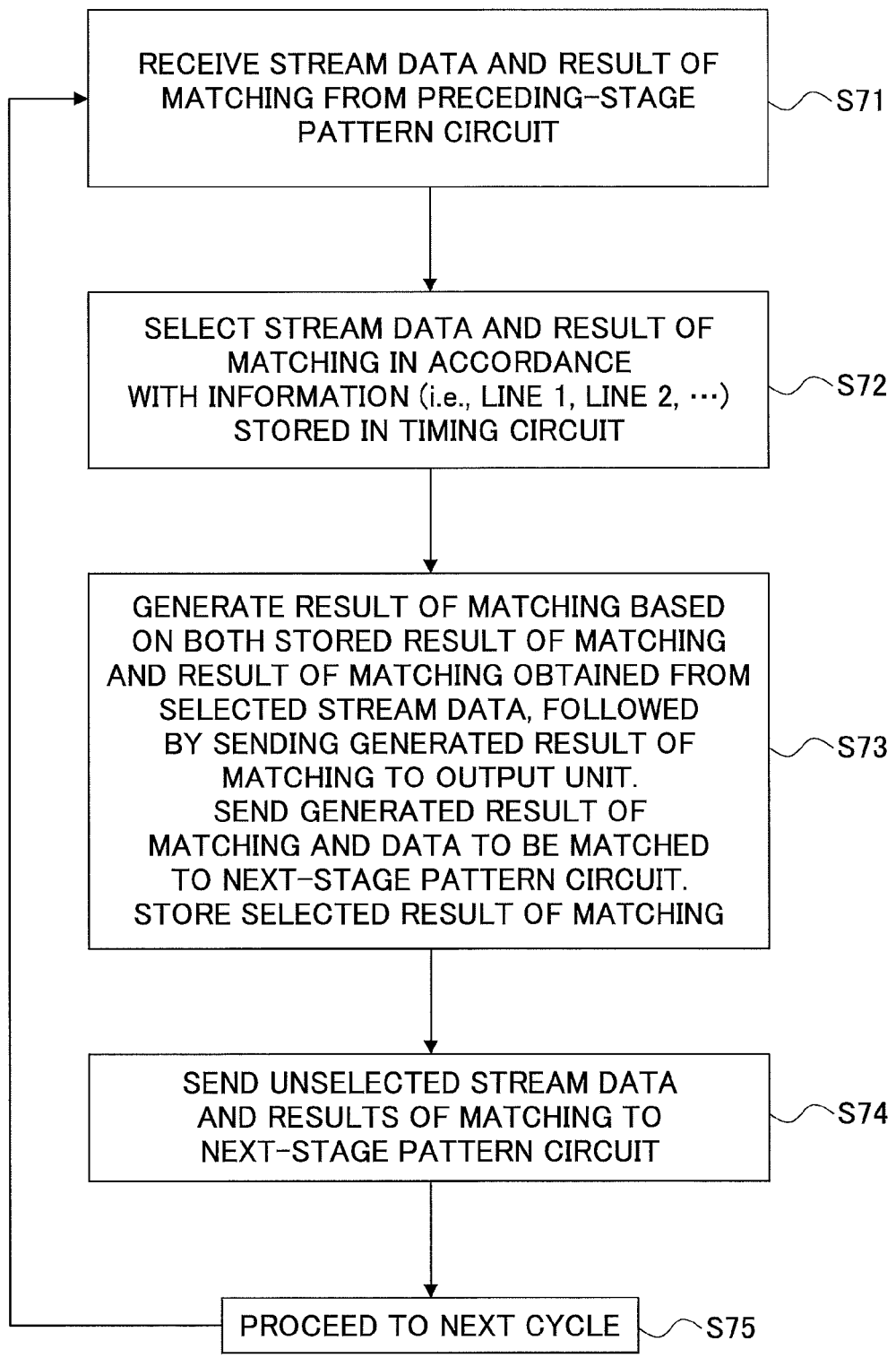
FIG. 17 is a flowchart illustrating an example of a matching operation performed by a pattern circuit.

FIG. 17 is a flowchart illustrating an example of the matching operation performed by a pattern circuit. The operation illustrated in this flowchart is performed by a pattern circuit of the multi-line scheme that is not connected to a matching core circuit like the pattern circuit illustrated in FIG. 6.

In step S71, the pattern circuit of interest receives, from the preceding-stage pattern circuit, parts of the plurality of data streams (i.e., parts of the plurality of data to be matched) and the respective, corresponding results of matching. In step S72, the timing circuit 51 of the pattern circuit of interest selects the data to be matched originating from a matching core circuit that is assigned as the target of matching to the pattern circuit of interest, and also selects the result of matching corresponding thereto. In step S73, the matching circuit 52 of the pattern circuit of interest generates a new result of matching based on the result of matching stored in the matching result buffer 53 and the result of matching obtained by performing matching with respect to the selected data to be matched, followed by sending the generated result of matching to the output unit 25. Further, the pattern circuit of interest sends the generated result of matching and the data to be matched to the next-stage pattern circuit. Moreover, the selected result of matching is newly stored in the matching result buffer 53 of the pattern circuit of interest. In step S74, the pattern circuit of interest sends to the next-stage pattern circuit the results of matching and the data to be matched that are not selected. In step S75, after the next cycle is selected as an operation cycle, the procedure goes back to step S71 to repeat the subsequent steps.

Figure 18:
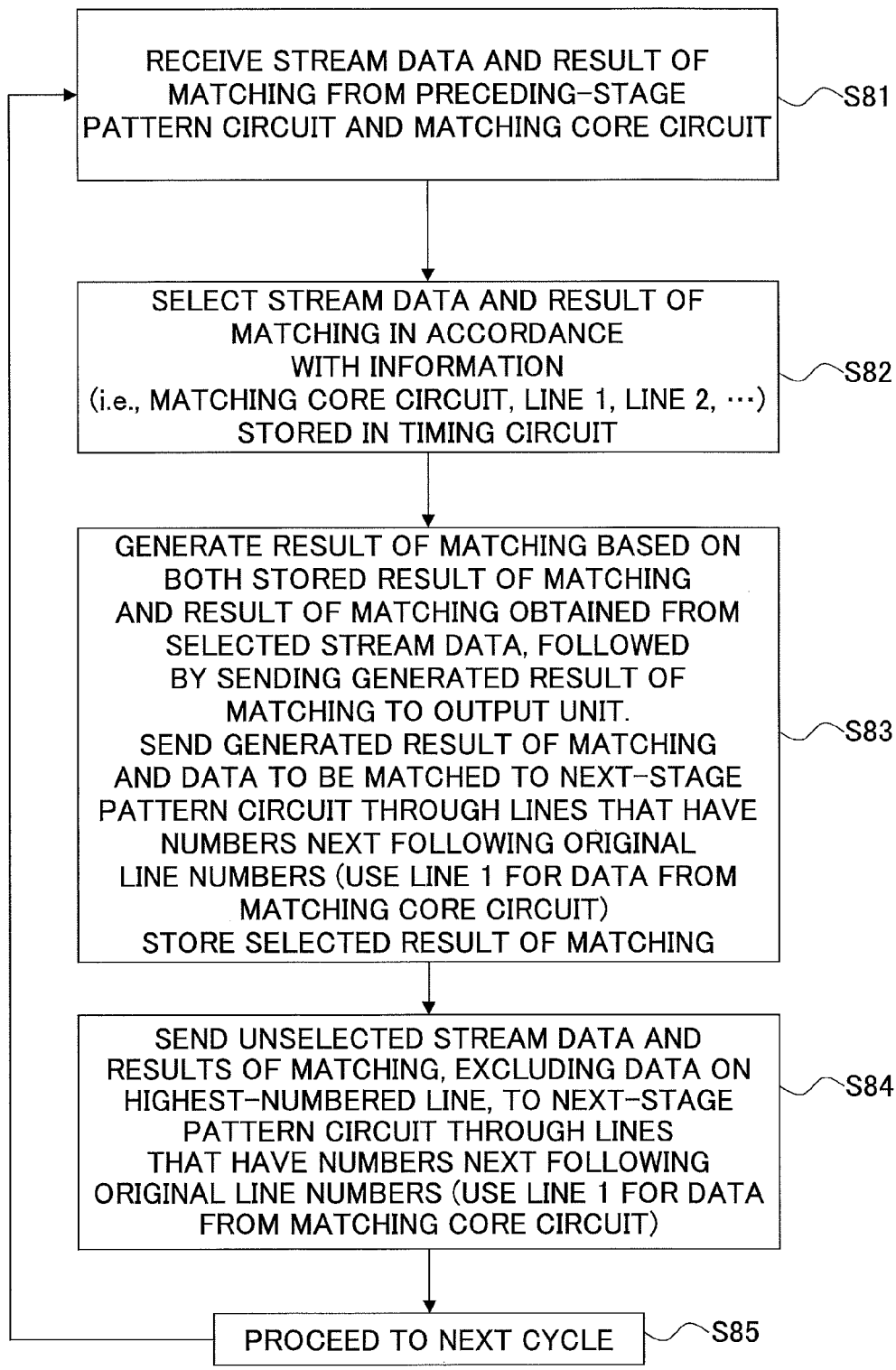
FIG. 18 is a flowchart illustrating an example of a matching operation performed by a pattern circuit.

FIG. 18 is a flowchart illustrating an example of the matching operation performed by a pattern circuit. The operation illustrated in this flowchart is performed by a pattern circuit of the multi-line scheme that is connected to a matching core circuit like the pattern circuit illustrated in FIG. 7.

In step S81, the pattern circuit of interest receives, from the preceding-stage pattern circuit, parts of the plurality of data streams (i.e., parts of the plurality of data to be matched) and the respective, corresponding results of matching, and also receives part of a data stream (i.e., part of data to be matched) from the matching core circuit. In step S82, the timing circuit 51 of the pattern circuit of interest selects the result of matching originating from a matching core circuit that is assigned as the target of matching to the pattern circuit of interest, and also selects the result of matching corresponding thereto. In step S83, the matching circuit 52 of the pattern circuit of interest generates a new result of matching based on the result of matching stored in the matching result buffer 53 and the result of matching obtained by performing matching with respect to the selected data to be matched, followed by sending the generated result of matching to the output unit 25. Further, the pattern circuit of interest sends the generated result of matching and the selected data to be matched to the next-stage pattern circuit through a line that has the number next following the line number to which the data selected in step S82 belongs. Further, the data of the matching core circuit is sent to the next-stage pattern circuit through a line having the line number "1". Moreover, the selected result of matching is newly stored in the matching result buffer 53 of the pattern circuit of interest. In step S84, the pattern circuit of interest sends the unselected data to be matched and the unselected results of matching to the next-stage pattern circuit through the lines that have the respective numbers next following the line numbers on the input side through which these data items are received. It may be noted that the data on the line having the highest line number on the input side is discarded. In step S85, after the next cycle is selected as an operation cycle, the procedure goes back to step S81 to repeat the subsequent steps.

Figure 19:
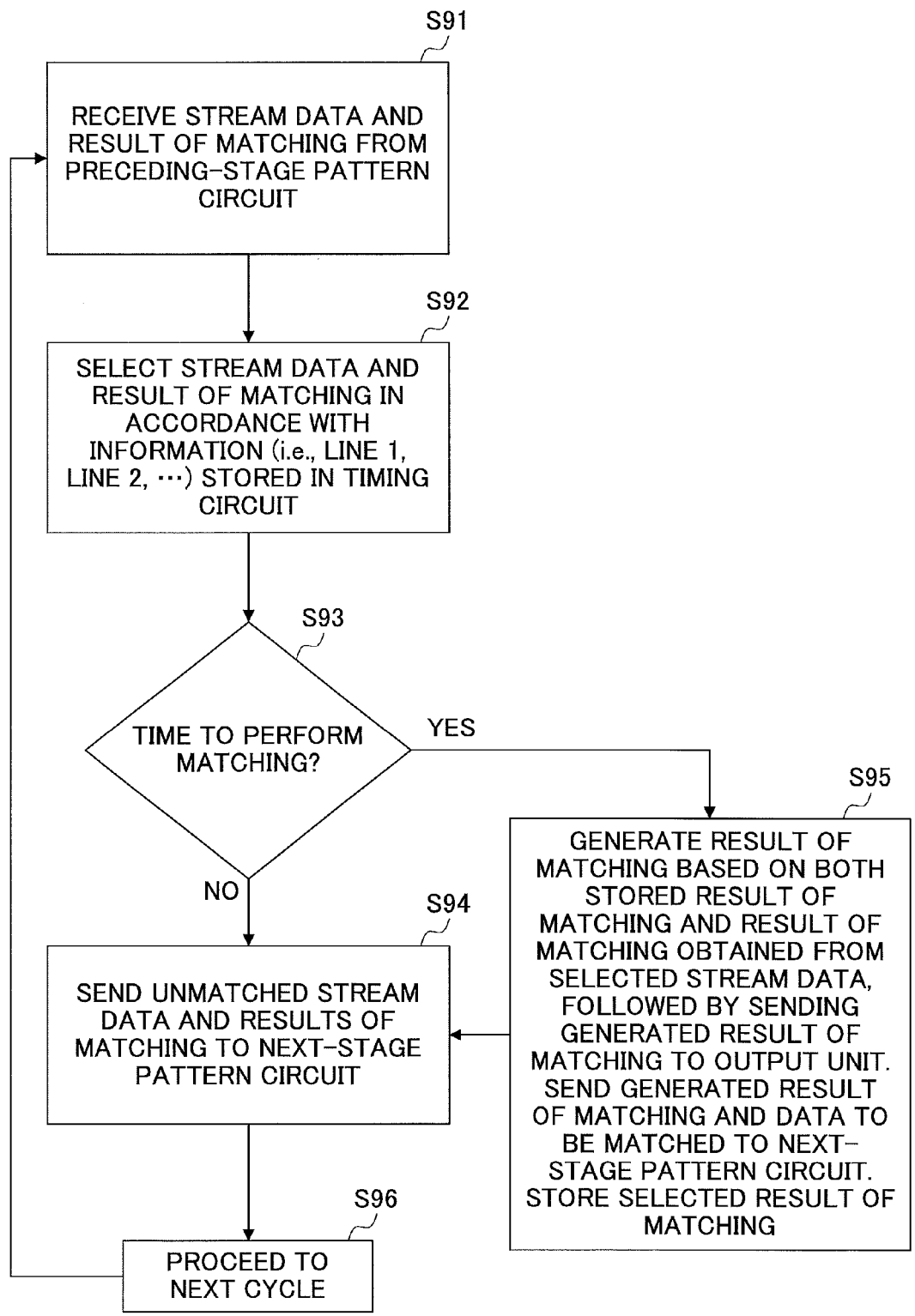
FIG. 19 is a flowchart illustrating an example of a matching operation performed by a pattern circuit.

FIG. 19 is a flowchart illustrating an example of the matching operation performed by a pattern circuit. The operation illustrated in this flowchart is performed by a pattern circuit of the time division multiplex scheme and the multi-line scheme that is not connected to a matching core circuit like the pattern circuit illustrated in FIG. 8.

In step S91, the pattern circuit of interest receives, from the preceding-stage pattern circuit, parts of the plurality of data streams (i.e., parts of the plurality of data to be matched) and the respective, corresponding results of matching. In step S92, the timing circuit 61 of the pattern circuit of interest selects the result of matching originating from a matching core circuit that is assigned as the target of matching to the pattern circuit of interest, and also selects the result of matching corresponding thereto. In step S93, the timing circuit 61 of the pattern circuit of interest checks whether the current operation cycle is the time to perform matching (i.e., the cycle in which matching is performed). In the case of two cycles being used in the time division multiplex scheme, for example, the even-numbered cycle is the time to perform matching (i.e., the cycle in which matching is performed) for the pattern circuit of interest, and the odd-numbered cycle is not the time to perform matching (i.e., the cycle in which matching is performed).

If the check in step S93 finds that the current operation cycle is not the time to perform matching, the pattern circuit of interest sends the received data, as it is, to the next-stage pattern circuit in step S94. In step S96, after the next cycle is selected as an operation cycle, the procedure goes back to step S91 to repeat the subsequent steps.

If the check in step S93 finds that the current operation cycle is the time to perform matching, matching is performed in step S95. Namely, the matching circuit 62 of the pattern circuit of interest generates a new result of matching based on the result of matching stored in the matching result buffer 63 and the result of matching obtained by performing matching with respect to the selected data to be matched, followed by sending the generated result of matching to the output unit 25. Further, the pattern circuit of interest sends the generated result of matching and the data to be matched to the next-stage pattern circuit. Moreover, the selected result of matching is newly stored in the matching result buffer 63 of the pattern circuit of interest. It may be noted that the unselected data to be matched and the unselected results of matching are also sent to the next-stage pattern circuit. In step S96, after the next cycle is selected as an operation cycle, the procedure goes back to step S91 to repeat the subsequent steps.

Figure 20:
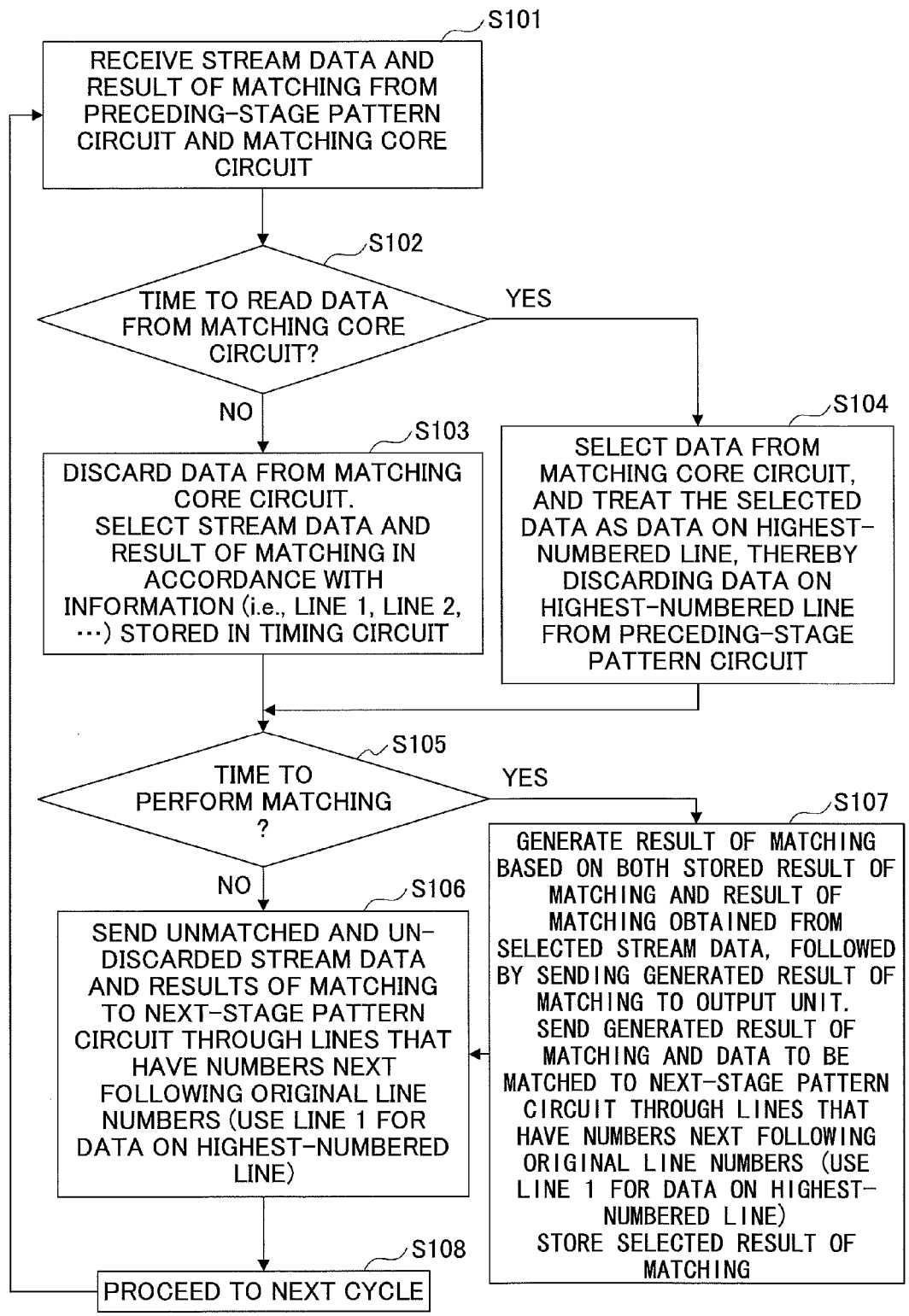
FIG. 20 is a flowchart illustrating an example of a matching operation performed by a pattern circuit.

FIG. 20 is a flowchart illustrating an example of the matching operation performed by a pattern circuit. The operation illustrated in this flowchart is performed by a pattern circuit of the time division multiplex scheme and the multi-line scheme that is connected to a matching core circuit like the pattern circuit illustrated in FIG. 9.

In step S101, the pattern circuit of interest receives, from the preceding-stage pattern circuit, parts of the plurality of data streams (i.e., parts of the plurality of data to be matched) and the respective, corresponding results of matching, and also receives part of a data stream (i.e., part of data to be matched) from the matching core circuit. In step S102, the timing circuit 61 of the pattern circuit of interest checks whether the current operation cycle is the time (i.e., cycle) to read data from the matching core circuit. If the current operation cycle is not the time to read data from the matching core circuit, the procedure proceeds to step S103. In step S103, the selector 68-3 controlled by the timing circuit 61 selects the data to be matched on a certain line and the result of matching corresponding thereto if such a certain line exists that is assigned as the matching target for the local stage among the plurality of lines extending from the preceding-stage pattern circuit. If the current operation cycle is the time to read data from the matching core circuit, the selector 68-3 controlled by the timing circuit 61 selects in step S104 the data to be matched supplied from the matching core circuit that is directly connected. It may be noted that the data supplied on the line having the highest line number from the preceding-stage pattern circuit in the current operation cycle is discarded. In place of the discarded data, the data to be matched supplied from the directly connected matching core circuit is introduced.

In step S105, the timing circuit 61 of the pattern circuit of interest checks whether the current operation cycle is the time to perform matching (i.e., the cycle in which matching is performed). If the current operation cycle is not the time to perform matching, the pattern circuit of interest sends in step S106 the un-discarded data to be matched and the un-discarded results of matching to the next-stage pattern circuit through the lines that have the respective numbers next following the line numbers on the input side through which these data items are received. In so doing, the data received on the line having the highest line number is sent to the next-stage pattern circuit through the line having the line number "1". It may be noted that the data on the line number "1" include the data supplied from the directly connected matching core circuit. In step S108, after the next cycle is selected as an operation cycle, the procedure goes back to step S101 to repeat the subsequent steps.

If the check in step S105 finds that the current operation cycle is the time to perform matching, matching is performed in step S107. Namely, the matching circuit 62 of the pattern circuit of interest generates a new result of matching based on the result of matching stored in the matching result buffer 63 and the result of matching obtained by performing matching with respect to the selected data to be matched, followed by sending the generated result of matching to the output unit 25. Further, the pattern circuit of interest sends the generated result of matching and the selected data to be matched to the next-stage pattern circuit through a line that has the number next following the line number to which the data selected in step S103 or S104 belongs. Further, the data received on the line having the highest line number is sent to the next-stage pattern circuit through the line having the line number "1". It may be noted that the unselected data to be matched and the unselected results of matching are also sent to the next-stage pattern circuit through the lines that have the respective numbers next following the line numbers on the input side through which these data items are received. Moreover, the selected result of matching is newly stored in the matching result buffer 63 of the pattern circuit of interest. In step S108, after the next cycle is selected as an operation cycle, the procedure goes back to step S101 to repeat the subsequent steps.

FIG. 21 through FIG. 33 are drawings illustrating an example of propagation of data to be matched in the case of the time division multiplex scheme. In these examples, two cycles are used in the time division multiplex scheme. In FIG. 21 through FIG. 33, the same or corresponding elements are referred to by the same or corresponding numerals, and a description thereof will be omitted as appropriate.

Figure 21:
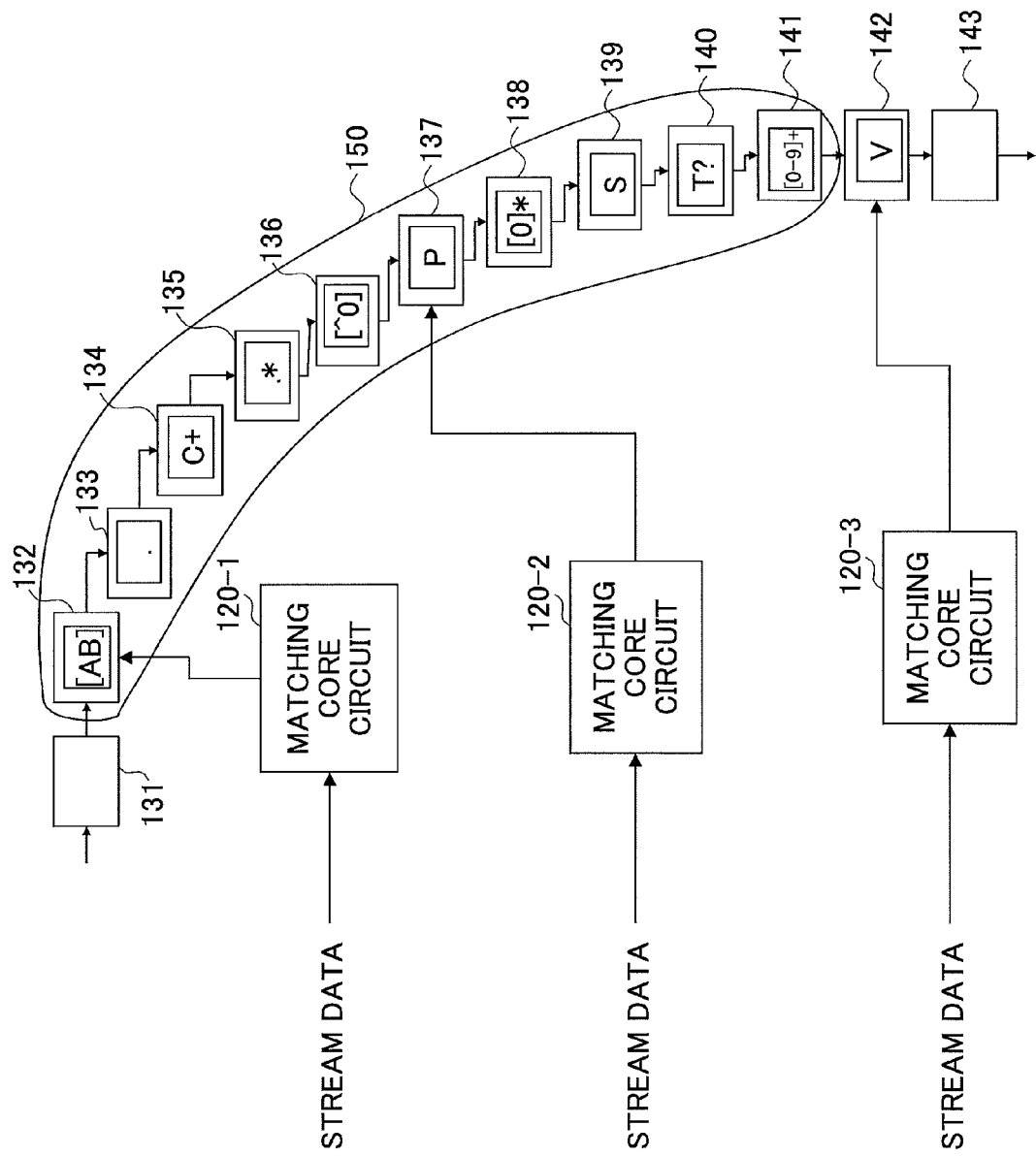
FIG. 21 is a drawing illustrating an example of propagation of data to be matched in the case of a time division multiplex scheme.

In FIG. 21, pattern circuits 131 through 143 correspond to part of the plurality of pattern circuits that are series-connected in a ring as in the configuration illustrated in FIG. 2, for example. The pattern circuit 132 is connected to a matching core circuit 120-1, the pattern circuit 137 connected to a matching core circuit 120-2, and the pattern circuit 142 connected to a matching core circuit 120-3. As illustrated in FIG. 21, the pattern circuits 132 through 136 are assigned to the first regular expression pattern "[AB]+.{1,3}[BC]?.*[^0]" for performing matching with respect to the data to be matched supplied from the matching core circuit 120-1. Further, the pattern circuits 137 through 138 are assigned to the second regular expression pattern "P[0]*" for performing matching with respect to the data to be matched supplied from the matching core circuit 120-1. Moreover, the pattern circuits 139 through 141 are assigned to the third regular expression pattern "ST?[0-9]+" for performing matching with respect to the data to be matched supplied from the matching core circuit 120-2. Further, the pattern circuit 142 is assigned to the fourth regular expression pattern "V" for performing matching with respect to the data to be matched supplied from the matching core circuit 120-3.

A available range 150 indicates a group of pattern circuits that are available to the matching core circuit 120-1 as pattern circuits for performing matching with respect to data to be matched that is supplied from the matching core circuit 120-1. Only the pattern circuits belonging to the available range 150 can perform matching with respect to the data to be matched supplied from the matching core circuit 120-1, and any pattern circuit that does not belong to the available range 150 cannot perform matching with respect to the data to be matched supplied from the matching core circuit 120-1.

Figure 22:
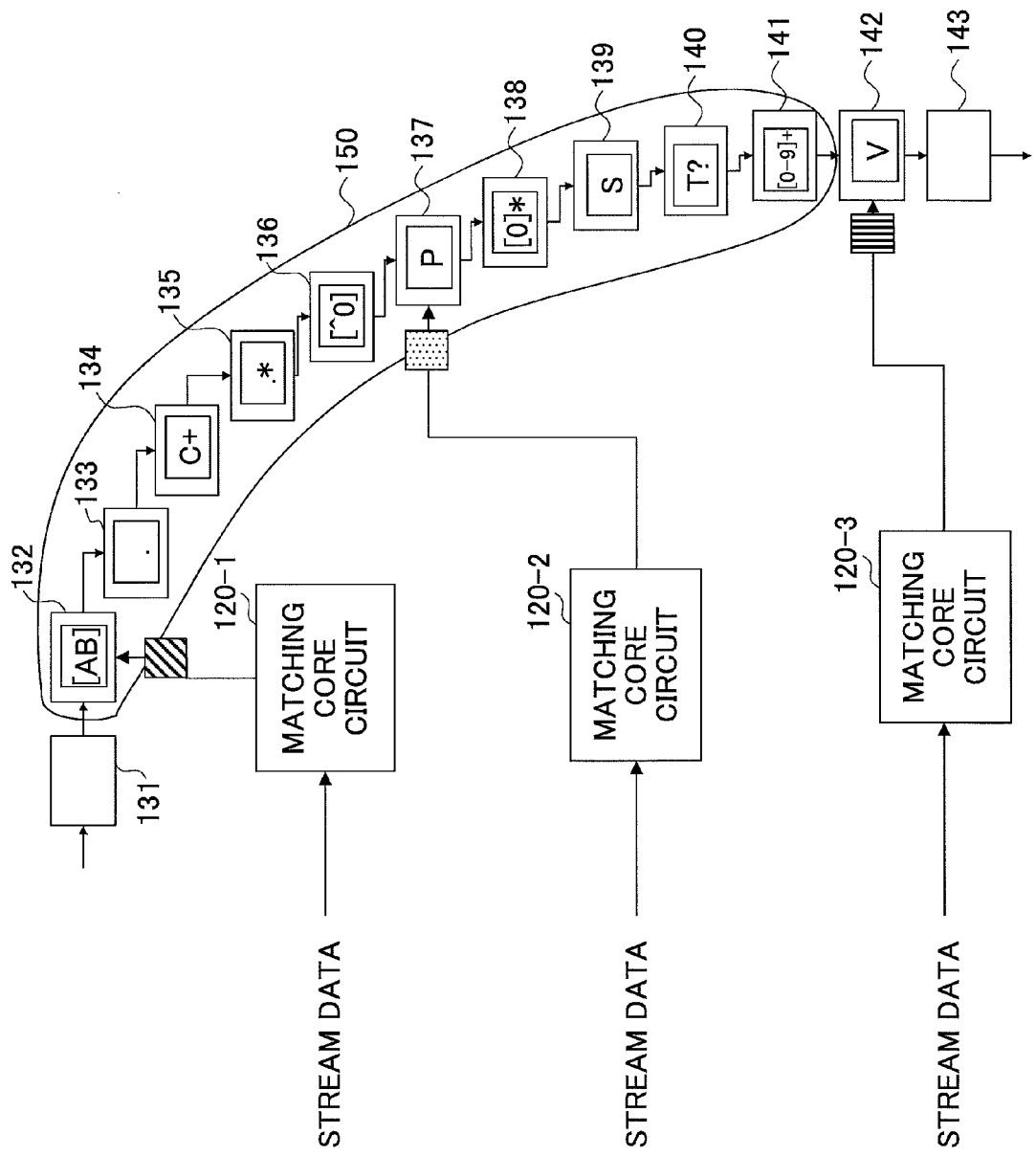
FIG. 22 is a drawing illustrating an example of propagation of data to be matched in the case of a time division multiplex scheme.

FIG. 22 illustrates the way things are in the first cycle. In the first cycle that is an odd-numbered cycle, the matching core circuits 120-1, 120-2, and 120-3 supply the first parts of the respective data streams (i.e., data to be matched) to the corresponding pattern circuits 132, 137, and 142, respectively. The pattern circuits 132 and 142 are configured to perform matching in odd-numbered cycles, and thus perform matching with respect to the first parts of the respective, corresponding data streams (i.e., data to be matched). The pattern circuit 137 is configured to perform matching in even-numbered cycles, and thus does not perform matching with respect to the data supplied from the matching core circuit 120-2.

Figure 23:
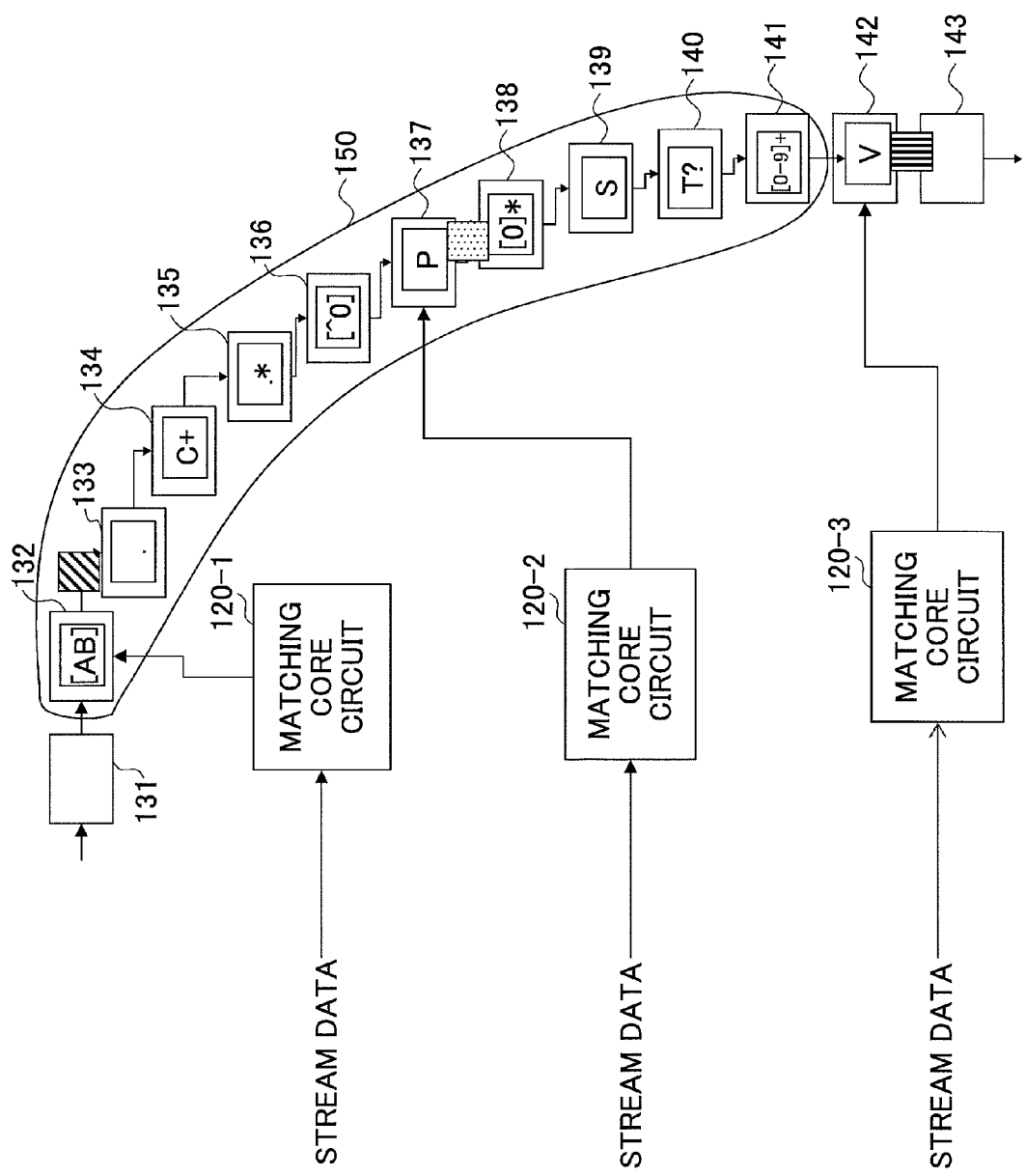
FIG. 23 is a drawing illustrating an example of propagation of data to be matched in the case of a time division multiplex scheme.

FIG. 23 illustrates the way things are in the second cycle. In the second cycle that is an even-numbered cycle, the matching core circuits 120-1, 120-2, and 120-3 do not supply data streams to the corresponding pattern circuits 132, 137, and 142, respectively. The first parts of the data streams (i.e., data to be matched) are supplied from the pattern circuits 132, 137, and 142 to the next-following pattern circuits 133, 138, and 143, respectively. The pattern circuit 133 is configured to perform matching in even-numbered cycles, and thus performs matching with respect to the first part of the corresponding data stream (i.e., data to be matched). The pattern circuit 138 is configured to perform matching in odd-numbered cycles, and thus does not perform matching with respect to the data supplied from the matching core circuit 120-2.

Figure 24:
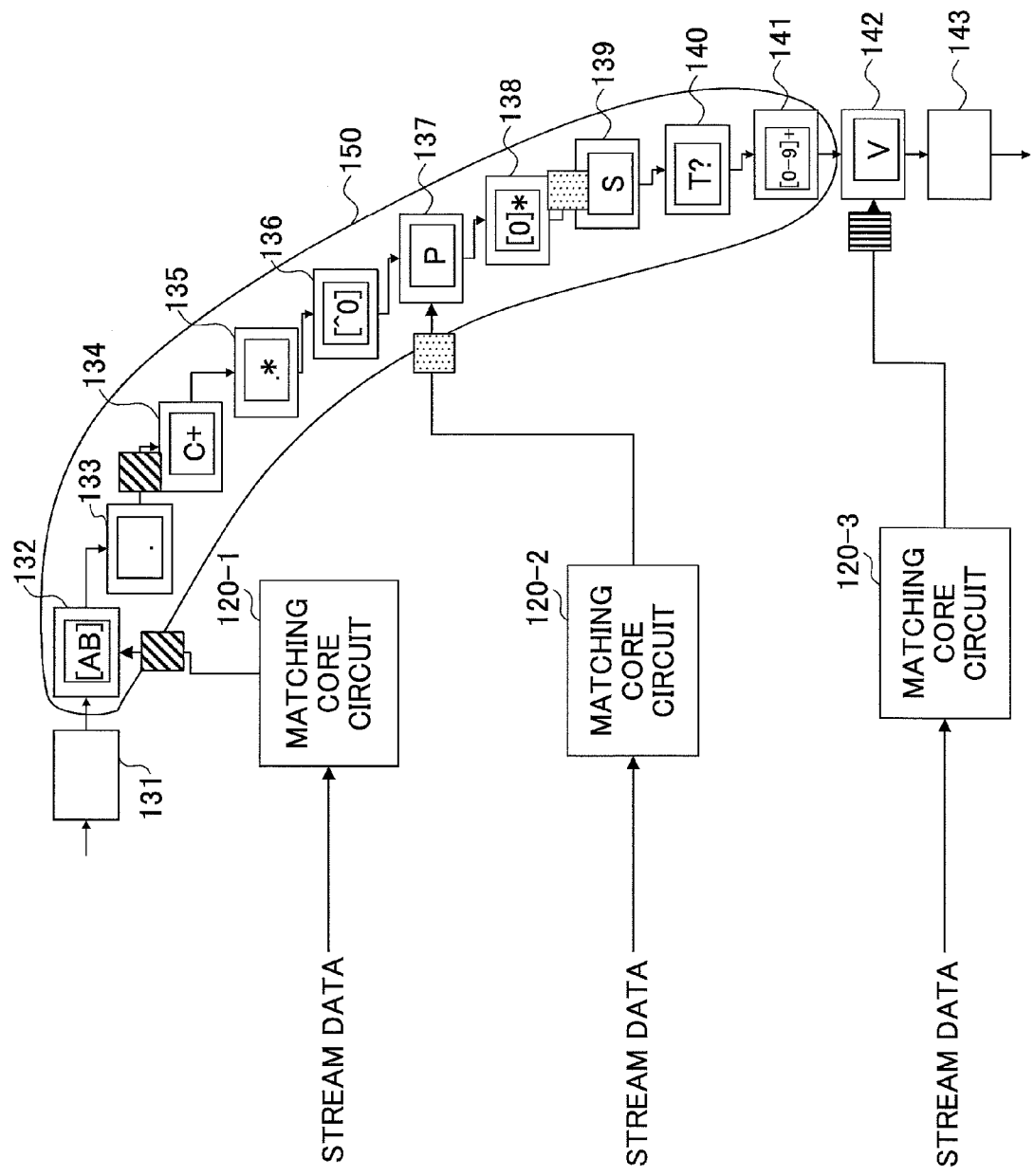
FIG. 24 is a drawing illustrating an example of propagation of data to be matched in the case of a time division multiplex scheme.

FIG. 24 illustrates the way things are in the third cycle. In the third cycle that is an odd-numbered cycle, the matching core circuits 120-1, 120-2, and 120-3 supply the second parts of the respective data streams (i.e., data to be matched) to the corresponding pattern circuits 132, 137, and 142, respectively. The pattern circuits 132 and 142 are configured to perform matching in odd-numbered cycles, and thus perform matching with respect to the second parts of the respective, corresponding data streams (i.e., data to be matched). The pattern circuit 137 is configured to perform matching in even-numbered cycles, and thus does not perform matching with respect to the data supplied from the matching core circuit 120-2. The first parts of the data streams (i.e., data to be matched) are supplied from the pattern circuits 133 and 138 to the next-following pattern circuits 134 and 139, respectively. The pattern circuits 134 and 139 are configured to perform matching in odd-numbered cycles, and thus perform matching with respect to the first parts of the respective, corresponding data streams (i.e., data to be matched). It may be noted that no illustration and description is provided for the output of the pattern circuit 143 since this output goes outside the drawing.

In this manner, the data to be matched that is supplied from the matching core circuit 120-1 is matched for the first time by the pattern circuit 139 without being matched by the pattern circuits 137 and 138.

Figure 25:
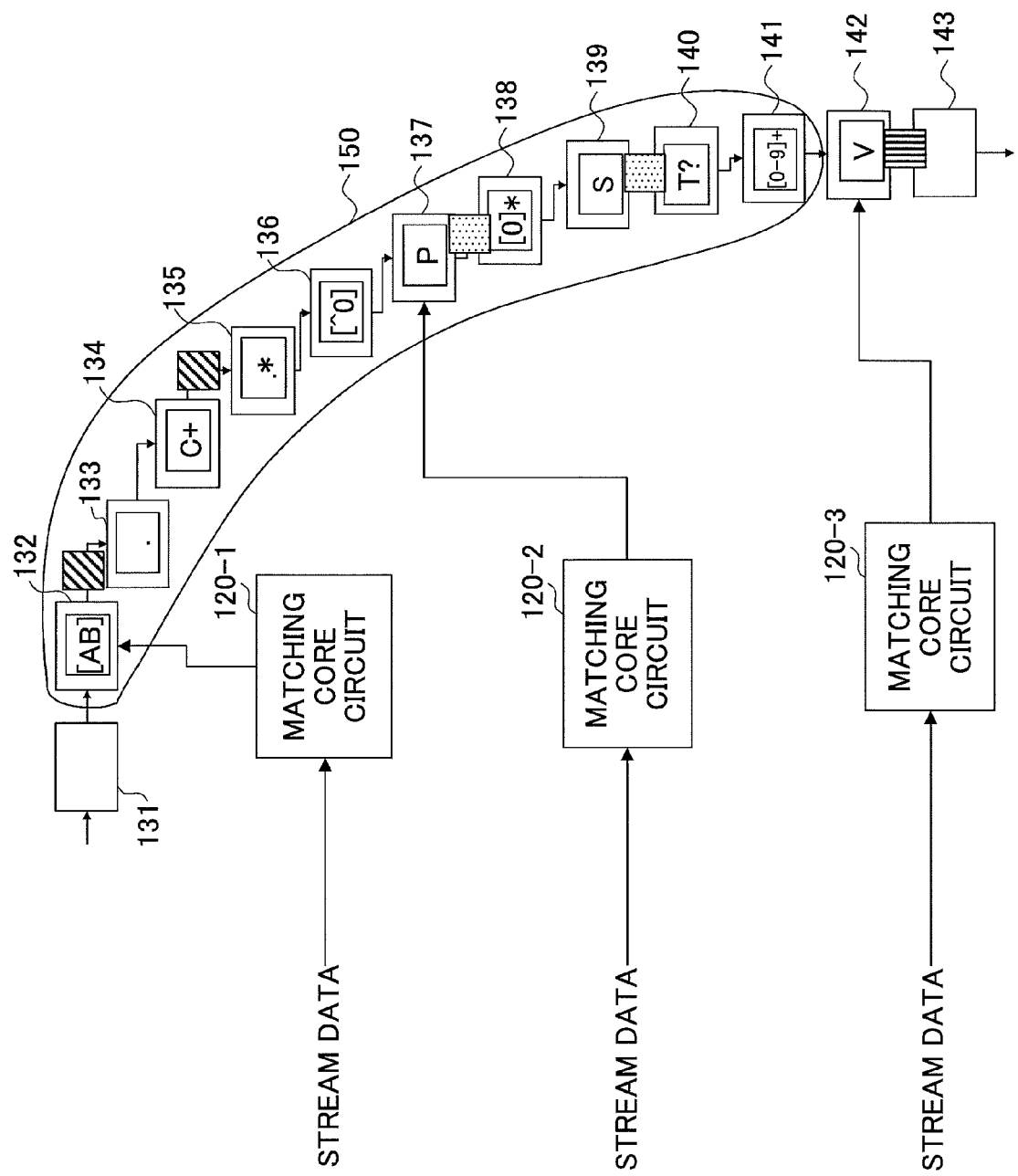
FIG. 25 is a drawing illustrating an example of propagation of data to be matched in the case of a time division multiplex scheme.
Figure 26:
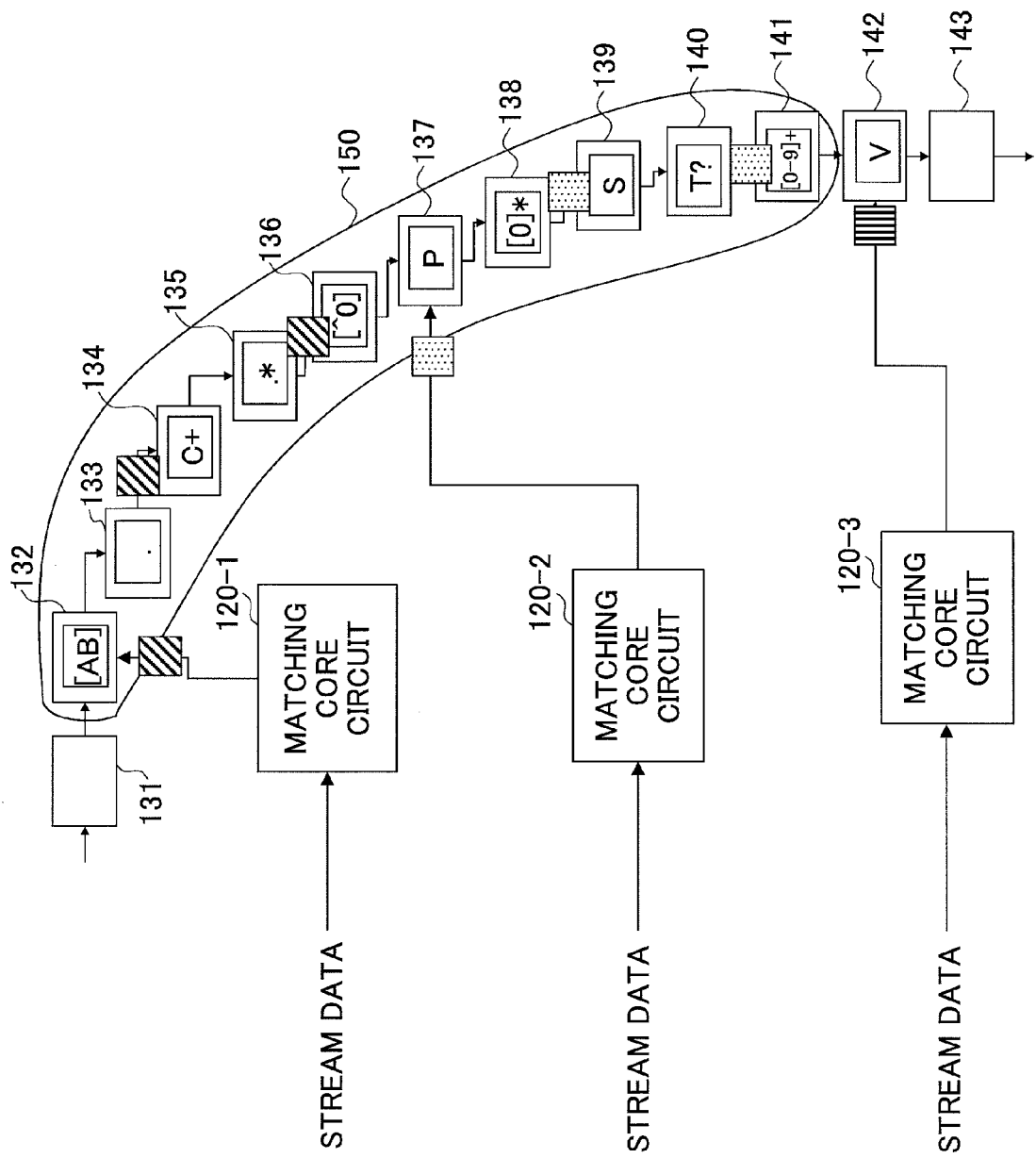
FIG. 26 is a drawing illustrating an example of propagation of data to be matched in the case of a time division multiplex scheme.
Figure 27:
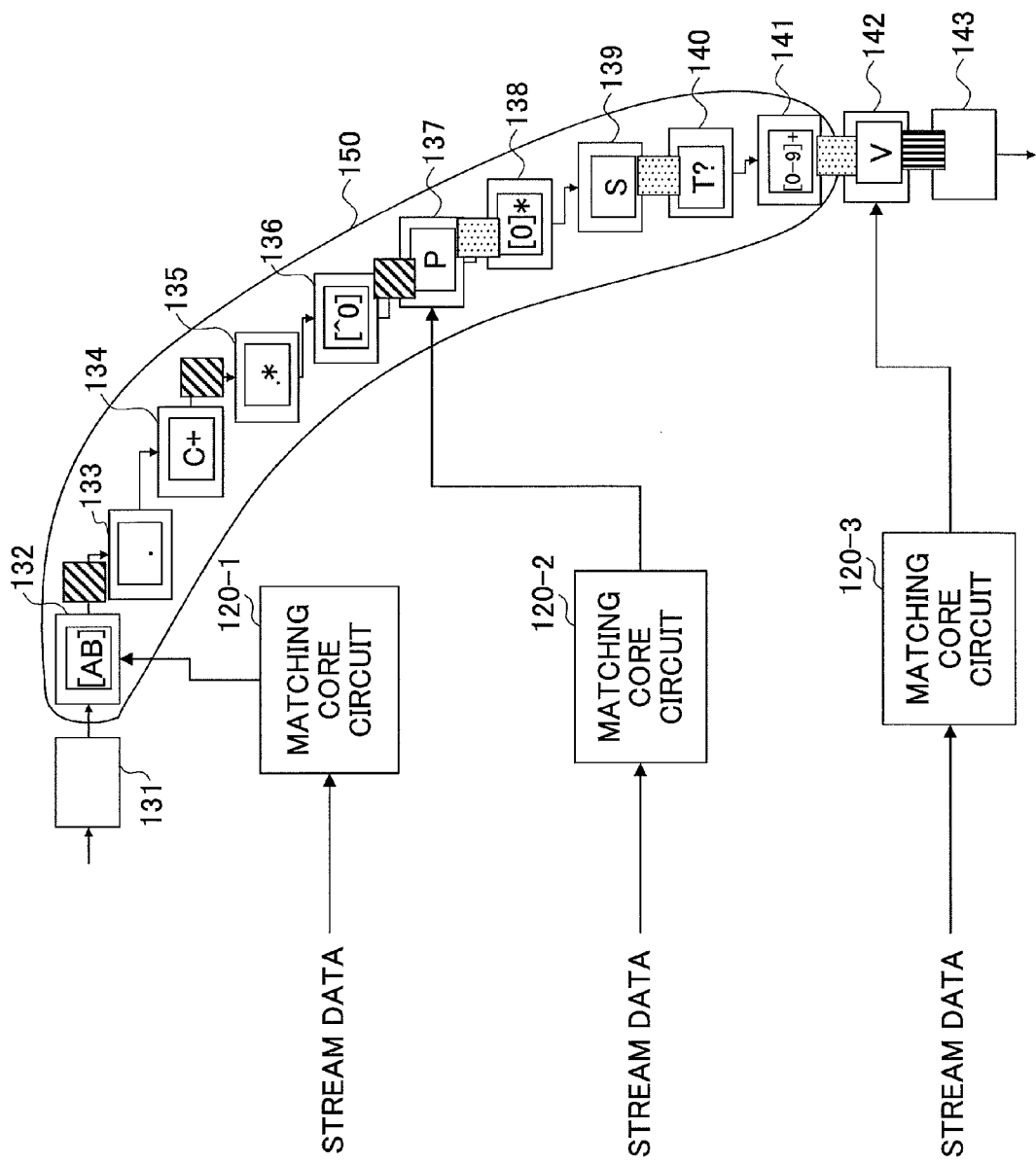
FIG. 27 is a drawing illustrating an example of propagation of data to be matched in the case of a time division multiplex scheme.

FIG. 25, FIG. 26, and FIG. 27 illustrate the ways things are in the fourth cycle, the fifth cycle, and the sixth cycle, respectively. Operations in these cycles are similar to the above-described operations performed in the odd-numbered cycle and the even-numbered cycle. In the sixth cycle illustrated in FIG. 27, however, the pattern circuit 137 connected to the matching core circuit 120-2 and the pattern circuit 142 connected to the matching core circuit 120-3 receive the first parts of data to be matched from the respective preceding-stage pattern circuits. In the immediately preceding fifth cycle, the pattern circuit 137 and the pattern circuit 142 receive the third parts of the respective data streams (i.e., data to be matched) from the matching core circuit 120-2 and the matching core circuit 120-3 that are directly connected thereto, respectively. In this manner, the pattern circuit 137 receives data from the matching core circuit 120-2 and data from the matching core circuit 120-1 in two consecutive cycles. Similarly, the pattern circuit 142 receives data from the matching core circuit 120-3 and data from the matching core circuit 120-2 in two consecutive cycles.

Thereafter, data from the matching core circuit 120-2 and data from the matching core circuit 120-1 that are arranged alternately propagate through the pattern circuits 137 through 141, for example.

Figure 28:
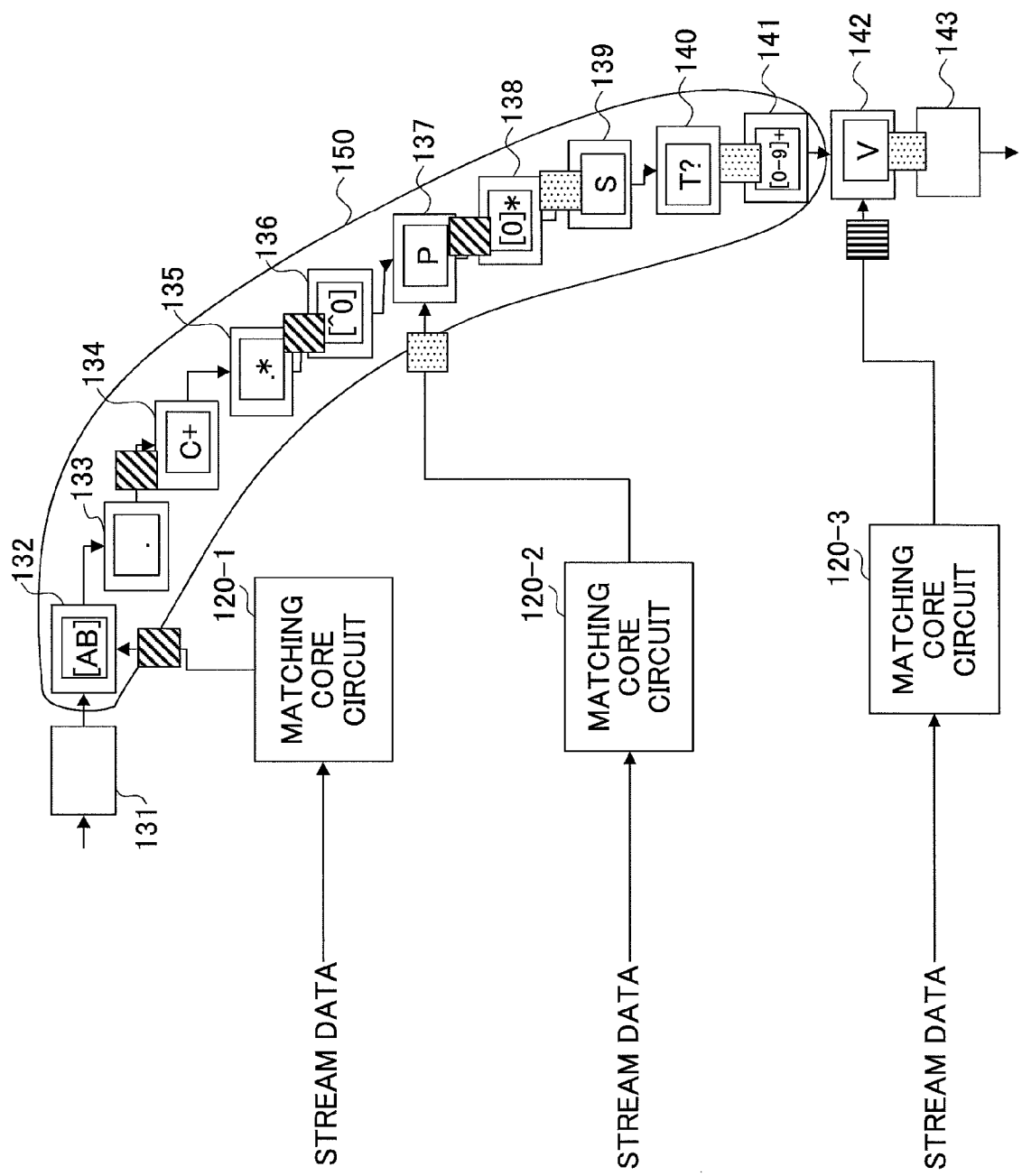
FIG. 28 is a drawing illustrating an example of propagation of data to be matched in the case of a time division multiplex scheme.

FIG. 28 illustrates the way things are in the seventh cycle. In the seventh cycle that is an odd-numbered cycle, the matching core circuits 120-1, 120-2, and 120-3 supply the fourth parts of the respective data streams (i.e., data to be matched) to the corresponding pattern circuits 132, 137, and 142, respectively.

Figure 29:
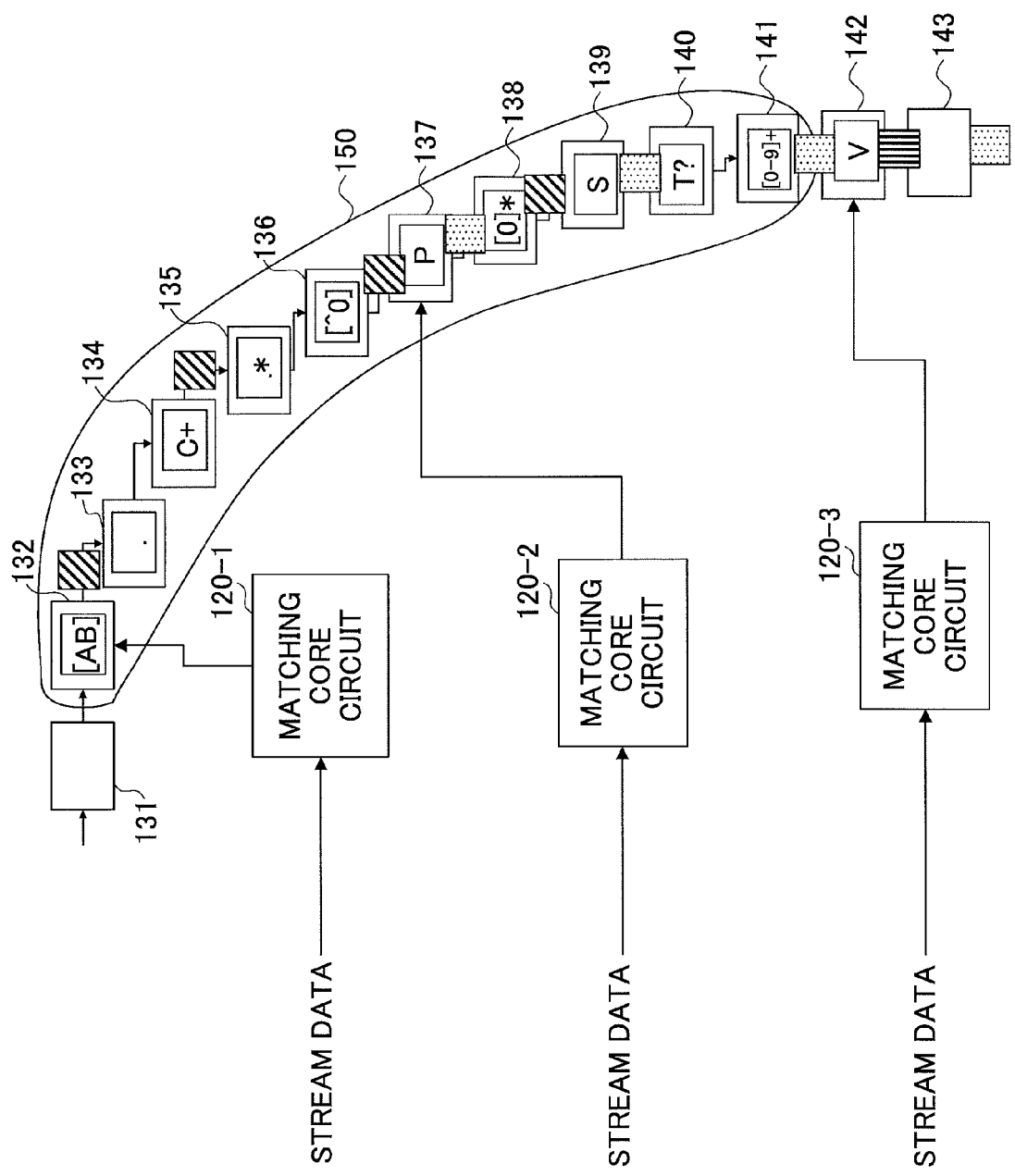
FIG. 29 is a drawing illustrating an example of propagation of data to be matched in the case of a time division multiplex scheme.
Figure 30:
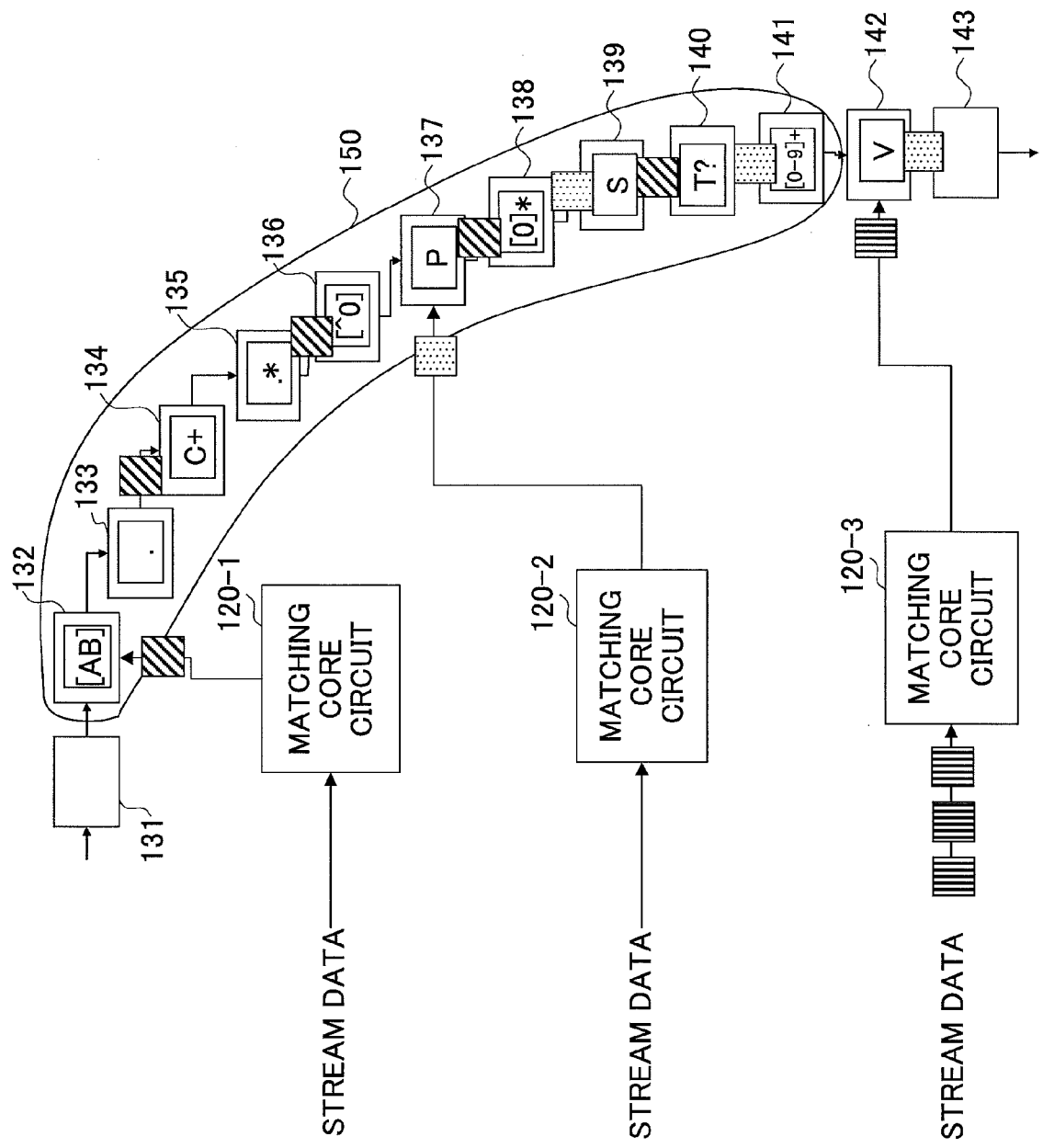
FIG. 30 is a drawing illustrating an example of propagation of data to be matched in the case of a time division multiplex scheme.

Similarly, FIG. 29 illustrates the way things are in the eighth cycle, and FIG. 30 illustrates the way things are in the ninth cycle. In the ninth cycle illustrated in FIG. 30, all of the pattern circuits 137 through 141 receive data from the matching core circuit 120-2 and data from the matching core circuit 120-1 alternately.

Figure 31:
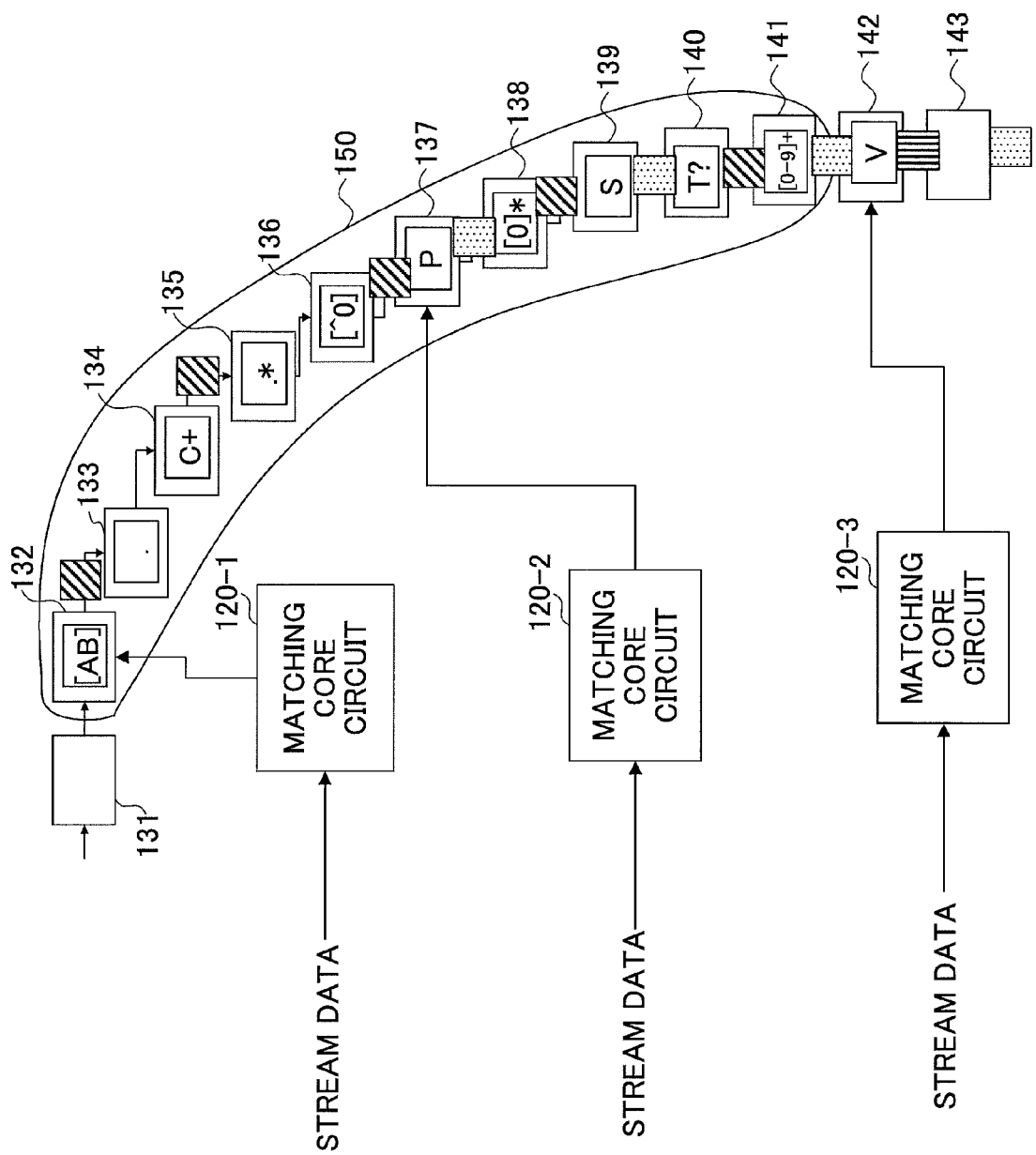
FIG. 31 is a drawing illustrating an example of propagation of data to be matched in the case of a time division multiplex scheme.

FIG. 31 illustrates the way things are in the tenth cycle. The first part of data to be matched from the matching core circuit 120-1 is input into the last pattern circuit 141 in the available range 150.

Figure 32:
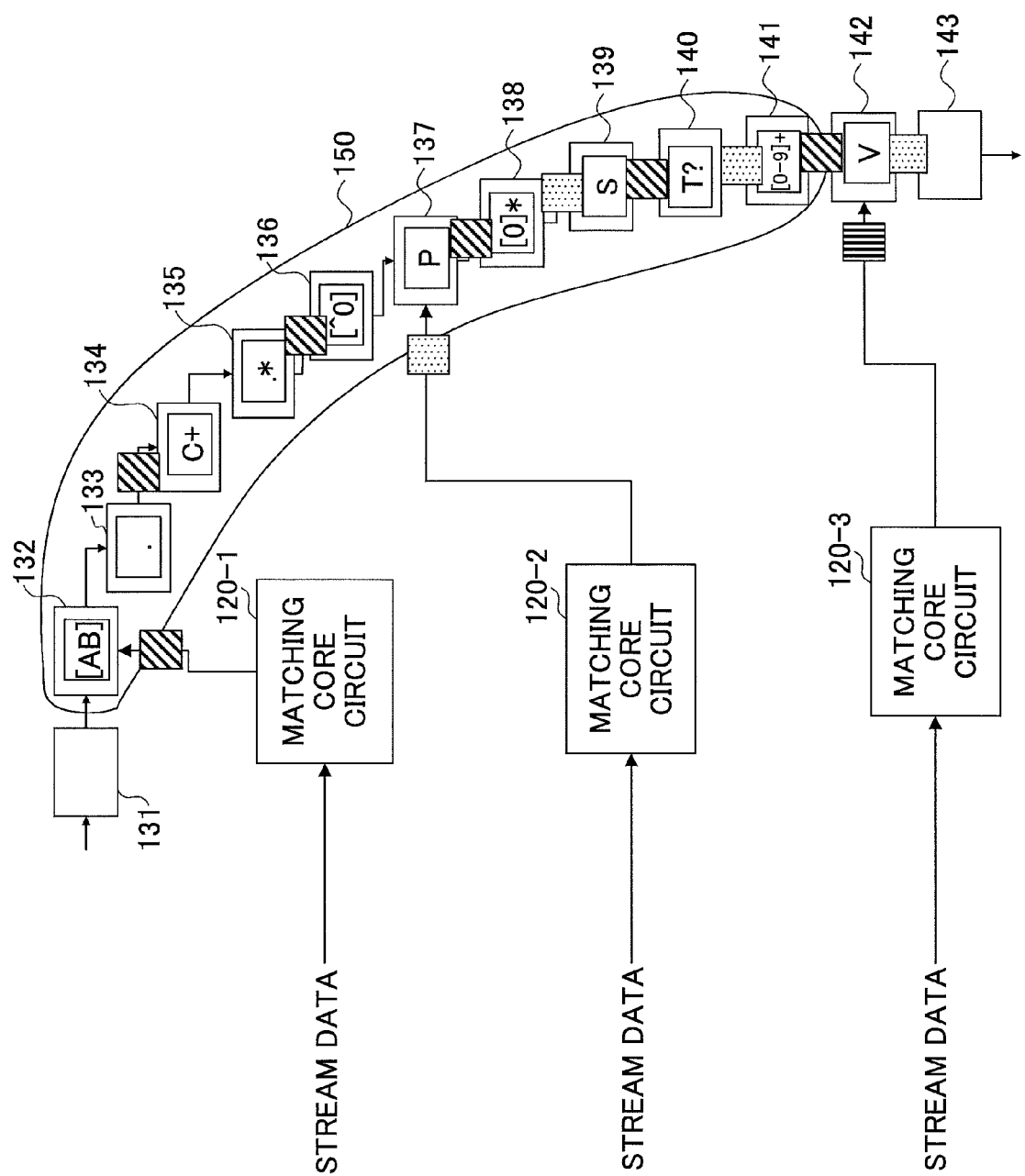
FIG. 32 is a drawing illustrating an example of propagation of data to be matched in the case of a time division multiplex scheme.

FIG. 32 illustrates the way things are in the eleventh cycle. The first part of data to be matched originating from the matching core circuit 120-1 reaches the pattern circuit 142 that is outside the available range 150 and connected to the matching core circuit 120-3. This pattern circuit 142 is configured to receive data from the matching core circuit 120-3 in odd-numbered cycles, so that the first part of data to be matched originating from the matching core circuit 120-1 is not received and discarded.

Figure 33:
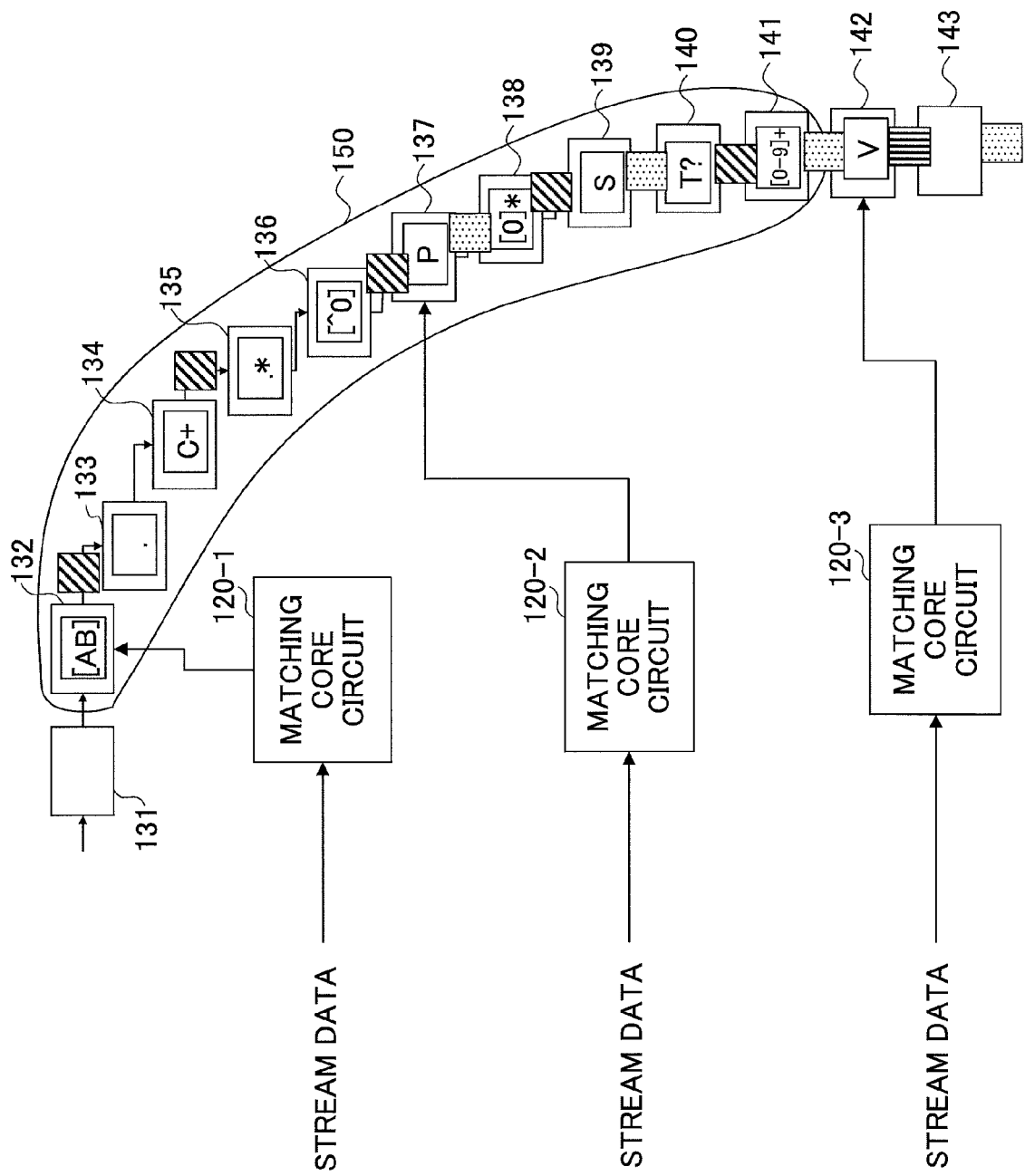
FIG. 33 is a drawing illustrating an example of propagation of data to be matched in the case of a time division multiplex scheme.

FIG. 33 illustrates the way things are in the twelfth cycle. The data to be matched originating from the matching core circuit 120-3 is supplied from the pattern circuit 142 to the pattern circuit 143, and the data to be matched originating from the matching core circuit 120-1 has already disappeared.

FIG. 34 through FIG. 44 are drawings illustrating an example of a selection process performed by pattern circuits to which regular expression patterns are assigned. In FIG. 34 through FIG. 44, the same or corresponding elements as those of FIG. 21 are referred to by the same or corresponding numerals, and a description thereof will be omitted as appropriate.

Figure 34:
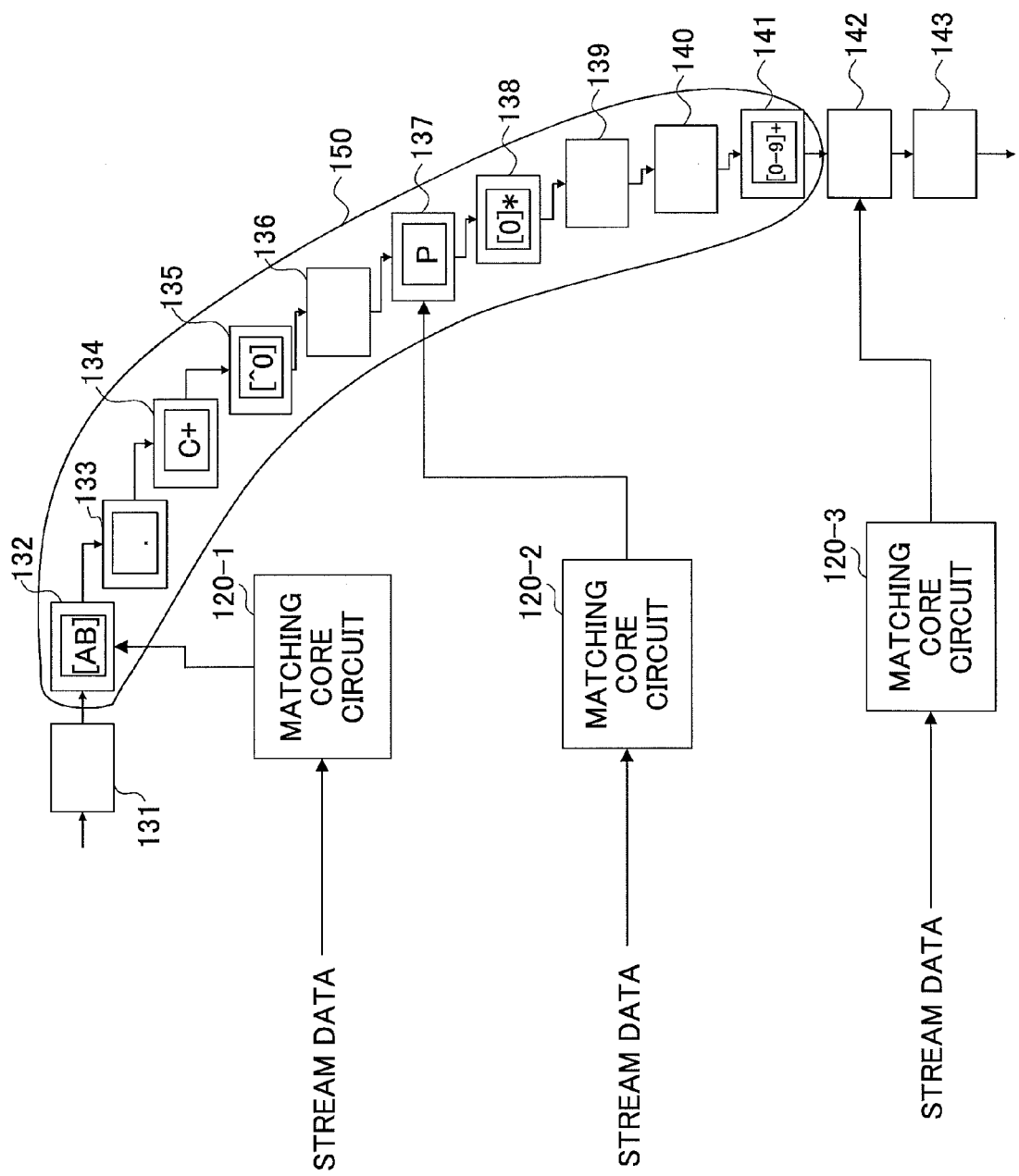
FIG. 34 is a drawing illustrating an example of a selection process performed by pattern circuits to which regular expression patterns are assigned.

As illustrated in FIG. 34, a regular expression pattern is not yet set to the pattern circuits 136, 139, and 140 among the pattern circuits belonging to the available range 150. In this state, the matching core circuit 120-1 requests pattern circuits to which the regular expression pattern "[UV] [0]+" is to be set. In response to this request, a pattern-circuit controlling unit that corresponds to the pattern-circuit controlling unit 24 illustrated in FIG. 2 selects pattern circuits to which the regular expression pattern "[UV] [0]+" is to be set, as will be described in the following. This process corresponds to the process illustrated in FIG. 12.

Figure 35:
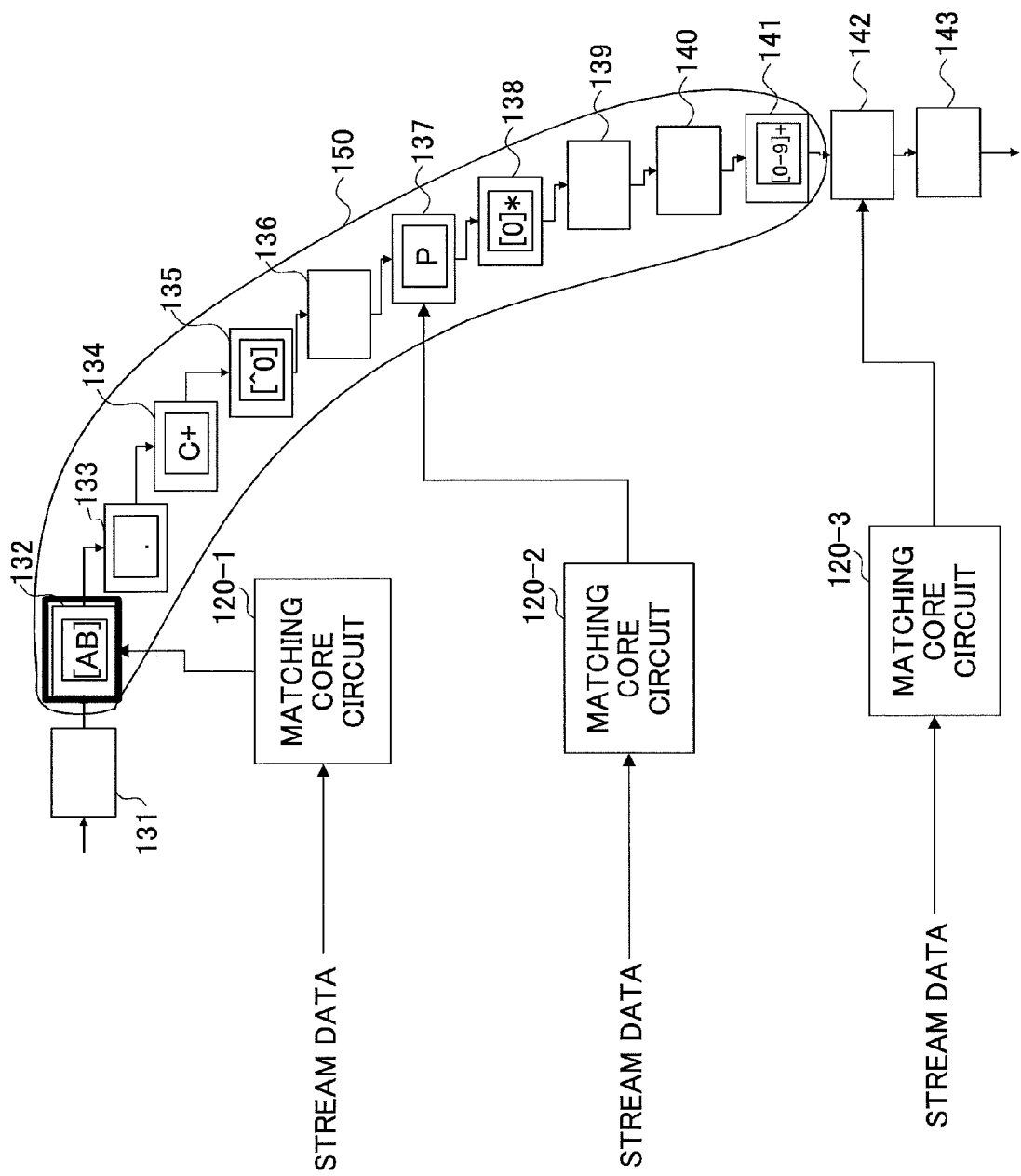
FIG. 35 is a drawing illustrating an example of a selection process performed by pattern circuits to which regular expression patterns are assigned.
Figure 36:
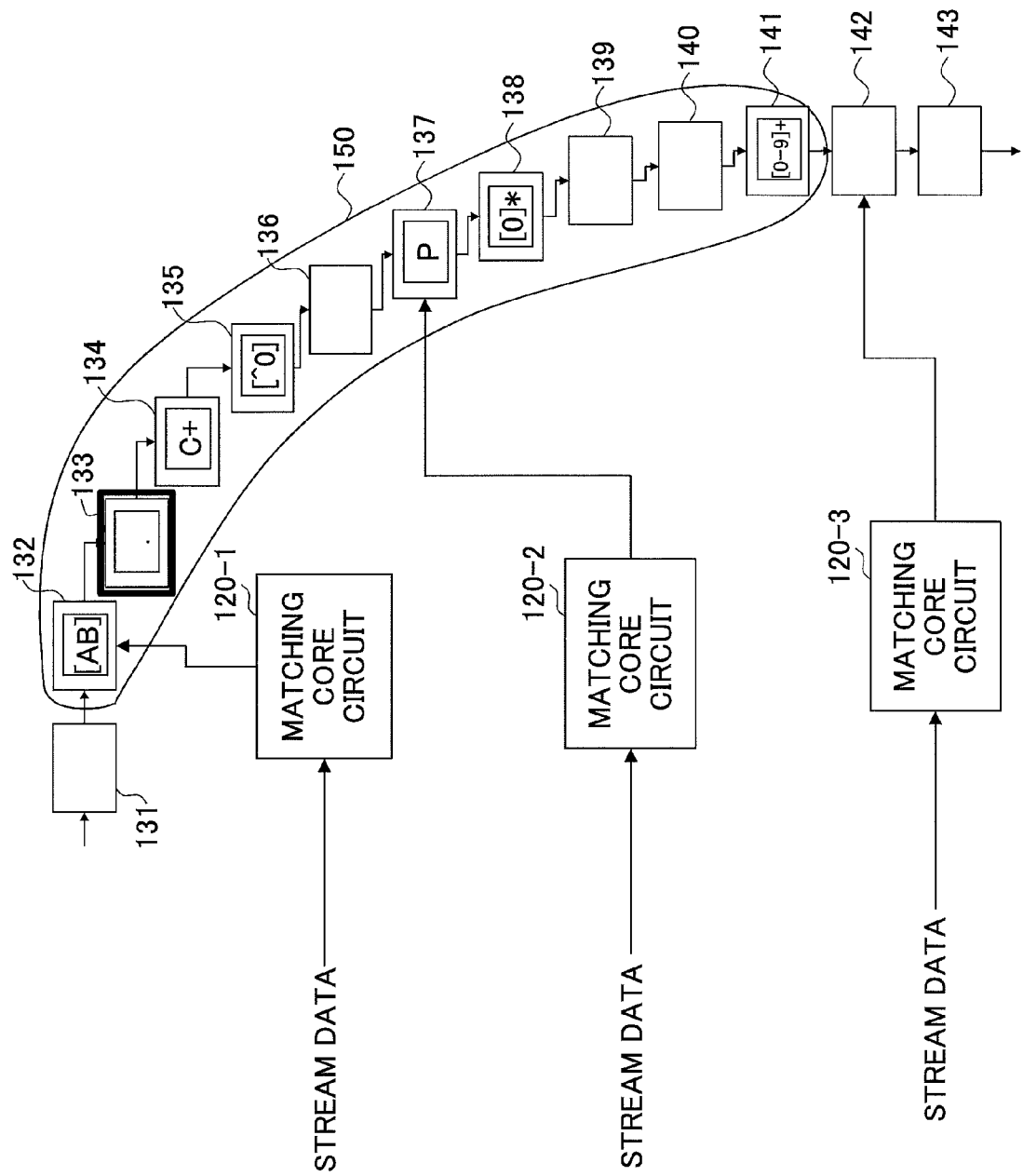
FIG. 36 is a drawing illustrating an example of a selection process performed by pattern circuits to which regular expression patterns are assigned.
Figure 37:
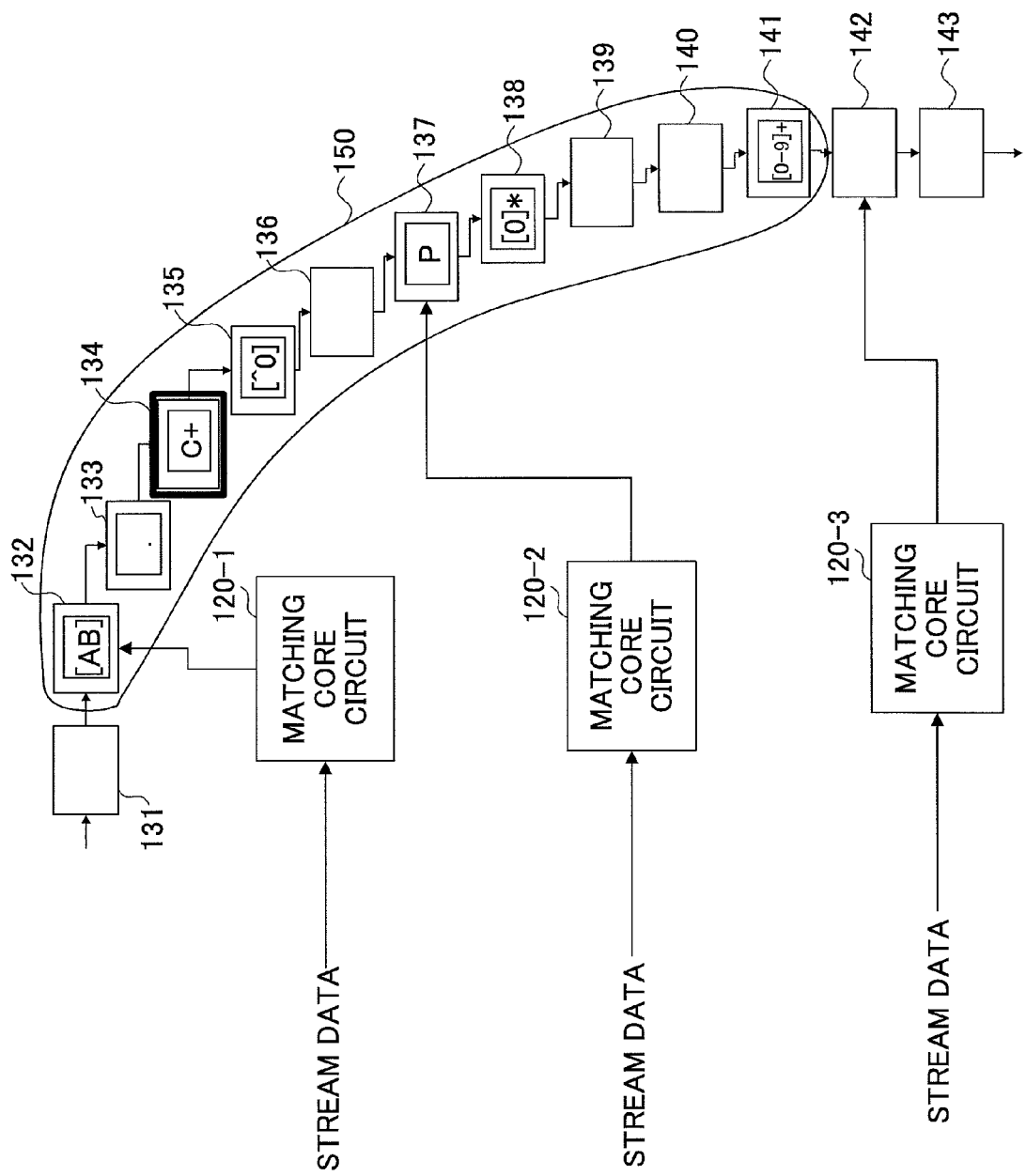
FIG. 37 is a drawing illustrating an example of a selection process performed by pattern circuits to which regular expression patterns are assigned.
Figure 38:
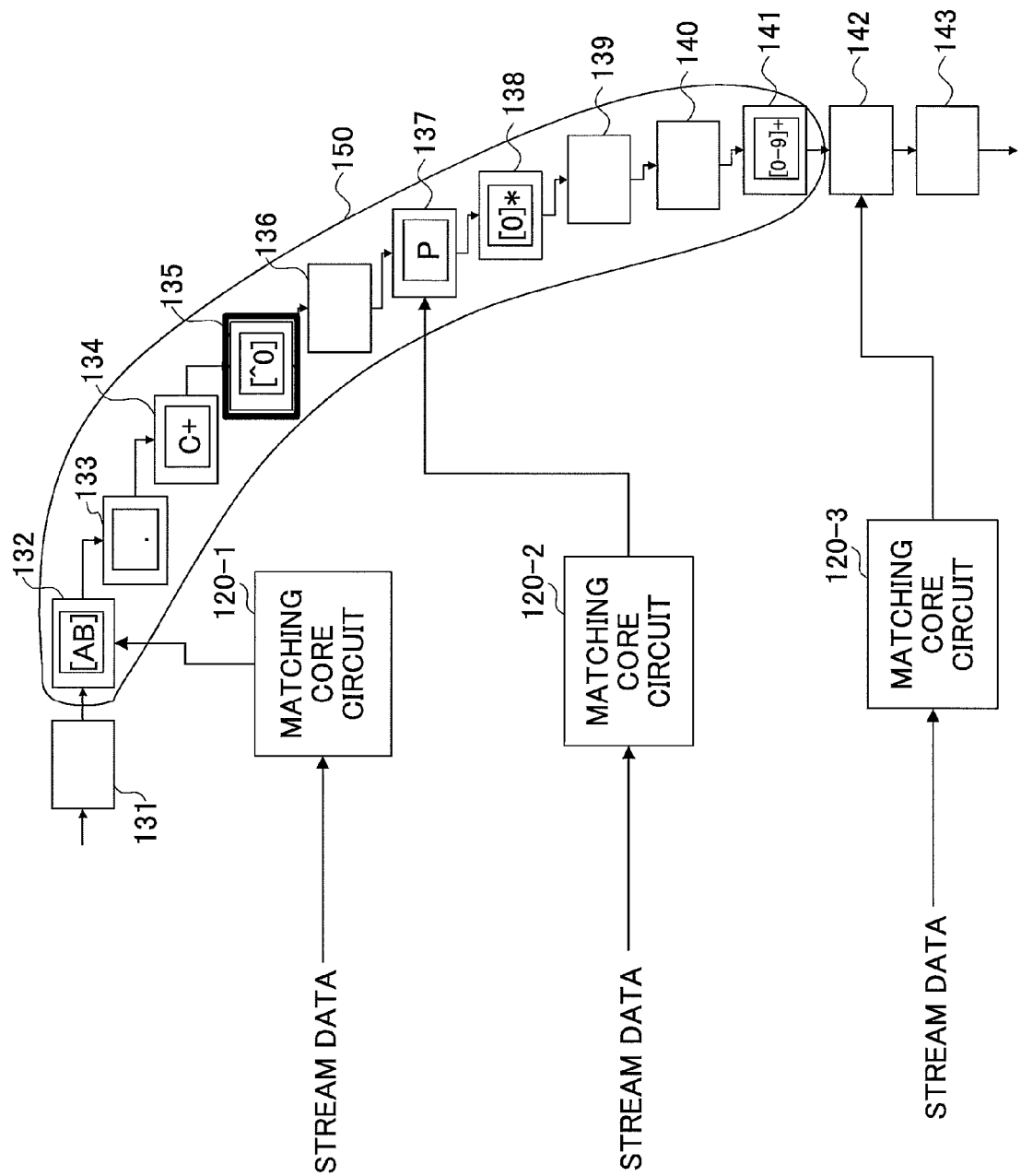
FIG. 38 is a drawing illustrating an example of a selection process performed by pattern circuits to which regular expression patterns are assigned.

As illustrated in FIG. 35, the pattern circuit 132 enclosed in a rectangle frame is first marked as a target pattern circuit. This target pattern circuit is already in use. As illustrated in FIG. 36, the pattern circuit 133 enclosed in a rectangle frame is next marked as a target pattern circuit. This target pattern circuit is already in use. The same applies in the case of FIG. 37 and FIG. 38. That is, the selected target pattern circuits are already in use.

Figure 39:
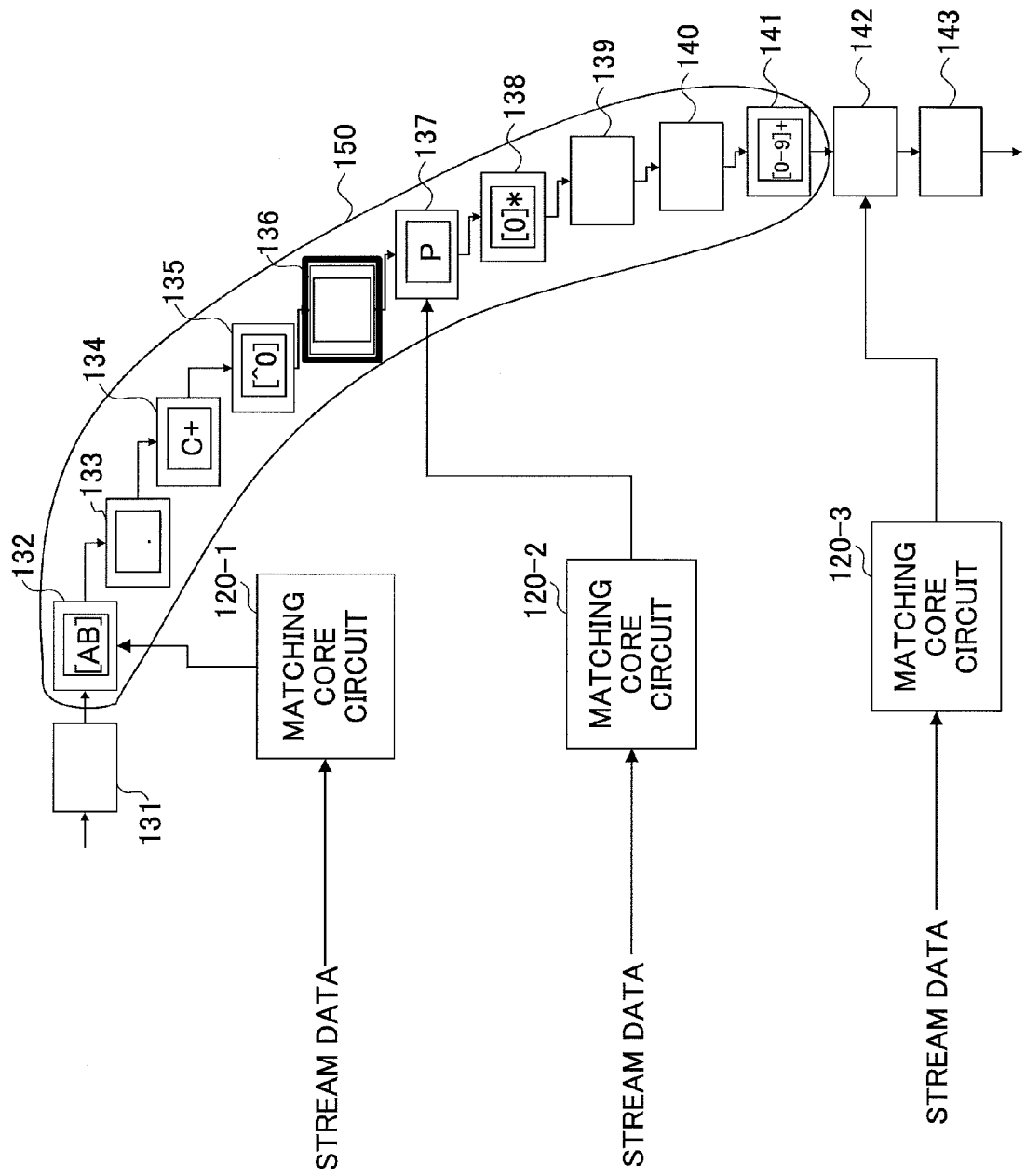
FIG. 39 is a drawing illustrating an example of a selection process performed by pattern circuits to which regular expression patterns are assigned.
Figure 40:
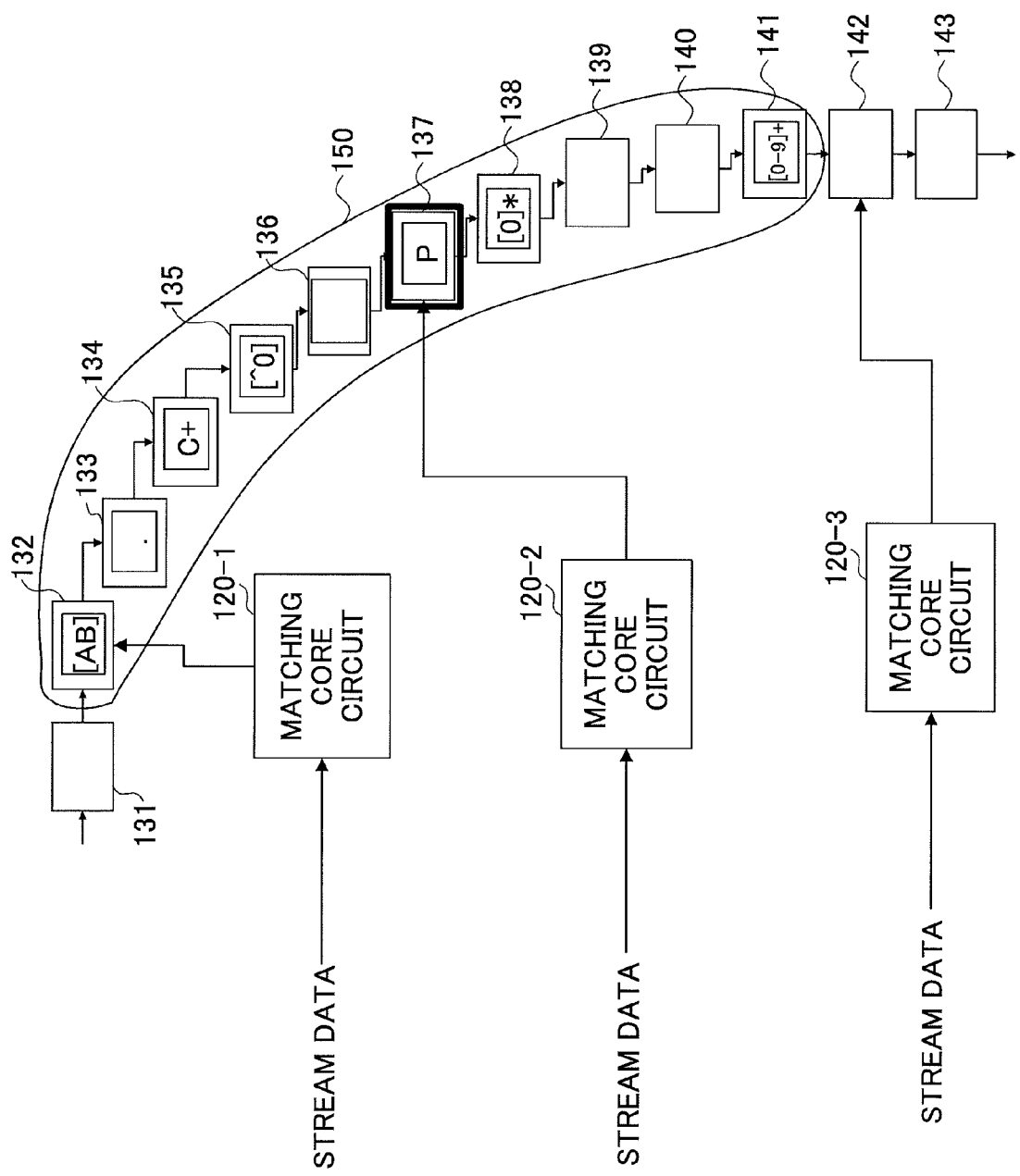
FIG. 40 is a drawing illustrating an example of a selection process performed by pattern circuits to which regular expression patterns are assigned.
Figure 41:
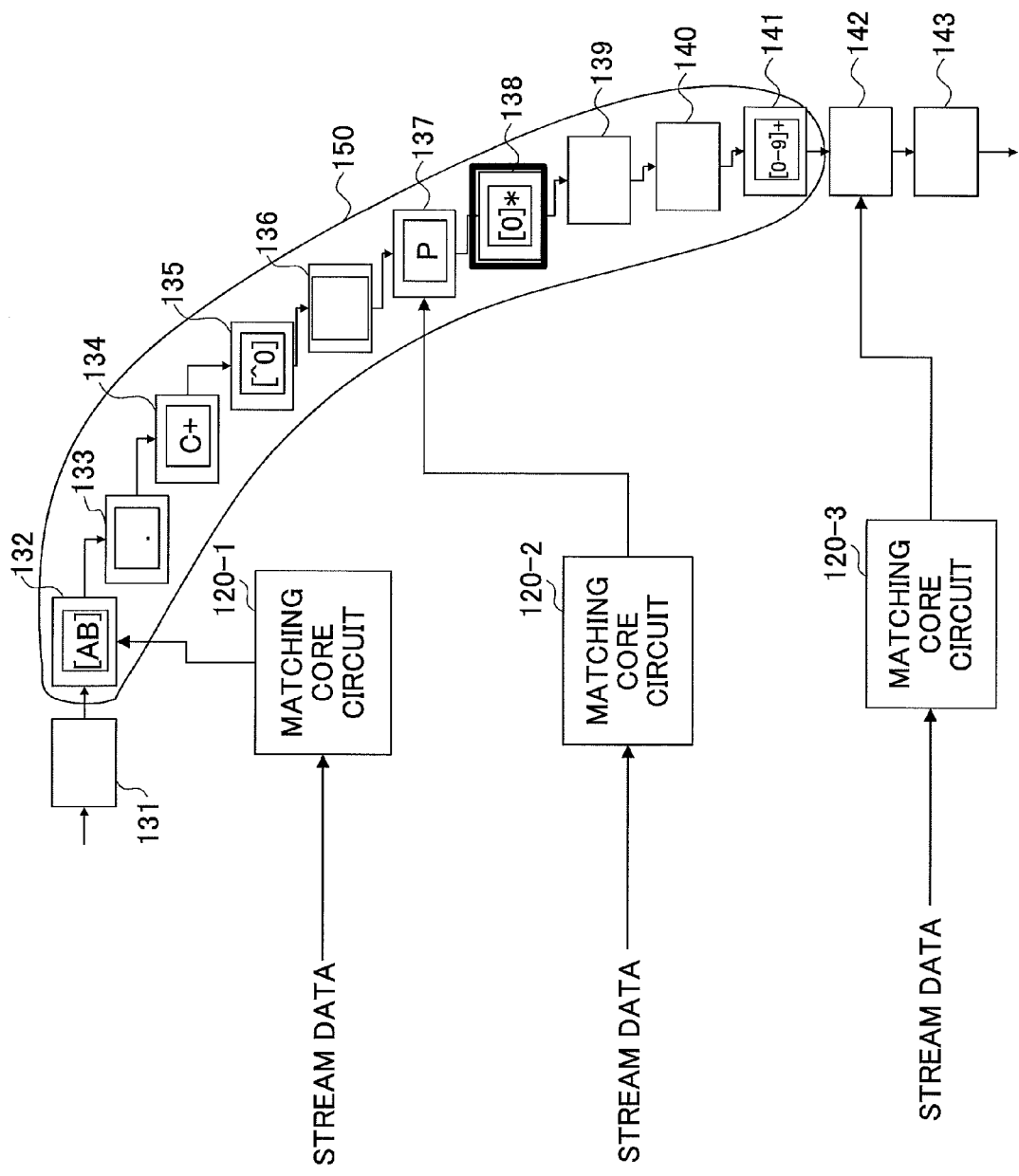
FIG. 41 is a drawing illustrating an example of a selection process performed by pattern circuits to which regular expression patterns are assigned.

In FIG. 39, the pattern circuit 136 enclosed in a rectangle frame is marked as a target pattern circuit. This target pattern circuit is not in use. This pattern circuit 136 is selected as a start-point pattern circuit (see step S14 of the flowchart of FIG. 12). As illustrated in FIG. 40, then, the pattern circuit 137 enclosed in a rectangle frame is marked as a target pattern circuit. This target pattern circuit is already in use. As illustrated in FIG. 41, then, the pattern circuit 138 enclosed in a rectangle frame is marked as a target pattern circuit. This target pattern circuit is already in use.

Figure 42:
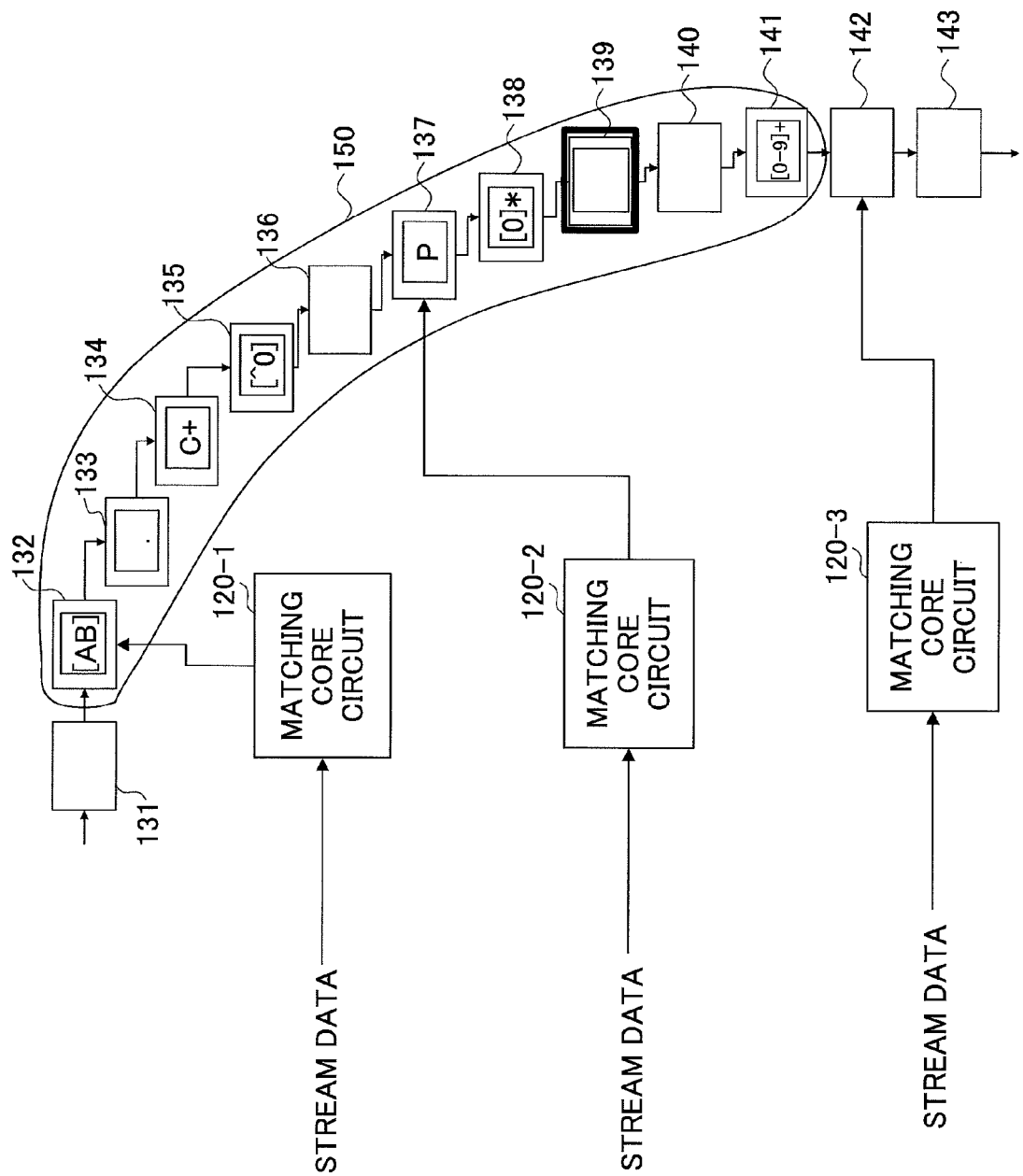
FIG. 42 is a drawing illustrating an example of a selection process performed by pattern circuits to which regular expression patterns are assigned.
Figure 43:
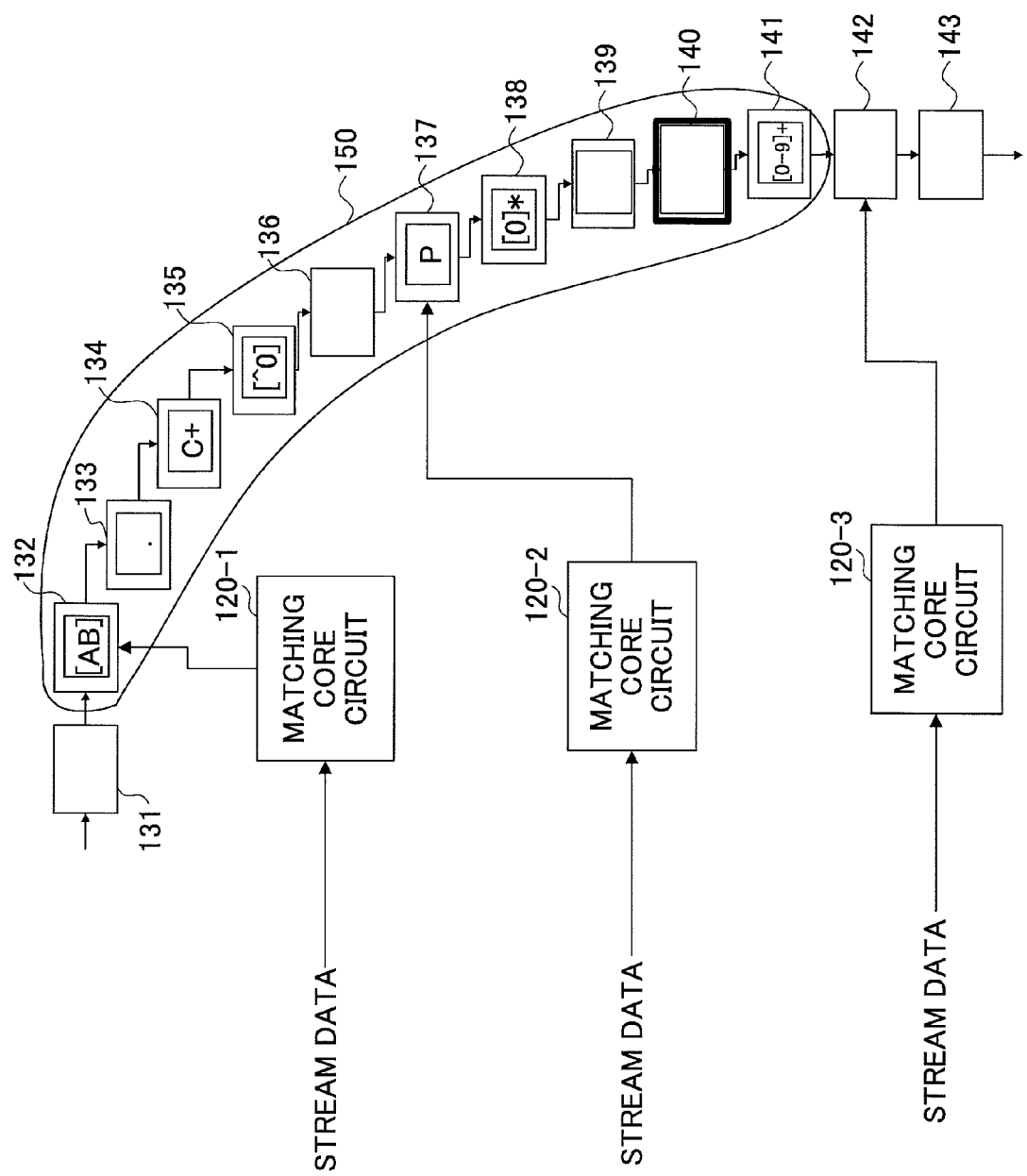
FIG. 43 is a drawing illustrating an example of a selection process performed by pattern circuits to which regular expression patterns are assigned.

Thereafter, in FIG. 42, the pattern circuit 139 enclosed in a rectangle frame is marked as a target pattern circuit. This target pattern circuit is not in use. This pattern circuit 139 is thus selected as a start-point pattern circuit. As illustrated in FIG. 43, then, the pattern circuit 140 enclosed in a rectangle frame is marked as a target pattern circuit. This target pattern circuit is not in use. At this time, the number of pattern circuits from the start-point pattern circuit 139 to the current pattern circuit 140 is two (i.e., the pattern circuit size referred to in the flowchart of FIG. 12), which is equal to the length of the regular expression pattern that is to be set. Accordingly, the pattern circuit 140 that is the current target pattern circuit is selected as an end-point pattern circuit.

Figure 44:
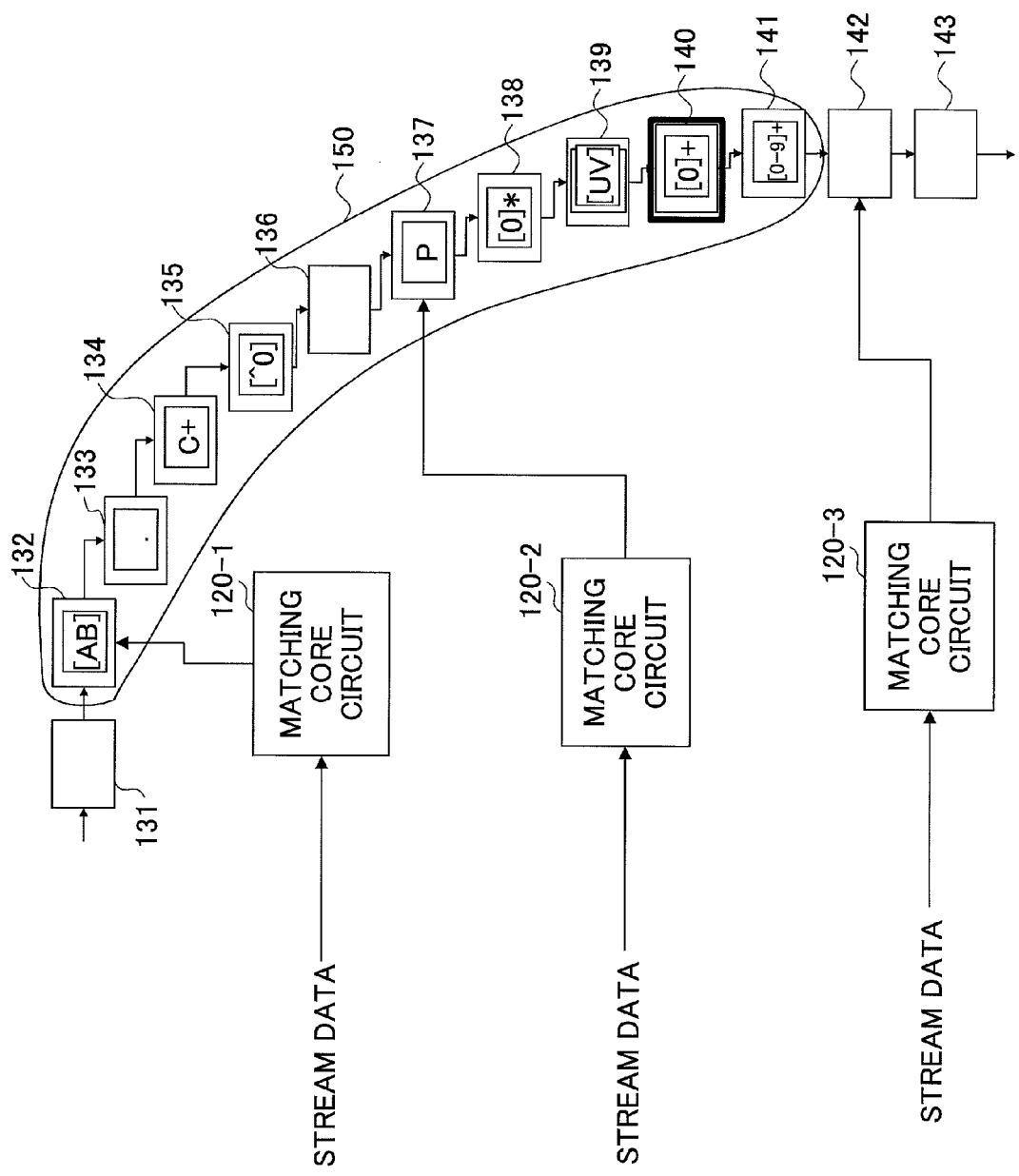
FIG. 44 is a drawing illustrating an example of a selection process performed by pattern circuits to which regular expression patterns are assigned.

In the manner described above, pattern circuits to which settings are to be made are selected. Upon such a selection, the matching core circuit 120-1 writes the regular expression pattern "[UV][0]+" to the start-point pattern circuit 139 and the end-point pattern circuit 140 through the pattern circuits 132 through 138. With this arrangement, the regular expression pattern "[UV][0]+" is set to the start-point pattern circuit 139 and the end-point pattern circuit 140 as illustrated in FIG. 44.

Further, the present invention is not limited to these embodiments, but various variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A matching circuit, comprising:
   a plurality of pattern circuits each configured to match data against part of a regular expression pattern; and
   a signal path in which the pattern circuits are series-connected, and a given-stage pattern circuit supplies to a next-stage pattern circuit the data and a result of matching generated by the given-stage pattern circuit,
   wherein each of the pattern circuits connected to a preceding-stage pattern circuit through the signal path is settable in a first operation mode and in a second operation mode,
   wherein each of the pattern circuits in the first operation mode generates a result of matching which is to be supplied to a next-stage pattern circuit in response to both a result of matching supplied from the preceding-stage pattern circuit and a result obtained by matching the data supplied from the preceding-stage pattern circuit against part of a regular expression pattern, and
   wherein each of the pattern circuits in the second operation mode generates a result of matching which is to be supplied to the next-stage pattern circuit in response to a result obtained by matching the data supplied from the preceding-stage pattern circuit against part of a regular expression pattern, without relying on a result of matching supplied from the preceding-stage pattern circuit.

2. The matching circuit as claimed in claim 1, further comprising a plurality of matching core circuits, wherein the matching core circuits are connected to respective, corresponding pattern circuits among the plurality of pattern circuits, and supply respective, corresponding data to the respective, corresponding pattern circuits.

3. The matching circuit as claimed in claim 2, wherein the pattern circuits are series-connected in a ring.

4. The matching circuit as claimed in claim 2, wherein each of the plurality of pattern circuits performs matching only in one operation cycle among a predetermined number of consecutive operation cycles, and the predetermined number of consecutive pattern circuits among the plurality of pattern circuits perform matching in respective, different operation cycles among the predetermined number of consecutive operation cycles.

5. The matching circuit as claimed in claim 2, wherein the signal path includes at least two parallel signal paths, and each pattern circuit that is not connected to any of the matching core circuits receives the data originating from at least two of the matching core circuits through the at least two parallel signal paths, respectively.

6. A method of controlling a matching circuit, comprising:
   providing a series of pattern circuits, the series comprising N+M pattern circuits connected in series;
   assigning a first regular expression pattern to N, N being a positive integer, pattern circuits of the series of pattern circuits, wherein the N pattern circuits are a given pattern circuit serving as a starting point through an N-th pattern circuit as counted from the given pattern circuit in a pattern circuit line in which a plurality of pattern circuits each configured to match data against part of a regular expression pattern are series-connected; and
   assigning a second regular expression pattern to M, M being a positive integer, pattern circuits that are an N+1-th in the series of pattern circuits through an N+M-th pattern circuit as counted from the given pattern circuit serving as the starting point.

7. The method as claimed in claim 6, further comprising causing the data to propagate from the given pattern circuit to the N+M-th pattern circuit, thereby performing first matching with respect to the first regular expression pattern and second matching with respect to the second regular expression pattern independently of each other.

8. The method as claimed in claim 6, further comprising causing at least two separate data to propagate in parallel or in a time division multiplex manner from a pattern circuit to a next-following pattern circuit in the pattern circuit line.

* * * * *